(12) United States Patent
Chino et al.

(10) Patent No.: US 10,995,207 B2
(45) Date of Patent: May 4, 2021

(54) THERMOPLASTIC ELASTOMER COMPOSITION AND METHOD FOR PRODUCING THE SAME

(71) Applicant: ENEOS CORPORATION, Tokyo (JP)

(72) Inventors: Keisuke Chino, Tokyo (JP); Hiroaki Suzuki, Tokyo (JP); Zhengzhe Jin, Tokyo (JP); Yusuke Matsuo, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 147 days.

(21) Appl. No.: 15/759,702

(22) PCT Filed: Aug. 4, 2016

(86) PCT No.: PCT/JP2016/073002
§ 371 (c)(1),
(2) Date: Mar. 13, 2018

(87) PCT Pub. No.: WO2017/047274
PCT Pub. Date: Mar. 23, 2017

(65) Prior Publication Data
US 2019/0048178 A1 Feb. 14, 2019

(30) Foreign Application Priority Data

Sep. 17, 2015 (JP) .............................. JP2015-184491
May 16, 2016 (JP) .............................. JP2016-098268

(51) Int. Cl.
| | | |
|---|---|---|
| C08L 25/06 | (2006.01) | |
| C08K 9/04 | (2006.01) | |
| C08L 101/02 | (2006.01) | |
| C08K 3/34 | (2006.01) | |
| C08L 101/12 | (2006.01) | |
| C08L 91/00 | (2006.01) | |
| C08L 53/00 | (2006.01) | |
| C08L 101/08 | (2006.01) | |
| C08L 51/06 | (2006.01) | |
| C08L 9/00 | (2006.01) | |
| C08L 23/06 | (2006.01) | |
| C08L 23/08 | (2006.01) | |
| C08L 23/12 | (2006.01) | |
| C08L 23/14 | (2006.01) | |
| C08L 27/06 | (2006.01) | |
| C08L 67/00 | (2006.01) | |
| C08L 75/04 | (2006.01) | |
| C08L 77/00 | (2006.01) | |
| C08K 5/3467 | (2006.01) | |

(52) U.S. Cl.
CPC .............. *C08L 25/06* (2013.01); *C08K 3/34* (2013.01); *C08K 3/346* (2013.01); *C08K 9/04* (2013.01); *C08L 9/00* (2013.01); *C08L 23/06* (2013.01); *C08L 23/0815* (2013.01); *C08L 23/12* (2013.01); *C08L 23/14* (2013.01); *C08L 27/06* (2013.01); *C08L 51/06* (2013.01); *C08L 53/00* (2013.01); *C08L 67/00* (2013.01); *C08L 75/04* (2013.01); *C08L 77/00* (2013.01); *C08L 91/00* (2013.01); *C08L 101/02* (2013.01); *C08L 101/025* (2013.01); *C08L 101/08* (2013.01); *C08L 101/12* (2013.01); *C08K 5/3467* (2013.01); *C08L 2207/04* (2013.01); *C08L 2312/00* (2013.01)

(58) Field of Classification Search
CPC ..... C08K 3/346; C08L 21/00; C08L 23/0815; C08L 101/025; C08L 9/00–10; C08L 19/00
See application file for complete search history.

(56) References Cited

U.S. PATENT DOCUMENTS

| | | | |
|---|---|---|---|
| 2006/0094829 A1 | 5/2006 | Chino et al. | |
| 2006/0100339 A1 | 5/2006 | Gong et al. | |
| 2006/0189755 A1* | 8/2006 | Chino | ............... C08C 19/22 525/88 |
| 2008/0045665 A1 | 2/2008 | Chino | |
| 2010/0240809 A1* | 9/2010 | Yamada | ............... F16G 5/04 524/81 |

(Continued)

FOREIGN PATENT DOCUMENTS

| | | |
|---|---|---|
| CN | 101063001 A | 10/2007 |
| CN | 102993998 A | 3/2013 |

(Continued)

OTHER PUBLICATIONS

Aug. 30, 2016 Search Report issued in International Patent Application No. PCT/JP2016/073002.
Mar. 20, 2018 International Preliminary Report on Patentability issued in International Patent Application No. PCT/JP2016/073002.
Rane, A.V. et al. "Study of Mechanical, Thermal and Micro structral Properties of EPDM/Polypropylene/Nano clay Composites with Variable Compatibilizer Dosage". J. Material Enviormental Science, vol. 6, pp. 60-69, 2015.

(Continued)

Primary Examiner — Kregg T Brooks
(74) Attorney, Agent, or Firm — Oliff PLC

(57) ABSTRACT

A thermoplastic elastomer composition includes: at least one elastomer component selected from the group consisting of elastomeric polymers each of which has a side chain containing a hydrogen-bond cross-linkable moiety having a carbonyl-containing group and/or a nitrogen-containing heterocycle and has a glass-transition point of 25° C. or below, and elastomeric polymers each of which contains a hydrogen-bond cross-linkable moiety and a covalent-bond cross-linking moiety in a side chain and has a glass-transition point of 25° C. or below; a clay, a content ratio of which is 20 parts by mass or less relative to 100 parts by mass of the elastomer component; and an α-olefin-based resin having no chemical-bond cross-linking moiety.

17 Claims, No Drawings

(56) References Cited

U.S. PATENT DOCUMENTS

2013/0071654 A1    3/2013   Mase

FOREIGN PATENT DOCUMENTS

| | | | | |
|---|---|---|---|---|
| EP | 0465317 A2 * | 1/1992 | ............. | C08L 53/00 |
| JP | 2004-307576 A | 11/2004 | | |
| JP | 2005-532449 A | 10/2005 | | |
| JP | 2006-131663 A | 5/2006 | | |
| JP | 2007-56145 A | 3/2007 | | |
| JP | 5918878 B1 | 5/2016 | | |
| WO | WO-2011159059 A2 * | 12/2011 | ............. | C08L 23/10 |

OTHER PUBLICATIONS

May 28, 2019 Extended European Search Report issued in European Patent Application No. 16846147.3.
Nov. 27, 2019 Office Action issued in Chinese Patent Application No. 201680053894.8.
Sep. 2, 2020 Office Action issued in Chinese Patent Application No. 201680053894.8.
Yanyun, "Effect of co-crosslinkers TAC and TAIC on high temperature resistance of EPDM," Modern Rubber Technology, vol. 35, No. 5, pp. 23-25, Oct. 15, 2009.

\* cited by examiner

THERMOPLASTIC ELASTOMER COMPOSITION AND METHOD FOR PRODUCING THE SAME

TECHNICAL FIELD

The present invention relates to a thermoplastic elastomer composition, and a method for producing the same.

BACKGROUND ART

Thermoplastic elastomers are materials which are industrially very useful because they can be melted at molding temperature during a molding process and can be shaped by a known resin molding technique.

As an example of such thermoplastic elastomers, Japanese Unexamined Patent Application Publication No. 2006-131663 (PTL 1) discloses a thermoplastic elastomer comprising an elastomeric polymer which has a side chain containing a hydrogen-bond cross-linkable moiety having a carbonyl-containing group and a nitrogen-containing heterocycle and has another side chain containing a covalent-bond cross-linking moiety, and which has a glass-transition point of 25° C. or below. Such thermoplastic elastomers as described in PTL 1, however, are not necessarily sufficient in terms of the heat resistance and the tensile strength at break.

CITATION LIST

Patent Literature

[PTL 1] Japanese Unexamined Patent Application Publication No. 2006-131663

SUMMARY OF INVENTION

Technical Problem

The present invention has been made in view of the problems in the conventional techniques, and an object of the present invention is to provide a thermoplastic elastomer composition which can have sufficiently high levels of heat resistance and tensile strength at break, and a method for producing the same.

Solution to Problem

The present inventors have conducted intensive study to achieve the above-described object, and consequently have found that a thermoplastic elastomer composition can have sufficiently high levels of heat resistance and tensile strength at break when the thermoplastic elastomer composition comprises: at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; a clay, a content ratio of which is 20 parts by mass or less relative to 100 parts by mass of the elastomer component; and an α-olefin-based resin having no chemical-bond cross-linking moiety. This finding has led to the completion of the present invention.

Specifically, a thermoplastic elastomer composition of the present invention comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay, a content ratio of which is 20 parts by mass or less relative to 100 parts by mass of the elastomer component; and an α-olefin-based resin having no chemical-bond cross-linking moiety.

In the thermoplastic elastomer composition of the present invention, a content ratio of the α-olefin-based resin is preferably 5 to 250 parts by mass relative to 100 parts by mass of the elastomer component.

Moreover, in the thermoplastic elastomer composition of the present invention, the α-olefin-based resin is preferably at least one selected from the group consisting of polypropylene, polyethylene, ethylene-butene copolymers, and ethylene-propylene copolymers, and is more preferably at least one selected from the group consisting of polypropylene, polyethylene, and ethylene-propylene copolymers.

In addition, in the thermoplastic elastomer composition of the present invention, the α-olefin-based resin preferably has a melt flow rate (MFR), which is measured at 190° C. under a load of 2.16 kg according to JIS K6922-2 (published in 2010), of 40 g/10 min or more.

Further, in the thermoplastic elastomer composition of the present invention, the hydrogen-bond cross-linkable moiety contained in the side chain of the elastomeric polymer (B) is preferably a hydrogen-bond cross-linkable moiety having a carbonyl-containing group and/or a nitrogen-containing heterocycle.

In addition, in the thermoplastic elastomer composition of the present invention, the clay is preferably at least one selected from the group consisting of clays mainly containing silicon and magnesium, and organically modified clays, and is more preferably an organically modified clay.

In addition, in the thermoplastic elastomer composition of the present invention, a cross-linkage at the covalent-bond cross-linking moiety contained in the side chain of the elastomeric polymer (B) is preferably at least one bond selected from the group consisting of amide, ester, lactone, urethane, ether, thiourethane, and thioether.

In addition, in the thermoplastic elastomer composition of the present invention, the hydrogen-bond cross-linkable moiety of the side chain (a) preferably contains a structural portion represented by the following general formula (1):

[Chem. 1]

(1)

[in the formula (1), A is a nitrogen-containing heterocycle, and B is a single bond; an oxygen atom, an amino group represented by a formula NR' (R' is a hydrogen atom or an alkyl group having 1 to 10 carbon atoms), or a sulfur atom; or an organic group optionally containing any of the atoms or groups].

Moreover, in the thermoplastic elastomer composition of the present invention, the nitrogen-containing heterocycle is preferably a 5-membered ring and/or a 6-membered ring.

In addition, in the thermoplastic elastomer composition of the present invention, the nitrogen-containing heterocycle is preferably at least one selected from a triazole ring, a thiadiazole ring, a pyridine ring, an imidazole ring, a triazine ring, an isocyanurate ring, and a hydantoin ring.

In addition, in the thermoplastic elastomer composition of the present invention, main chains of the elastomeric polymers (A) and (B) each preferably comprise at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

In addition, in the thermoplastic elastomer composition of the present invention, a polymer contained as the elastomer component preferably contains an olefin-based copolymer in the main chain and contains an isocyanurate ring in a side chain.

In addition, in the case of the thermoplastic elastomer composition of the present invention in which the polymer contained as the elastomer component contains an olefin-based copolymer in the main chain and contains an isocyanurate ring in a side chain, the thermoplastic elastomer composition preferably exhibits an infrared adsorption spectrum in which a ratio between an absorption intensity (A) of a peak around a wavelength of 2,920 cm$^{-1}$ derived from C—H stretching vibration in an olefin-based resin (the foregoing olefin-based resin comprises the α-olefin-based resin having no chemical-bond cross-linking moiety and the olefin-based resin forming the main chain of the polymer contained as the elastomer component (for example, an olefin-based copolymer)), and an absorption intensity (B) of a peak around a wavelength of 1,695 cm$^{-1}$ derived from a carbonyl group in the isocyanurate ring ([absorption intensity (B)]/[absorption intensity (A)]) is 0.01 or more.

In addition, the thermoplastic elastomer composition of the present invention preferably further comprises a paraffin oil.

In addition, the thermoplastic elastomer composition of the present invention preferably further comprises a styrene block copolymer having no chemical-bond cross-linking moiety.

Meanwhile, a method for producing a thermoplastic elastomer composition of the present invention comprises:

a first step of mixing an elastomeric polymer having a cyclic acid anhydride group in a side chain, a clay, and an α-olefin-based resin having no chemical-bond cross-linking moiety together to obtain a mixture; and a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein the thermoplastic elastomer composition obtained in the second step is a composition comprising:

at least one elastomer component selected from the group consisting of elastomeric polymers (A) each of which
    has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

the clay, a content ratio of which is 20 parts by mass or less relative to 100 parts by mass of the elastomer component; and the α-olefin-based resin, and in the first step, the elastomeric polymer having a cyclic acid anhydride group in a side chain, the clay, and the α-olefin-based resin are mixed by using the clay at such a ratio that the amount of the clay contained in the thermoplastic elastomer composition is 20 parts by mass or less relative to 100 parts by mass of the elastomer component.

In the method for producing a thermoplastic elastomer composition of the present invention, the elastomeric polymer having a cyclic acid anhydride group in a side chain is preferably a maleic anhydride-modified elastomeric polymer.

Moreover, in the method for producing a thermoplastic elastomer composition of the present invention, it is preferable to use, as the compound (I) and/or (II), a compound that forms both a hydrogen-bond cross-linkable moiety and a covalent-bond cross-linking moiety upon a reaction with the cyclic acid anhydride group.

Moreover, in the method for producing a thermoplastic elastomer composition of the present invention, it is preferable to use, as the compound (I) and/or (II), at least one substituent selected from hydroxy groups, thiol groups, amino groups, and imino groups.

Advantageous Effects of Invention

According to the present invention, it is possible to provide a thermoplastic elastomer composition which can have sufficiently high levels of heat resistance and tensile strength at break, and a method for producing the same.

DESCRIPTION OF EMBODIMENTS

Hereinafter, the present invention will be described in detail based on preferred embodiments thereof.

[Thermoplastic Elastomer Composition]

A thermoplastic elastomer composition of the present invention comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay, a content ratio of which is 20 parts by mass or less relative to 100 parts by mass of the elastomer component; and an α-olefin-based resin having no chemical-bond cross-linking moiety.

(Elastomer Component)

The elastomer component is at least one selected from the group consisting of the above-described elastomeric polymers (A) and (B). In each of the elastomeric polymers (A) and (B), the "side chain" refers to a side chain and a terminal of the elastomeric polymer. In addition, "a side chain (a) containing a hydrogen-bond cross-linkable moiety having a carbonyl-containing group and/or a nitrogen-containing heterocycle" means that a carbonyl-containing group and/or a nitrogen-containing heterocycle (more preferably a carbonyl-containing group and a nitrogen-containing heterocycle) serving as a hydrogen-bond cross-linkable moiety is chemically stably bonded (covalently bonded) to an atom (generally, a carbon atom) forming a main chain of the elastomeric polymer. In addition, the "containing a hydrogen-bond cross-linkable moiety and a covalent-bond cross-linking moiety in a side chain" is a concept including a case where side chains of both a side chain having a hydrogen-bond cross-linkable moiety (hereinafter, sometimes referred to as "side chain (a')" for convenience) and a side chain having a covalent-bond cross-linking moiety (hereinafter, sometimes referred to as "side chain (b)" for convenience) are contained, so that the side chains of the polymer contain both a hydrogen-bond cross-linkable moiety and a covalent-bond cross-linking moiety, as well as a case where a side chain having both a hydrogen-bond cross-linkable moiety and a covalent-bond cross-linking moiety (a single side chain containing both a hydrogen-bond cross-linkable moiety and a covalent-bond cross-linking moiety therein: hereinafter, such a side chain is sometimes referred to as "side chain (c)" for convenience) is contained, so that the side chain of the polymer contain both a hydrogen-bond cross-linkable moiety and a covalent-bond cross-linking moiety.

The main chain (polymer forming a main chain portion) of each of the elastomeric polymers (A) and (B) may be generally a known natural polymer or a synthetic polymer, wherein the polymer has a glass-transition point of room temperature (25° C.) or lower (the main chain may be a so-called elastomer), and is not particularly limited. Accordingly, the elastomeric polymers (A) and (B) may be, for example, those which have an elastomeric polymer being a natural polymer, a synthetic polymer, or the like and having a glass-transition point of room temperature (25° C.) or lower as a main chain, and which contain a side chain (a) containing a hydrogen-bond cross-linkable moiety having a carbonyl-containing group and/or a nitrogen-containing heterocycle; those which have an elastomeric polymer being a natural polymer, a synthetic polymer, or the like and having a glass-transition point of room temperature (25° C.) or lower as a main chain, and which contain a side chain (a') having a hydrogen-bond cross-linkable moiety and a side chain (b) having a covalent-bond cross-linking moiety as side chains; those which have an elastomeric polymer being a natural polymer, a synthetic polymer, or the like and having a glass-transition point of room temperature (25° C.) or lower as a main chain, and which contain a side chain (c) containing both a hydrogen-bond cross-linkable moiety and a covalent-bond cross-linking moiety; or the like.

Examples of the main chains (polymers forming main chain portions) of these elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), as well as hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubbers; silicone rubbers; urethane rubbers; and the like.

The main chains of the elastomeric polymers (A) and (B) (polymers forming main chain portions) may also be those formed of an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

The main chains of the elastomeric polymers (A) and (B) are each preferably at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the main chains of the elastomeric polymers (A) and (B) are each preferably a hydrogenated product of a diene-based rubber or an olefin-based rubber from the viewpoint of the absence of a double bond susceptible to aging, and preferably a diene-based rubber from the viewpoints of the low cost and the high reactivity (the presence of many double bonds capable of an ene reaction with a compound such as maleic anhydride).

Moreover, the main chain of a polymer contained as each of the elastomer component is preferably an olefin-based copolymer from the viewpoints that the olefin-based copolymer tends to exert rubber elasticity due to low crystallinity and has no double bond susceptible to aging.

Moreover, the elastomeric polymers (A) and (B) may be liquid or solid, and the molecular weights thereof are not particularly limited. The molecular weights may be selected, as appropriate, according to the application for which the thermoplastic elastomer composition of the present invention is used, a required physical property, or the like.

When the flowability upon heating (de-cross-linking, or the like) of the thermoplastic elastomer composition of the present invention is important, the above-described elastomeric polymers (A) and (B) are preferably liquid. For example, when the main chain portion is a diene-based rubber such as isoprene rubber or butadiene rubber, the weight average molecular weight of the main chain portion is preferably 1,000 to 100,000 and is particularly preferably about 1,000 to 50,000 to make the elastomeric polymers (A) and (B) liquid.

On the other hand, when the strength of the thermoplastic elastomer composition of the present invention is important, the elastomeric polymers (A) and (B) are preferably solid. For example, when the main chain portion is a diene-based rubber such as isoprene rubber or butadiene rubber, the weight average molecular weight of the main chain portion is preferably 100,000 or higher, and particularly preferably about 500,000 to U.S. Pat. No. 1,500,000 to make the elastomeric polymers (A) and (B) solid.

The weight average molecular weight is a weight average molecular weight (in terms of polystyrene) measured by gel permeation chromatography (GPC). It is preferable to use tetrahydrofuran (THF) as a solvent for the measurement.

In the thermoplastic elastomer composition of the present invention, a mixture of two or more of the elastomeric polymers (A) and (B) can be used. In this case, the mixing ratio of the elastomeric polymers can be any according to the application for which the thermoplastic elastomer composition of the present invention is used, a required physical property, or the like.

In addition, the glass-transition points of the elastomeric polymers (A) and (B) are 25° C. or below as mentioned above. This is because when the glass-transition points of the elastomeric polymers are within this range, the thermoplastic elastomer composition of the present invention exhibits rubber-like elasticity at room temperature. Meanwhile, the "glass-transition point" in the present invention is a glass-transition point measured by differential scanning calorimetry (DSC). For the measurement, the rate of temperature rise is preferably 10° C./min.

The main chains of the elastomeric polymers (A) and (B) are preferably diene-based rubbers such as natural rubber (NR), isoprene rubber (IR), butadiene rubber (BR), 1,2-butadiene rubber, styrene-butadiene rubber (SBR), ethylene-propylene-diene rubber (EPDM), or butyl rubber (IIR); or olefin-based rubbers such as ethylene-propylene rubber (EPM), ethylene-acrylic rubber (AEM), or ethylene-butene rubber (EBM), because the resultant elastomeric polymers (A) and (B) have glass-transition points of 25° C. or below, and a formed article made of the obtained thermoplastic elastomer composition shows rubber-like elasticity at room temperature (25° C.). In addition, when an olefin-based rubber is used as the main chain of each of the elastomeric polymers (A) and (B), the obtained thermoplastic elastomer composition tends to have an improved tensile strength, and degradation of the composition tends to be suppressed more sufficiently because of the absence of double bonds.

The bound styrene content of the styrene-butadiene rubber (SBR) which can be used as the elastomeric polymers (A) and (B), the hydrogenation ratio of the hydrogenated elastomeric polymer which can be used as the elastomeric polymers (A) and (B), and the like are not particularly limited, and can be adjusted to any ratio according to the application for which the thermoplastic elastomer composition of the present invention is used, a physical property required for the composition, or the like.

In addition, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the degree of crystallinity therein is preferably less than 10% (more preferably 5 to 0%) especially from the viewpoint of expression of favorable rubber-like elasticity at room temperature. Moreover, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the ethylene content therein is preferably 10 to 90% by mole, and more preferably 30 to 90% by mole. The ethylene content within this range is preferable, because a thermoplastic elastomer (composition) formed therefrom is excellent in compression set and mechanical strengths, especially, tensile strength.

Further, the above-described elastomeric polymer (A) or (B) is preferably amorphous from the viewpoint of expression of favorable rubber-like elasticity at room temperature. Moreover, such elastomeric polymer (A) or (B) may be an elastomer partially having crystallinity (crystal structure), but even in this case, the degree of crystallinity is preferably less than 10% (particularly preferably 5 to 0%). Here, such a degree of crystallinity can be obtained in such a way that diffraction peaks are measured by using an X-ray diffraction instrument (for example, one manufactured by Rigaku Corporation under the trade name "MiniFlex 300") as a measurement instrument and an integral ratio between the scattering peaks derived from the crystalline and amorphous structures is calculated.

In addition, as described above, the above-described elastomeric polymers (A) and (B) have, as a side chain, at least one of a side chain (a) containing a hydrogen-bond cross-linkable moiety having a carbonyl-containing group and/or a nitrogen-containing heterocycle; a side chain (a') containing a hydrogen-bond cross-linkable moiety and a side chain (b) containing a covalent-bond cross-linking moiety; and a side chain (c) containing a hydrogen-bond cross-linkable moiety and a covalent-bond cross-linking moiety. Note that, in the present invention, the side chain (c) can also be regarded as a side chain functioning as a side chain (a') and also as a side chain (b). Each of the side chains is described below.

<Side Chain (a'): Side Chain Containing Hydrogen-Bond Cross-Linkable Moiety>

The side chain (a') containing a hydrogen-bond cross-linkable moiety may be any, and the structure thereof is not particularly limited, as long as the side chain has a group that can form a cross-linkage by a hydrogen bond (for example, a hydroxy group, a hydrogen-bond cross-linkable moiety contained in the side chain (a) described later, or the like), and forms a hydrogen bond on the basis of the group. Here, the hydrogen-bond cross-linkable moiety is a moiety through which polymer molecules (elastomer molecules) are cross-linked by a hydrogen bond. Note that the cross-linkage by a hydrogen bond is formed only when there are a hydrogen acceptor (a group containing an atom containing lone pair electrons, or the like) and a hydrogen donor (a group having a hydrogen atom covalently bonded to an atom having a high electronegativity, or the like). Hence, when both a hydrogen acceptor and a hydrogen donor are not present inside chains of elastomer molecules, no cross-linkage by a hydrogen bond is formed. For this reason, only when both a hydrogen acceptor and a hydrogen donor are present in side chains of elastomer molecules, a hydrogen-bond cross-linkable moiety can be considered to be present in the system. Note that, in the present invention, if both a portion that can functions as a hydrogen acceptor (for example, a carbonyl group or the like) and a portion that can functions as a hydrogen donor (for example, a hydroxy group or the like) are present in side chains of elastomer molecules, the portion that can functions as a hydrogen acceptor and the portion that can functions as a donor of the side chains are considered to be hydrogen-bond cross-linkable moieties.

The hydrogen-bond cross-linkable moiety in such a side chain (a') is preferably a hydrogen-bond cross-linkable moiety having a carbonyl-containing group and/or a nitrogen-containing heterocycle (a hydrogen-bond cross-linkable moiety contained in the side chain (a)), which will be described below, from the viewpoints of the formation of a stronger hydrogen bond and the like. Specifically, the side chain (a') is more preferably the side chain (a) described later. Moreover, from the same viewpoints, the hydrogen-bond cross-linkable moiety in the side chain (a') is more preferably a hydrogen-bond cross-linkable moiety having a carbonyl-containing group and a nitrogen-containing heterocycle.

<Side Chain (a): Side Chain Containing Hydrogen-Bond Cross-Linkable Moiety Having Carbonyl-Containing Group and/or Nitrogen-Containing Heterocycle>

The side chain (a) containing a hydrogen-bond cross-linkable moiety having a carbonyl-containing group and/or a nitrogen-containing heterocycle may be any, as long as the side chain (a) has a carbonyl-containing group and/or a nitrogen-containing heterocycle, and the other aspect of the structure are not particularly limited. The hydrogen-bond cross-linkable moiety more preferably has a carbonyl-containing group and a nitrogen-containing heterocycle.

The carbonyl-containing group is not particularly limited, as long as the group contains a carbonyl group. Specific examples thereof include amide, ester, imide, carboxy group, carbonyl group, and the like. The carbonyl-containing group may be a group introduced to the main chain (the polymer of the main chain portion) by using a compound capable of introducing a carbonyl-containing group to a main chain. The compound capable of introducing a carbonyl-containing group to a main chain is not particularly limited, and specific examples thereof include ketones, carboxylic acids, derivatives thereof, and the like.

Examples of the carboxylic acids include organic acids having saturated or unsaturated hydrocarbon groups, and the hydrocarbon groups may be any of aliphatic, alicyclic, or aromatic ones, and the like. Specific examples of the carboxylic acid derivatives include carboxylic anhydrides, amino acids, thiocarboxylic acids (mercapto group-containing carboxylic acids), esters, amino acids, ketones, amides, imides, dicarboxylic acids and their monoesters, and the like.

In addition, specific examples of the carboxylic acids, the derivatives thereof, and the like include carboxylic acids such as malonic acid, maleic acid, succinic acid, glutaric acid, phthalic acid, isophthalic acid, terephthalic acid, p-phenylenediacetic acid, p-hydroxybenzoic acid, p-aminobenzoic acid, and mercaptoacetic acid, as well as these carboxylic acids containing substituents; acid anhydrides such as succinic anhydride, maleic anhydride, glutaric anhydride, phthalic anhydride, propionic anhydride, and benzoic anhydride; aliphatic esters such as maleic acid esters, malonic acid esters, succinic acid esters, glutaric acid esters, and ethyl acetate; aromatic esters such as phthalic acid esters, isophthalic acid esters, terephthalic acid esters, ethyl-m-aminobenzoate, and methyl-p-hydroxybenzoate; ketones such as quinone, anthraquinone, and naphthoquinone; amino acids such as glycine, tyrosine, bicine, alanine, valine, leucine, serine, threonine, lysine, aspartic acid, glutamic acid, cysteine, methionine, proline, and N-(p-aminobenzoyl)-β-alanine; amides such as maleamide, maleamidic acid (maleicmonoamide), succinic monoamide, 5-hydroxyvaleramide, N-acetylethanolamine, N,N'-hexamethylene bis(acetamide), malonamide, cycloserine, 4-acetamidophenol, and p-acetamidebenzoic acid; imides such as maleimide and succinimide; and the like.

Of these examples, the compound capable of introducing a carbonyl group (carbonyl-containing group) is preferably a cyclic acid anhydride such as succinic anhydride, maleic anhydride, glutaric anhydride, or phthalic anhydride, and is particularly preferably maleic anhydride.

In addition, when the side chain (a) has a nitrogen-containing heterocycle, the structure or the like of the nitrogen-containing heterocycle is not particularly limited, as long as the nitrogen-containing heterocycle is introduced to the main chain directly or through an organic group. It is also possible to use, as the nitrogen-containing heterocycle, one containing a heteroatom other than a nitrogen atom, such as a sulfur atom, an oxygen atom, or a phosphorus atom, in the heterocycle, as long as a nitrogen atom is contained in the heterocycle. Here, the use of the nitrogen-containing heterocycle in the side chain (a) is preferable because the presence of the heterocycle structure results in a stronger hydrogen bond forming the cross-linkage, so that the obtained thermoplastic elastomer composition of the present invention has an improved tensile strength.

In addition, the above-described nitrogen-containing heterocycle may have a substituent, and examples of the substituent include alkyl groups such as a methyl group, an ethyl group, an (iso)propyl group, and a hexyl group; alkoxy groups such as a methoxy group, an ethoxy group, and an (iso)propoxy group; groups consisting of a halogen atom such as a fluorine atom, a chlorine atom, a bromine atom, or an iodine atom; a cyano group; an amino group; an aromatic hydrocarbon group; an ester group; an ether group; an acyl group; a thioether group; and the like, any ones of which can also be used in combination. The position of substitution of such a substituent is not particularly limited, and the number of such substituents is not limited.

Moreover, the above-described nitrogen-containing heterocycle may have aromatic properties, but does not necessarily have to have aromatic properties. A nitrogen-containing heterocycle having aromatic properties is preferable, because the obtained thermoplastic elastomer composition of the present invention is further improved in compression set and mechanical strength.

In addition, such a nitrogen-containing heterocycle is preferably, but not particularly limited to, a 5-membered ring or a 6-membered ring, from the viewpoints that the hydrogen bond becomes more strongly, and the compression set and the mechanical strength are further improved. Specific examples of the nitrogen-containing heterocycle include pyrrololine, pyrrolidone, oxindole (2-oxindole), indoxyl (3-oxindole), dioxindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine, cinnoline, pyrrole, pyrroline, indole, indoline, oxylindole, carbazole, phenothiazine, indolenine, isoindole, oxazole, triazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisoxazole, anthranyl, benzothiazole, benzofurazan, pyridine, quinoline, isoquinoline, acridine, phenanthridine, anthrazoline, naphthyridine, triazine, pyridazine, pyrimidine, quinazoline, quinoxaline, triazine, histidine, triazolidine, melamine, adenine, guanine, thymine, cytosine, hydroxyethyl isocyanurate, derivatives thereof, and the like. Of these examples, preferred examples of particularly the 5-membered nitrogen-containing rings include the compounds described below (cyclic structures represented by the chemical formulae), triazole derivatives represented by the following general formula (10), and imidazole derivatives represented by the following general formula (11). In addition, these may have the above-described various substituents, and may be subjected to hydrogen addition or elimination.

[Chem. 2]

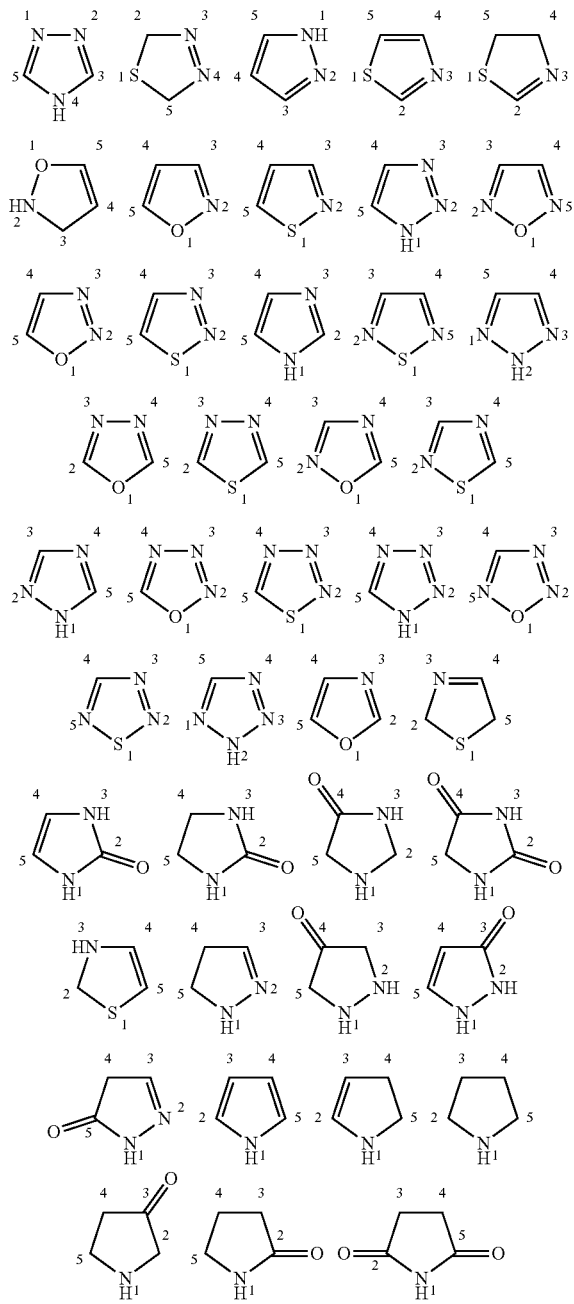

[Chem. 3]

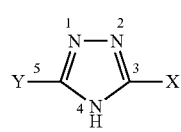
(10)

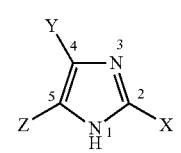
(11)

The substituents X, Y, and Z in the general formulae (10) and (11) are each independently a hydrogen atom, an alkyl group having 1 to 30 carbon atoms, an aralkyl group having 7 to 20 carbon atoms, an aryl group having 6 to 20 carbon atoms, or an amino group. Note that one of X and Y in the above-described general formula (10) is not a hydrogen atom, and similarly at least one of X, Y, and Z in the above-described general formula (11) is not a hydrogen atom.

In addition to a hydrogen atom and an amino group, specific examples of the substituents X, Y, and Z include, linear-chain alkyl groups such as a methyl group, an ethyl group, a propyl group, a butyl group, a pentyl group, an octyl group, a dodecyl group, and a stearyl group; branched alkyl groups such as an isopropyl group, an isobutyl group, a s-butyl group, a t-butyl group, an isopentyl group, a neopentyl group, a t-pentyl group, a 1-methylbutyl group, a 1-methylheptyl group, and a 2-ethylhexyl group; aralkyl groups such as a benzyl group and a phenethyl group; aryl groups such as a phenyl group, tolyl groups (o-, m-, and p-), a dimethylphenyl group, and a mesityl group; and the like.

Of these examples, the substituents X, Y, and Z are each preferably an alkyl group, especially, a butyl group, an octyl group, a dodecyl group, an isopropyl group, or a 2-ethylhexyl group, because the obtained thermoplastic elastomer composition of the present invention has good processability.

Meanwhile, preferred examples of the nitrogen-containing 6-membered rings include the compounds described below. These compounds may also have the above-described various substituents (for example, the substituents which may be possessed by the above-described nitrogen-containing heterocycles), or may also be subjected to hydrogen addition or hydrogen elimination.

[Chem. 4]

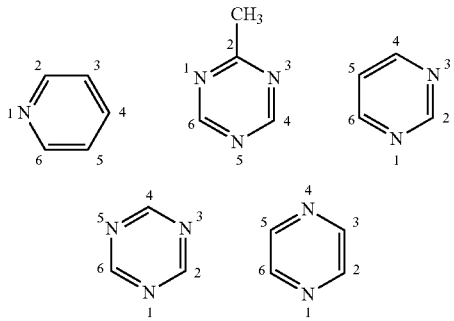

In addition, it is also possible to use condensation products of any one of the above-described nitrogen-containing heterocycles with a benzene ring or condensation products of any ones of the nitrogen-containing heterocycles, and specific preferred examples thereof include condensed rings shown below. These condensed rings may also have the above-described various substituents, and may also be subjected to addition or elimination of hydrogen atoms.

[Chem. 5]

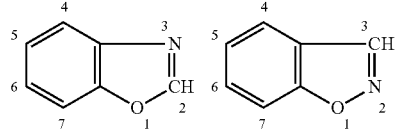

-continued

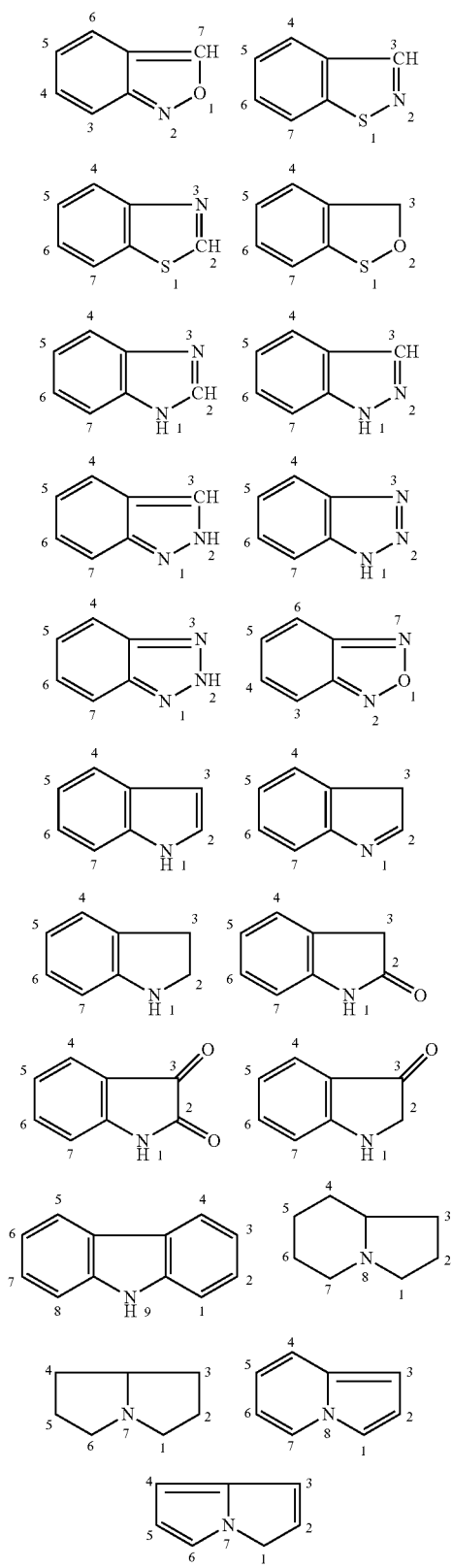

Among others, the nitrogen-containing heterocycle is preferably at least one selected from a triazole ring, an isocyanurate ring, a thiadiazole ring, a pyridine ring, an imidazole ring, a triazine ring, and a hydantoin ring, and is preferably at least one selected from a triazole ring, a thiadiazole ring, a pyridine ring, an imidazole ring, and a hydantoin ring, because the obtained thermoplastic elastomer composition of the present invention is excellent in recyclability, compression set, hardness, and mechanical strengths, especially, tensile strength.

In addition, when the side chain (a) contains both the above-described carbonyl-containing group and the above-described nitrogen-containing heterocycle, the above-described carbonyl-containing group and the above-described nitrogen-containing heterocycle may be introduced to the main chain as side chains independent from each other, and are preferably introduced to the main chain as a single side chain in which the above-described carbonyl-containing group and the above-described nitrogen-containing heterocycle are linked to each other through another group. Accordingly, as the side chain (a), it is preferable that a side chain containing a hydrogen-bond cross-linkable moiety having the above-described carbonyl-containing group and the above-described nitrogen-containing heterocycle be introduced to the main chain as a single side chain, and it is more preferable that a side chain containing a structural portion represented by the following general formula (1):

[Chem. 6]

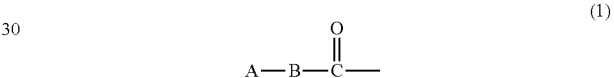

(1)

[in the formula (1), A is a nitrogen-containing heterocycle, and B is a single bond; an oxygen atom, an amino group represented by a formula NR' (R' is a hydrogen atom or an alkyl group having 1 to 10 carbon atoms), or a sulfur atom; or an organic group optionally containing any of the atoms or groups] be introduced to the main chain as a single side chain. Accordingly, the hydrogen-bond cross-linkable moiety of the side chain (a) preferably contains a structural portion represented by the above-described general formula (1).

Here, a specific example of the nitrogen-containing heterocycle A in the above-described formula (1) is any of the nitrogen-containing heterocycles listed above as the examples. In addition, a specific example of the substituent B in the above-described formula (1) is a single bond; an oxygen atom, a sulfur atom, or an amino group represented by the formula NR' (where R' is a hydrogen atom or an alkyl group having 1 to 10 carbon atoms) (hereinafter, an amino group represented by the formula NR' is simply referred to as "amino group NR'" for convenience); an alkylene or aralkylene group having 1 to 20 carbon atoms and optionally containing any of the atoms or groups; an alkylene ether group (an alkyleneoxy group, for example, —O—CH$_2$CH$_2$— group), an alkyleneamino group (for example, —NH—CH$_2$CH$_2$— group or the like), or an alkylene thioether group (an alkylenethio group, for example, —S—CH$_2$CH$_2$— group) having 1 to 20 carbon atoms and having any of the atoms or groups at a terminal; an aralkylene ether group (an aralkyleneoxy group), an aralkyleneamino group, or an aralkylene thioether group having 1 to 20 carbon atoms and having any of them at a terminal; or the like.

Here, examples of the alkyl group having 1 to 10 carbon atoms selectable as R' in the above amino group NR' include a methyl group, an ethyl group, a propyl group, a butyl group, a pentyl group, a hexyl group, a heptyl group, an octyl group, a nonyl group, a decyl group, isomers thereof, and the like. One serving as the substituent B in the above-described formula (1), i.e., any of the oxygen atom, the sulfur atom, and the amino group NR'; as well as the oxygen atoms, amino groups NR', and sulfur atoms in the alkylene ether group, alkyleneamino group, alkylene thioether group, aralkylene ether group, aralkyleneamino group, aralkylene thioether group having 1 to 20 carbon atoms and having any of the atoms or groups at a terminal, preferably forms a conjugated system, such as an ester group, an amide group, an imide group, or a thioester group, in combination with the adjacent carbonyl group.

Of these examples, the substituent B is preferably an oxygen atom, sulfur atom, or amino group forming a conjugated system; or an alkylene ether group, an alkyleneamino group, or an alkylene thioether group having 1 to 20 carbon atoms, having any of the atoms or groups at a terminal, and forming a conjugated system, and particularly preferably an amino group (NH), an alkyleneamino group (—NH—CH$_2$— group, —NH—CH$_2$CH$_2$— group, or —NH—CH$_2$CH$_2$CH$_2$— group), an alkylene ether group (—O—CH$_2$— group, —O—CH$_2$CH$_2$— group, or —O—CH$_2$CH$_2$CH$_2$— group).

In addition, when the side chain (a) is a side chain containing a hydrogen-bond cross-linkable moiety having the above-described carbonyl-containing group and the above-described nitrogen-containing heterocycle, the hydrogen-bond cross-linkable moiety having the above-described carbonyl-containing group and the above-described nitrogen-containing heterocycle is more preferably a single side chain represented by the following formula (2) or (3), which is introduced to the main chain of the above-described polymer at the α position or β, position of the side chain.

[Chem. 7]

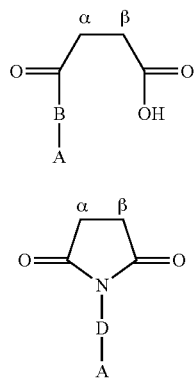

[In the formula, A is a nitrogen-containing heterocycle, B and D are each independently a single bond; an oxygen atom, an amino group NR' (where R' is a hydrogen atom or an alkyl group having 1 to 10 carbon atoms), or a sulfur atom; or an organic group optionally containing any of the atoms or groups.]

Here, the nitrogen-containing heterocycle A is basically the same as the nitrogen-containing heterocycle A of the above-described formula (1), and the substituents B and D are each independently basically the same as the substituent B in the above-described formula (1). Note that, among the examples listed for the substituent B in the above-described formula (1), the substituent D in the above-described formula (3) is preferably a single bond; an alkylene or aralkylene group having 1 to 20 carbon atoms, optionally containing an oxygen atom, a nitrogen atom, or a sulfur atom, and forming a conjugated system, and is particularly preferably a single bond. Specifically, it is preferable to form an alkyleneamino group or an aralkyleneamino group having 1 to 20 carbon atoms and optionally containing an oxygen atom, a nitrogen atom, or a sulfur atom, together with the imide nitrogen of the above-described formula (3), and it is particularly preferable that the nitrogen-containing heterocycle be directly bonded (through a single bond) to the imide nitrogen of the above-described formula (3). Specific examples of the above-described substituent D include a single bond; the above-described alkylene ether, aralkylene ether group, or the like having 1 to 20 carbon atoms and having an oxygen atom, a sulfur atom, or an amino group at a terminal; a methylene group, an ethylene group, a propylene group, a butylene group, a hexylene group, a phenylene group, and a xylylene group, isomers thereof, and the like.

In addition, when the side chain (a) is a side chain containing a hydrogen-bond cross-linkable moiety having the above-described carbonyl-containing group and the above-described nitrogen-containing heterocycle, the hydrogen-bond cross-linkable moiety of the side chain (a) preferably contains a structural portion represented by the following general formula (101):

[Chem. 8]

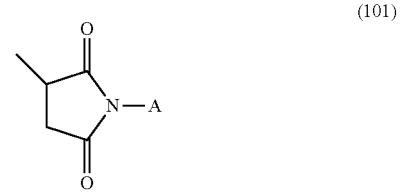

[in the formula (101), A is a nitrogen-containing heterocycle]. The nitrogen-containing heterocycle A in the formula (101) is basically the same as the nitrogen-containing heterocycle A of the above-described formula (1). In addition, from the viewpoints of high modulus and high strength at break, the hydrogen-bond cross-linkable moiety of the side chain (a) is more preferably one having the structure represented by the following general formula (102):

[Chem. 9]

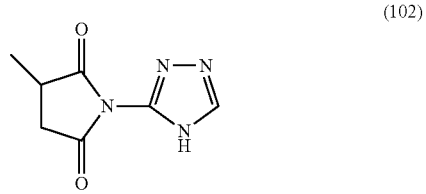

Moreover, the side chain (a) is particularly preferably a group represented by the above-described general formula (102).

The ratio of the above-described carbonyl-containing group to the above-described nitrogen-containing heterocycle of the above-described thermoplastic elastomer is preferably, but not particularly limited to, 2:1, because complementary interaction is more likely to be created, and because such a thermoplastic elastomer is easy to produce.

The side chain (a) containing a hydrogen-bond cross-linkable moiety having a carbonyl-containing group and/or a nitrogen-containing heterocycle is preferably introduced at a ratio (introduction ratio) of 0.1 to 50% by mole, and more preferably introduced at a ratio of 1 to 30% by mole, relative to 100% by mole of the main chain portion. If the introduction ratio of the side chain (a) is lower than 0.1% by mole, the tensile strength upon the cross-linking may be insufficient in some cases. Meanwhile, if the introduction ratio exceeds 50% by mole, the cross-linking density increases, so that the rubber elasticity may be lost in some cases. Specifically, it is preferable that the introduction ratio be within the above-described range, because the interaction between side chains of the above-described thermoplastic elastomer leads to efficient formation of cross-linkages between molecules, so that the tensile strength is high upon cross-linking, and the recyclability is excellent.

When a side chain (a-i) containing a hydrogen-bond cross-linkable moiety having the above-described carbonyl-containing group and a side chain (a-ii) containing a hydrogen-bond cross-linkable moiety having the above-described nitrogen-containing heterocycle are each independently introduced as the side chain (a), the above-described introduction ratio is calculated by taking a set of the side chain (a-i) containing a carbonyl-containing group and the side chain (a-ii) containing a nitrogen-containing heterocycle as a single side chain (a) based on the ratio between these side chains. Note that when any one of the side chains (a-i) and (a-ii) is in excess, the above-described introduction ratio can be obtained based on the excessive side chain.

In addition, for example, when the main chain portion is ethylene-propylene rubber (EPM), the above-described introduction ratio is such that the amount of monomers to which the side chain portion is introduced is about 0.1 to 50 units per 100 ethylene and propylene monomer units.

In addition, the side chain (a) is preferably a side chain (a) introduced as a side chain of a polymer by using, as a polymer (elastomeric polymer-forming material) which forms the main chain after reaction, a polymer (an elastomeric polymer having a cyclic acid anhydride group in a side chain) having a cyclic acid anhydride group (more preferably a maleic anhydride group) as a functional group, and reacting the functional group (cyclic acid anhydride group) with a compound (a compound capable of introducing a nitrogen-containing heterocycle) that forms a hydrogen-bond cross-linkable moiety upon a reaction with the cyclic acid anhydride group, to form a hydrogen-bond cross-linkable moiety. The compound capable of introducing a nitrogen-containing heterocycle may be one of the nitrogen-containing heterocycles listed as examples above itself, or may be a nitrogen-containing heterocycle having a substituent (for example, a hydroxy group, a thiol group, an amino group, or the like) that reacts with a cyclic acid anhydride group such as maleic anhydride.

Here, the position at which the nitrogen-containing heterocycle is bonded in the side chain (a) is described. Note that the nitrogen heterocycle is referred to as a "nitrogen-containing n-membered ring compound (n≥3)" for convenience.

The bonding positions ("positions 1 to n") described below are based on the IUPAC nomenclature. For example, in a case of a compound having three nitrogen atoms having unshared electron pairs, the bonding position is determined according to the order based on the IUPAC nomenclature. Specifically, the bonding positions are shown in the 5-membered, 6-membered, and condensed nitrogen-containing heterocycles listed as examples above.

In the side chain (a), the bonding position of the nitrogen-containing n-membered ring compound which is bonded to the copolymer directly or through an organic group is not particularly limited, and may be any bonding position (position 1 to position n). Preferably, the bonding position is position 1 or position 3 to position n of the nitrogen-containing n-membered ring compound.

When the nitrogen-containing n-membered ring compound contains one nitrogen atom (for example, a pyridine ring or the like), position 3 to position (n−1) are preferable, because intramolecular chelate formation easily occurs, and the composition formed therefrom is excellent in physical properties such as tensile strength. By the selection of the bonding position of the nitrogen-containing n-membered ring compound, the elastomeric polymer tends to easily undergo cross-linking among molecules of the elastomeric polymer by hydrogen bonds, ionic bonding, coordinate bonds, or the like, and tends to be excellent in recyclability and excellent in mechanical properties, especially, tensile strength.

<Side Chain (b): Side Chain Containing Covalent-Bond Cross-Linking Moiety>

In the present description, the "side chain (b) containing a covalent-bond cross-linking moiety" means that a covalent-bond cross-linking moiety is chemically stably bonded (covalently bonded) to an atom (generally, a carbon atom) forming the main chain of an elastomeric polymer. Here, the side chain (b) is one containing a covalent-bond cross-linking moiety. Note that when the side chain (b) further has a group capable of forming a hydrogen bond to form a cross-linkage by a hydrogen bond between side chains, while having the covalent-bonding moiety, such a side chain (b) is used as a side chain (c) described later (note that, when both a hydrogen donor and a hydrogen acceptor, which allow the formation of a hydrogen bond between side chains of the elastomer, are not contained, for example, when only a side chain simply containing an ester group (—COO—) is present in the system, such a group does not function as the hydrogen-bond cross-linkable moiety, because two ester groups (—COO—) do not form a hydrogen bond. Meanwhile, for example, when each side chain of the elastomer contains a structure having both a moiety serving as a hydrogen donor and a moiety serving as a hydrogen acceptor in a hydrogen bond, such as a carboxy group or a triazole ring, a hydrogen bond is formed between the side chains of the elastomer, and hence a hydrogen-bond cross-linkable moiety is considered to be contained. In addition, for example, when an ester group and a hydroxy group are coexistent in side chains of an elastomer, and these groups form a hydrogen bond between the side chains, the moiety forming the hydrogen bond serves as a hydrogen-bond cross-linkable moiety. For this reason, the side chain (b) may be used as the side chain (c) in some cases depending on the structure of the side chain (b) itself, the structure of the side chain (b) and the type of the substituent of another side chain, or the like). In addition, the "covalent-bond cross-linking moiety" used herein is a moiety which cross-links polymer molecules (elastomer molecules) to each other by a covalent bond.

The side chain (b) containing a covalent-bond cross-linking moiety is not particularly limited, and is preferably, for example, one containing a covalent-bond cross-linking moiety formed by a reaction of an elastomeric polymer having a functional group in a side chain (the polymer for forming a main chain portion) with a compound that forms a covalent-bond cross-linking moiety upon a reaction with the functional group (a compound that forms a covalent bond). The cross-linkage at the covalent-bond cross-linking moiety of the side chain (b) is preferably formed by at least one bond selected from the group consisting of amide, ester, lactone, urethane, ether, thiourethane, and thioether. For this reason, the functional group of the polymer constituting the main chain is preferably a functional group capable of forming at least one bond selected from the group consisting of amide, ester, lactone, urethane, ether, thiourethane, and thioether.

Examples of the "compound that forms a covalent-bond cross-linking moiety (the compound that forms a covalent bond)" include polyamine compounds having two or more amino and/or imino groups in one molecule (when both amino and imino groups are present, the total number of these groups is two or more); polyol compounds having two or more hydroxy groups in one molecule; polyisocyanate compounds having two or more isocyanate (NCO) groups in one molecule; polythiol compounds having two or more thiol groups (mercapto groups) in one molecule; polyepoxy compounds having two or more epoxy groups in one molecule; polycarboxy compounds having two or more carboxy groups in one molecule; polyalkoxysilyl compounds having two or more alkoxysilyl groups in one molecule; and the like. The "compound that forms a covalent-bond cross-linking moiety (the compound that forms a covalent bond)" herein can be a compound capable of introducing both the hydrogen-bond cross-linkable moiety and the covalent-bond cross-linking moiety depending on the type of the substituent contained in the compound, the degree of the progress of a reaction in a case where the reaction is carried out by using such compound, or the like (for example, when a covalent bond cross-linking moiety is formed by using a compound having three or more hydroxy groups, two of the hydroxy groups react with a functional group of an elastomeric polymer having the functional group in side chains, and the remaining one hydroxy group is left as a hydroxy group in some cases depending on the degree of the progress of the reaction, and in this case, a moiety that can form a hydrogen-bond cross-linking can also be introduced). For this reason, "compounds that each form a covalent-bond cross-linking moiety (compounds that each forms a covalent bond)" listed as examples herein also include "compounds that each form both a hydrogen-bond cross-linkable moiety and a covalent-bond cross-linking moiety." From such a viewpoint, in the case of forming the side chain (b), the side chain (b) may be formed by selecting a compound from the "compounds that each form a covalent-bond cross-linking moiety (compounds that each form a covalent bond)" according to a target design, as appropriate, controlling the degree of the progress of the reaction, as appropriate, or doing the like. Note that when the compound that forms a covalent-bond cross-linking moiety has a heterocycle, it is possible to also simultaneously produce a hydrogen-bond cross-linkable moiety more efficiently, and it is possible to efficiently form a side chain having a covalent-bond cross-linking moiety as the side chain (c) described later. For this reason, specific examples of such compounds each having a heterocycle are described especially together with the side chain (c) as preferred compounds for producing the side chain (c). Note that because of its structure, the side chain (c) can also be regarded as a preferred mode of side chains such as the side chain (a) and the side chain (b).

Examples of the polyamine compound usable as the "compound that forms a covalent-bond cross-linking moiety (the compound that forms a covalent bond)" include alicyclic amines, aliphatic polyamines, aromatic polyamines, nitrogen-containing heterocyclic amines, and the like shown below.

Specific examples of the alicyclic amines include 1-amino-3-aminomethyl-3,5,5-trimethylcyclohexane, bis-(4-aminocyclohexyl)methane, diaminocyclohexane, di-(aminomethyl)cyclohexane, and the like.

In addition, examples of the aliphatic polyamines include, but are not particularly limited to, methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethylbis(hexamethylene)triamine, and the like.

Examples of the aromatic polyamines and the nitrogen-containing heterocyclic amines include, but are not particularly limited to, diaminotoluene, diaminoxylene, tetramethylxylylenediamine, tris(dimethylaminomethyl)phenol, m-phenylenediamine, diaminodiphenylmethane, diaminodiphenyl sulfone, 3-amino-1,2,4-triazole, and the like.

In addition, one or more hydrogen atoms in each of the polyamine compounds may be substituted by an alkyl group, an alkylene group, an aralkylene group, an oxy group, an acyl group, a halogen atom, or the like, or the skeleton of each polyamine compound may contain a heteroatom such as an oxygen atom or a sulfur atom.

In addition, one of the polyamine compounds may be used alone, or two or more thereof may be used in combination. When two or more thereof are used in combination, the mixing ratio can be adjusted to any ratio according to the application for which the thermoplastic elastomer (composition) of the present invention is used, or physical properties required for the thermoplastic elastomer (composition) of the present invention, and the like.

Among the polyamine compounds listed as examples above, hexamethylenediamine, N,N'-dimethyl-1,6-hexanediamine, diaminodiphenylsulfone, and the like are preferable, because they provide high effects of improvement in compression set and mechanical strengths, especially, tensile strength.

The molecular weights or skeletons of the polyol compounds are not particularly limited, as long as the polyol compounds have two or more hydroxy groups. Examples of the polyol compounds include polyether polyols, polyester polyols, and other polyols shown below, mixed polyols thereof, and the like.

Specific examples of the polyether polyols include polyols each obtained by addition of at least one selected from ethylene oxide, propylene oxide, butylene oxide, and styrene oxide to at least one selected from polyols such as ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; polyoxytetramethylene oxide; and the like. One of these polyether polyols may be used alone, or two or more thereof may be used in combination.

Specific examples of the polyester polyols include condensation polymers of one, two, or more low-molecular weight polyols such as ethylene glycol, propylene glycol, butanediol, pentanediol, hexanediol, cyclohexanedimethanol, glycerin, 1,1,1-trimethylolpropane, and others with one, two, or more low-molecular weight carboxylic acids or oligomeric acids such as glutaric acid, adipic acid, pimelic acid, suberic acid, sebacic acid, terephthalic acid, isophthalic acid, dimer acids, and others; ring-opening polymers of propiolactone, valerolactone, and the like; and the like. One of these polyester polyols may be used alone, or two or more thereof may be used in combination.

Specific examples of the other polyols include polymer polyols, polycarbonate polyols; polybutadiene polyols; hydrogenated polybutadiene polyols; acrylic polyols; low-molecular weight polyols such as ethylene glycol, diethylene glycol, propylene glycol, dipropylene glycol, butanediol, pentanediol, hexanediol, polyethylene glycol laurylamine (for example, N,N-bis(2-hydroxyethyl) laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine); and the like. One of these polyols may be used alone, or two or more thereof may be used in combination.

Examples of the polyisocyanate compounds include diisocyanate compounds including aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), and 1,5-naphthalene diisocyanate (NDI), aliphatic polyisocyanates such as hexamethylene diisocyanate (HDI), trimethylhexamethylene diisocyanate (TMHDI), lysine diisocyanate, and norbornane diisocyanatomethyl (NBDI), alicyclic polyisocyanates such as trans-cyclohexane-1,4-diisocyanate, isophorone diisocyanate (IPDI), $H_6XDI$ (hydrogenated XDI), $H_{12}MDI$ (hydrogenated MDI), and $H_6TDI$ (hydrogenated TDI), and the like; polyisocyanate compounds such as polymethylene polyphenylene polyisocyanate; carbodiimide-modified polyisocyanates of these isocyanate compounds; isocyanurate-modified polyisocyanate of these isocyanate compounds; urethane prepolymers obtained by reactions of these isocyanate compounds with the polyol compounds listed as examples above; and the like. One of these polyisocyanate compounds may be used alone, or two or more thereof may be used in combination.

The molecular weight, the skeleton, or the like of each of the polythiol compounds is not particularly limited, as long as the polythiol compounds have two or more thiol groups. Specific examples of the polythiol compounds include methanedithiol, 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propadithiol, toluene-3,4-dithiol, 3,6-dichloro-1,2-benzenedithiol, 1,5-naphthalenedithiol, 1,2-benzenedimethanethiol, 1,3-benzenedimethanethiol, 1,4-benzenedimethanethiol, 4,4'-thiobisbenzenethiol, 2,5-dimercapto-1,3,4-thiadiazole, 1,8-dimercapto-3,6-dioxaoctane, 1,5-dimercapto-3-thiapentane, 1,3,5-triazine-2,4,6-trithiol (trimercapto-triazine), 2-di-n-butylamino-4,6-dimercapto-s-triazine, trimethylolpropane tris(β-thiopropionate), trimethylolpropane tris(thioglycollate), polythiols (THIOKOL or thiol-modified polymers (resins, rubbers, and the like)), tris-[(3-mercaptopropionyloxy)-ethyl] isocyanurate, and the like. One of these polythiol compounds may be used alone, or two or more thereof may be used in combination.

In addition, the molecular weights, skeletons, and so on of the aforementioned polyepoxy compounds are not particularly limited, as long as the polyepoxy compounds have two or more epoxy groups. Specific examples of the polyepoxy compounds include bisphenol A diglycidyl ether (bisphenol A type epoxy resin), bisphenol F diglycidyl ether (bisphenol F type epoxy resin), 3,4-epoxycyclohexyl methyl-3'4'-epoxycyclohexane carboxylate, DCPD type epoxy resin, epoxy novolac resin, orthocresol novolac type epoxy resin, and one of these compounds may be used alone or two or more thereof may be used in combination.

Moreover, the molecular weights, skeletons, and so on of the aforementioned polycarboxy compounds are not particularly limited, as long as the polycarboxy compounds have two or more carboxy groups. Specific examples of the polycarboxy compounds include oxalic acid, malonic acid, succinic acid, glutaric acid, adipic acid, pimelic acid, suberic acid, azelaic acid, sebacic acid, phthalic acid, isophthalic acid, terephthalic acid, propanetricarboxylic acid, and benzenetricarboxylic acid, and one of these compounds may be used alone or two or more thereof may be used in combination.

Moreover, the molecular weights, skeletons, and so on of the aforementioned polyalkoxysilyl compounds are not particularly limited, as long as the polyalkoxysilyl compounds have two or more alkoxysilyl groups. Specific examples of the polyalkoxysilyl compounds include tris(trimethoxysilylpropyl) isocyanurate, bis(triethoxysilylpropyl)tetrasulfide, 1,6-bis(trimethoxysilyl)hexane, and bis[3-(trimethoxysilyl)propyl]amine, and one of these compounds may be used alone or two or more thereof may be used in combination.

A functional group which is contained in the polymer constituting the main chain, and which reacts with the "compound that forms a covalent-bond cross-linking moiety (compound that forms a covalent bond)" is preferably a functional group which can create (generate: form) at least one bond selected from the group consisting of amide, ester, lactone, urethane, thiourethane, and thioether. Preferred examples of such functional group include cyclic acid anhydride groups, hydroxy groups, amino groups, carboxy groups, isocyanate groups, thiol groups, and the like.

Note that the elastomeric polymer (B) having the side chain (b) has, in a portion of the side chain (b), at least one cross-linkage at the covalent-bond cross-linking moiety, specifically, at least one cross-linkage by a covalent bond formed by a reaction of the functional group with the above-described "compound that forms a covalent-bond cross-linking moiety (compound that forms a covalent bond)" in one molecule. Particularly when the cross-linking is formed by at least one bond selected from the group consisting of lactone, urethane, ether, thiourethane, and thioether, the elastomeric polymer (B) preferably has two or more cross-linkages, more preferably 2 to 20 cross-linkages, and further preferably 2 to 10 cross-linkages.

In addition, the cross-linkage at the covalent-bond cross-linking moiety of the side chain (b) preferably contains a tertiary amino bond (—N═) or an ester bond (—COO—), because the compression set and the mechanical strengths (elongation at break and strength at break) of the obtained thermoplastic elastomer (composition) can be improved more easily. Note that, in this case, when an elastomer having a side chain containing a group capable of forming a hydrogen bond with the tertiary amino bond (—N═) or the ester bond (—COO—) is contained (for example, in a case where another elastomer having a side chain containing a hydroxy group or the like is present, or other cases), the covalent-bond cross-linking moiety can function as a side chain (c) described later. For example, in a case of an elastomeric polymer (B) having the side chain (a) as the side chain (a') (i.e., in a case where the elastomeric polymer (B) is an elastomeric polymer having both the side chains (a) and (b)), when the cross-linkage at the covalent-bond cross-linking moiety has the tertiary amino bond and/or the ester bond, these groups and groups in the side chain (a) (side chain having a carbonyl-containing group and/or a nitrogen-containing heterocycle) presumably form hydrogen bonds (interact with each other), making it possible to further improve the cross-linking density. Note that from the viewpoint of forming the side chain (b) having a structure containing a tertiary amino bond (—N═) or an ester bond (—COO—), the "compound that forms a covalent-bond cross-linking moiety (compound that forms a covalent bond)" is preferably polyethylene glycol laurylamine (for example, N,N-bis(2-hydroxyethyl) laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), or polypropylene glycol stearylamine (for example, N,N-bis(2-methyl-2-hydroxyethyl)stearylamine), among those listed as examples above.

Note that even when the above-described compound that forms a covalent-bond cross-linking moiety (compound that forms a covalent bond) is used, a hydrogen-bond cross-linkable moiety is also introduced in some cases, depending on the degree of the progress of the reaction, the type of substituent, the stoichiometric ratio of the raw materials used, and the like. Hence, preferred structures of the covalent-bond cross-linking moiety are described together with preferred structures of a covalent-bond cross-linking moiety in the side chain (c).

<Side Chain (c): Side Chain Containing Both Hydrogen-Bond Cross-Linkable Moiety and Covalent-Bond Cross-Linking Moiety>

The side chain (c) contains both a hydrogen-bond cross-linkable moiety and a covalent-bond cross-linking moiety in a single side chain. The hydrogen-bond cross-linkable moiety contained in the side chain (c) is the same as the hydrogen-bond cross-linkable moiety described for the side chain (a'), and preferred ones thereof are the same as those for the hydrogen-bond cross-linkable moiety in the side chain (a). In addition, as the covalent-bond cross-linking moiety contained in the side chain (c), the same covalent-bond cross-linking moiety as that in the side chain (b) can be used (the same cross-linkages can be used as preferred cross-linkage thereof).

The side chain (c) is preferably one formed by a reaction of an elastomeric polymer having a functional group in a side chain (the polymer for forming a main chain portion) with a compound that forms both a hydrogen-bond cross-linkable moiety and a covalent-bond cross-linking moiety upon a reaction with the functional group (a compound that introduces both a hydrogen-bond cross-linkable moiety and a covalent-bond cross-linking moiety). The compound that forms both a hydrogen-bond cross-linkable moiety and a covalent-bond cross-linking moiety (compound that introduces both a hydrogen-bond cross-linkable moiety and a covalent-bond cross-linking moiety) is preferably a compound that has a heterocycle (particularly preferably a nitrogen-containing heterocycle) and is capable of forming a covalent-bond cross-linking moiety (a compound that forms a covalent bond), and, especially, the compound is more preferably a heterocycle-containing polyol, a heterocycle-containing polyamine, a heterocycle-containing polythiol, or the like.

Note that, as the heterocycle-containing polyols, polyamines, and polythiols, it is possible to use, as appropriate, the same polyols, polyamines, and polythiols described for the above-described "compound capable of forming a covalent-bond cross-linking moiety (compound that forms a covalent bond)," except that a heterocycle (particularly preferably a nitrogen-containing heterocycle) is present. In addition, examples of the heterocycle-containing polyols include, but are not particularly limited to, bis or tris(2-hydroxyethyl)isocyanurate, Kojic acid, dihydroxydithiane, and tris(hydroxyethyl)triazine. Meanwhile, examples of the heterocycle-containing polyamines include, but are not particularly limited to, acetoguanamine, piperazine, bis(aminopropyl)piperazine, benzoguanamine, and melamine. Moreover, examples of the heterocycle-containing polythiols include dimercaptothiadiazole, and tris-[(3-mercaptopropionyloxy)-ethyl] isocyanurate. Accordingly, the side chain (c) is preferably one obtained by a reaction of an elastomeric polymer having a functional group in a side chain (the polymer for forming a main chain portion) with a heterocyclic-containing polyol, polyamine, or polythiol, or the like.

Note that the functional group of the polymer constituting a main chain that reacts with the "compound that forms both a hydrogen-bond cross-linkable moiety and a covalent-bond cross-linking moiety (the compound that introduces both a hydrogen-bond cross-linkable moiety and a covalent-bond cross-linking moiety)" is preferably a functional group capable of forming at least one bond selected from the group consisting of amide, ester, lactone, urethane, thiourethane, and thioether. Preferred examples of such a functional group include a cyclic acid anhydride group, a hydroxy group, an amino group, a carboxy group, an isocyanate group, a thiol group, and the like.

In addition, the elastomeric polymer (B) having the side chain (c) has at least one cross-linkage at the covalent-bond cross-linking moiety in a portion of the side chain (c) in one molecule. Especially when the cross-linking is formed by at least one bond selected from the group consisting of lactone, urethane, ether, thiourethane, and thioether, the elastomeric polymer (B) has preferably two or more cross-linkages, more preferably 2 to 20 cross-linkages, and further preferably 2 to 10 cross-linkages. In addition it is preferable that the cross-linkage at the covalent-bond cross-linking moiety of the side chain (c) contain a tertiary amino bond (—N═) or an ester bond (—COO—), because the compression set and the mechanical strengths (elongation at break and strength at break) of the obtained thermoplastic elastomer (composition) are further improved.

(Regarding Structures Preferred as Covalent-Bond Cross-Linking Moieties in Side Chains (b) and (c))

Regarding the side chains (b) and/or (c), suppose a case where the cross-linkage at the covalent-bond cross-linking moiety contains a tertiary amino bond (—N═) or an ester bond (—COO—), and the binding site of such a bond also functions as a hydrogen-bond cross-linkable moiety. Such a case is preferable because the compression set and the mechanical strengths (elongation at break and strength at break) of the obtained thermoplastic elastomer (composition) are improved to higher levels. When a tertiary amino bond (—N═) or an ester bond (—COO—) in a side chain having a covalent-bond cross-linking moiety forms a hydrogen bond with another side chain as described above, the covalent-bond cross-linking moiety containing a tertiary amino bond (—N═) or an ester bond (—COO—) also comprises a hydrogen-bond cross-linkable moiety, and can function as the side chain (c).

Suppose, for example, a case where the elastomeric polymer (B) has the side chain (a) as the side chain (a'), and has a covalent-bond cross-linking moiety containing the tertiary amino bond and/or the ester bond. In such a case, when the tertiary amino bond and/or the ester bond forms a hydrogen bond (interacts) with a group in the side chain (a), the cross-linking density can be further improved, presumably. Here, preferred examples of the compound that can form a covalent-bond cross-linking moiety containing the tertiary amino bond and/or the ester bond upon a reaction with a functional group of the polymer constituting a main chain (compound capable of forming both a hydrogen-bond cross-linkable moiety and a covalent-bond cross-linking moiety) include polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine).

The above-described cross-linkage at the covalent-bond cross-linking moiety in the side chain (b) and/or the side chain (c) is preferably one containing at least one structure represented by any one of the following general formulae (4) to (6), and is more preferably one in which G in the formulae contains a tertiary amino bond or an ester bond (note that when a structure shown below contains a hydrogen-bond cross-linkable moiety, the side chain having the structure is used as a side chain (c)).

[Chem. 10]

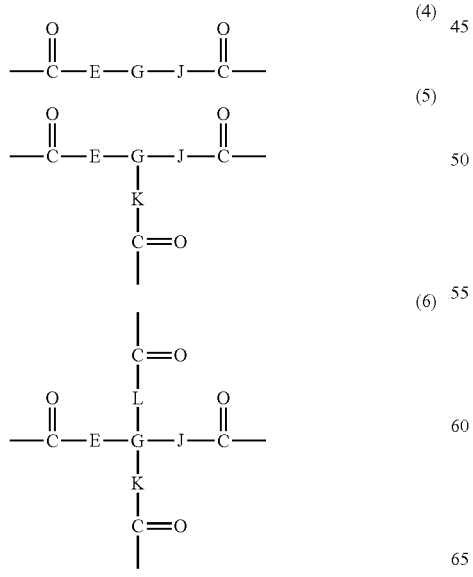

In the above-described general formulae (4) to (6), E, J, K, and L are each independently a single bond; an oxygen atom, an amino group NR' (where R' is a hydrogen atom or an alkyl group having 1 to 10 carbon atoms), or a sulfur atom; or an organic group optionally containing any of the atoms or groups, and G is a linear-chain, branched-chain, or cyclic hydrocarbon group having 1 to 20 carbon atoms and optionally containing an oxygen atom, a sulfur atom, or a nitrogen atom.

Here, the substituents E, J, K, and L are each independently basically the same as the substituent B in the above-described general formula (1).

In addition, examples of the substituent G include alkylene groups such as a methylene group, an ethylene group, a 1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, a 1,11-undecylene group, and a 1,12-dodecylene group; N,N-diethyldodecylamine-2,2'-diyl, N,N-dipropyldodecylamine-2,2'-diyl, N,N-diethyloctylamine-2,2'-diyl, N,N-dipropyloctylamine-2,2'-diyl, N,N-diethylstearylamine-2,2'-diyl, and N,N-dipropylstearylamine-2,2'-diyl; a vinylene group; divalent alicyclic hydrocarbon groups such as a 1,4-cyclohexene group; divalent aromatic hydrocarbon groups such as a 1,4-phenylene group, a 1,2-phenylene group, a 1,3-phenylene group, and a 1,3-phenylenebis(methylene) group; trivalent hydrocarbon groups such as propane-1,2,3-triyl, butane-1,3,4-triyl, trimethylamine-1,1',1''-triyl, and triethylamine-2,2',2''-triyl; trivalent cyclic hydrocarbons containing an oxygen atom, a sulfur atom, or a nitrogen atom such as an isocyanurate group and a triazine group; tetravalent hydrocarbon groups represented by the following formulae (12) and (13); substituents formed by combining any ones of them; and the like. In addition, the substituents G in these formulae each preferably have a structure of an isocyanurate group (isocyanurate ring) from the viewpoints of achieving high heat resistance and high strength thanks to hydrogen bonds. More specifically, the substituents G in these formulas are preferably groups represented by the following general formula (111) and groups represented by the following general formula (112) from the viewpoints of achieving high heat resistance and high strength thanks to hydrogen bonds.

[Chem. 11]

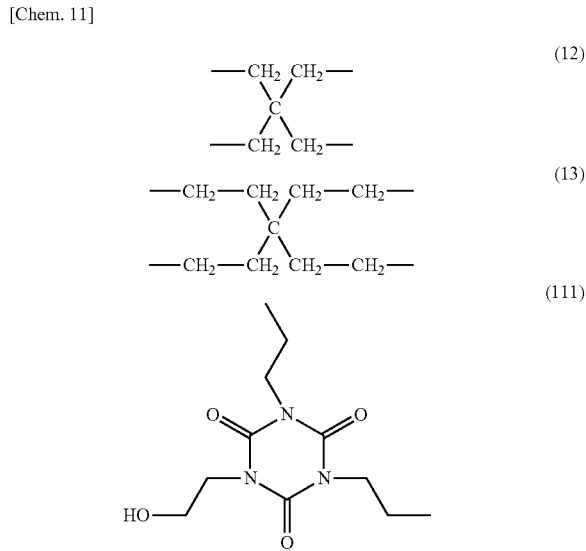

(112)

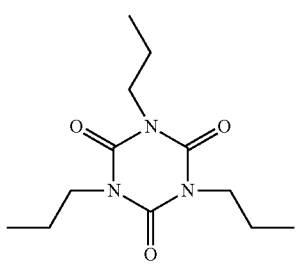

Moreover, the above-described cross-linkage at the covalent-bond cross-linking moiety of the side chain (c) preferably contains at least one structure represented by any one of the following formulae (7) to (9), which is bonded to the main chain of the above-described elastomeric polymer at the α position or the β position, and more preferably contains at least one structure represented by any one of the following formulae (7) to (9), in which G contains a tertiary amino group (the structures shown in the formulae (7) to (9) contain hydroxy groups and carbonyl groups, and can be considered as structures containing both a hydrogen-bond cross-linkable moiety and a covalent-bond cross-linking moiety, and a side chain having such a structure can function as the side chain (c)).

[Chem. 12]

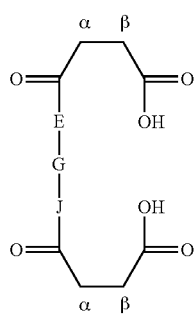

(7)

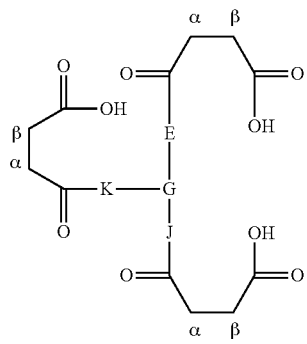

(8)

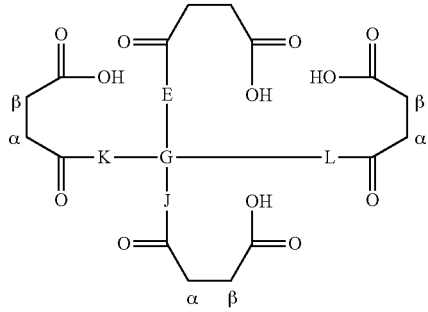

(9)

In the formulae (7) to (9), the substituents E, J, K, and L are each independently basically the same as the substituents E, J, K, and L in the above-described formulae (4) to (6), and the substituent G is basically the same as the substituent G in the above-described formula (4).

In addition, specific preferred examples of the structure represented by any one of the formulae (7) to (9) include compounds represented by the following formula (14) to (25):

[Chem. 13]

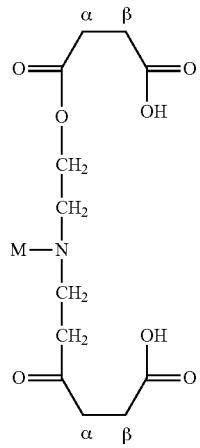

M = $C_8H_{17}$, $C_{12}H_{25}$, $C_{18}H_{37}$ (14)

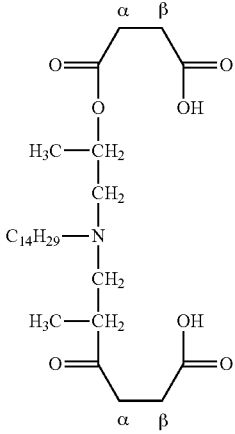

(15)

-continued
(16)
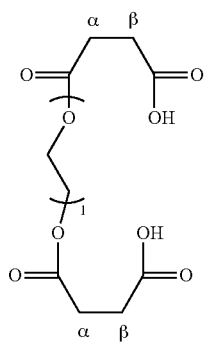
(17)
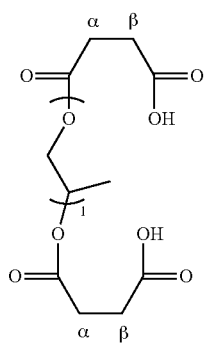
(In the formulae, l represents an integer of 1 or greater.)
[Chem. 14]
(18)
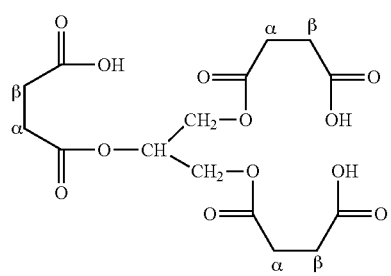
(19)
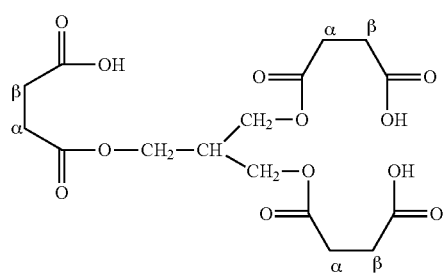
-continued
(20)
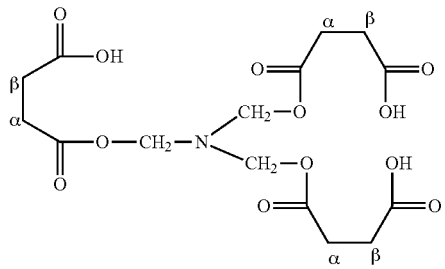
(21)
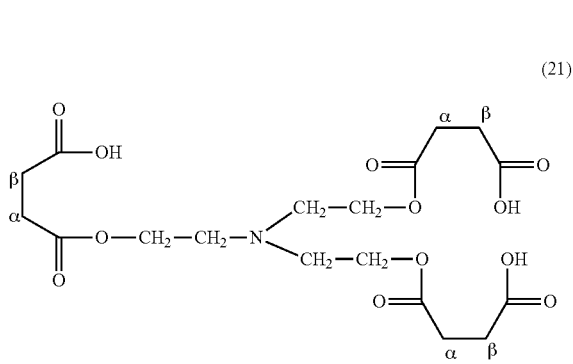
[Chem. 15]
(22)
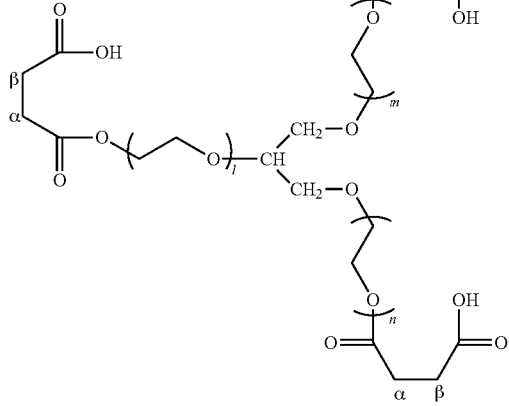

-continued (23)

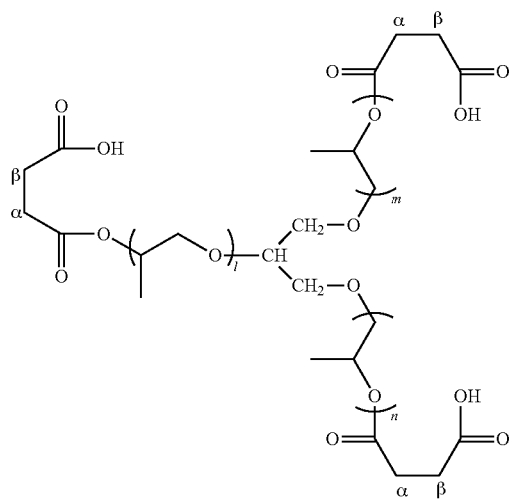

(In the formulae, l, m, and n each independently represent an integer of 1 or greater.)

[Chem. 16]

(24)

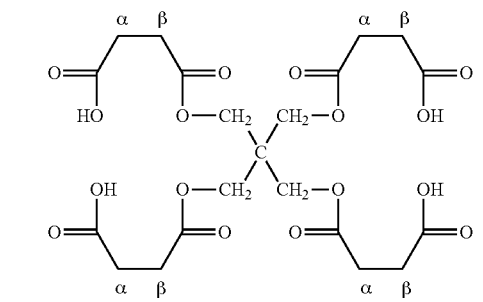

(25)

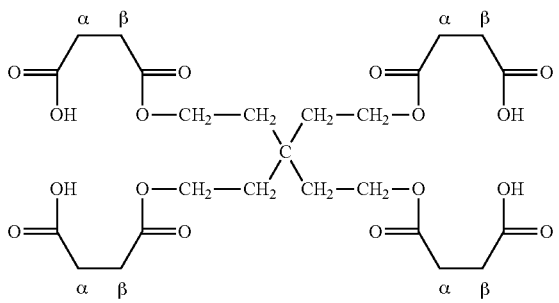

In addition, a cross-linkage at the above-described covalent-bond cross-linking moiety in each of the side chains (b) and (c) is preferably formed by a reaction of a cyclic acid anhydride group with a hydroxy group or an amino group and/or an imino group. For example, when a polymer forming a main chain portion after the reaction has a cyclic acid anhydride group (for example, a maleic anhydride group) as a functional group, the cross-linkage may be formed by a reaction of the cyclic acid anhydride group of the polymer with the compound that forms a covalent-bond cross-linking moiety having a hydroxy group or an amino group and/or an imino group (compound that forms a covalent bond), to form a moiety cross-linked by the covalent bond, thereby cross-linking polymer molecules.

The cross-linkage at the covalent-bond cross-linking moiety of each of the side chains (b) and (c) is more preferably formed by at least one bond selected from the group consisting of amide, ester, lactone, urethane, ether, thiourethane, and thioether. Incidentally, the cross-linkage at the covalent-bond cross-linking moiety of each of the side chains (b) and (c) is also preferably formed by a urea bond.

Hereinabove, the side chain (a'), the side chain (a), the side chain (b), and the side chain (c) are described. The groups (structures) and the like of the side chains in the polymers can be identified by ordinarily used analytic techniques such as NMR and IR spectrometry.

In addition, the elastomeric polymer (A) is an elastomeric polymer having the side chain (a) and having a glass-transition point of 25° C. or below, whereas the elastomeric polymer (B) is an elastomeric polymer containing a hydrogen-bond cross-linkable moiety and a covalent-bond cross-linking moiety in a side chain and having a glass-transition point of 25° C. or below (a polymer having both the side chain (a') and the side chain (b) as side chains, or a polymer containing at least one side chain (c) in a side chain, or the like). As the elastomer component, one of the elastomeric polymers (A) and (B) may be used alone, or a mixture of two or more thereof may be used.

Note that the elastomeric polymer (B) may be either a polymer having both a side chain (a') and a side chain (b), or a polymer having a side chain (c). From the viewpoint that a stronger hydrogen bond is formed, the hydrogen-bond cross-linkable moiety contained in the side chain of the elastomeric polymer (B) is preferably a hydrogen-bond cross-linkable moiety having a carbonyl-containing group and/or a nitrogen-containing heterocycle (more preferably a hydrogen-bond cross-linkable moiety having a carbonyl-containing group and a nitrogen-containing heterocycle).

In addition, the at least one elastomer component selected from the group consisting of the elastomeric polymers (A) and (B) is preferably at least one selected from the group consisting of the following reaction products (I) to (VI):

[Reaction Product (I)]

A reaction product of a maleic anhydride-modified elastomeric polymer (hereinafter, simply referred to as "elastomeric polymer (E1)" for convenience in some cases) with at least one compound (hereinafter, simply referred to as "compound (M1)" for convenience in some cases) among triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, hydrocarbon compounds having two or more substituents of at least one type selected from hydroxy groups, thiol groups, and amino groups, tris(hydroxyethyl) isocyanurates, sulfamides, and polyether polyols;

[Reaction Product (II)]

A reaction product of a hydroxy group-containing elastomeric polymer (hereinafter, simply referred to as "elastomeric polymer (E2)" for convenience in some cases) with a compound (hereinafter, simply referred to as "compound (M2)" for convenience in some cases) having two or more substituents of at least one type selected from carboxy groups, alkoxysilyl groups, and isocyanate groups;

[Reaction Product (III)]

A reaction product of a carboxy group-containing elastomeric polymer (hereinafter, simply referred to as "elastomeric polymer (E3)" for convenience in some cases) with a compound (hereinafter, simply referred to as "compound (M3)" for convenience in some cases) having two or more substituents of at least one type selected from hydroxy groups, thiol groups, and amino groups);

[Reaction Product (IV)]

A reaction product of an amino group-containing elastomeric polymer (hereinafter, simply referred to as "elastomeric polymer (E4)" for convenience in some cases) with a compound (hereinafter, simply referred to as "compound (M4)" for convenience in some cases) having two or more substituents of at least one type selected from carboxy groups, epoxy groups, alkoxysilyl groups, and isocyanate groups;

[Reaction Product (V)]

A reaction product of an alkoxysilyl group-containing elastomeric polymer (hereinafter, simply referred to as "elastomeric polymer (E5)" for convenience in some cases) with a compound (hereinafter, simply referred to as "compound (M5)" for convenience in some cases) having two or more substituents of at least one type selected from hydroxy groups, carboxy groups, and amino groups; and

[Reaction Product (VI)]

A reaction product of an epoxy group-containing elastomeric polymer (hereinafter, simply referred to as "elastomeric polymer (E6)" for convenience in some cases) with a compound (hereinafter, simply referred to as "compound (M6)" for convenience in some cases) having two or more substituents of at least one type selected from thiol groups and amino groups.

Each of these elastomeric polymers (E1) to (E6) may be produced by a commonly used method, for example, by a method of graft polymerization of a compound (for example, a maleic anhydride or the like) that can introduce a functional group depending on a target design into a polymer that can form the main chain portion of the elastomeric polymer (A) or (B) under commonly employed conditions, for example, by stirring under heating or the like. In addition, it is also possible to use commercially available products as the elastomeric polymers (E1) to (E6).

Moreover, the glass-transition points of these elastomeric polymers (E1) to (E6) are preferably 25° C. or below as is the case with the foregoing elastomer components. If the glass-transition point of the elastomeric polymer is within this range, the thermoplastic elastomer composition obtained in the present invention can exhibit rubber-like elasticity at room temperature. Note that a preferable range of the weight average molecular weight of the main chain portion of the elastomeric polymers (E1) to (E6) is the same as the aforementioned preferable range of the weight average molecular weight of the main chain portion of the elastomeric polymers (A) and (B).

Examples of the maleic anhydride-modified elastomeric polymer (E1) include: maleic anhydride-modified isoprene rubbers such as LIR-403 (manufactured by KURARAY CO., LTD.) and LIR-410A (prototype provided by KURARAY CO., LTD.); maleic anhydride-modified ethylene-propylene rubbers such as Nucrel (manufactured by DUPONT-MITSUI POLYCHEMICALS CO., LTD), Yukaron (manufactured by Mitsubishi Chemical Corporation), TAFMER M (for example, MP0610 (manufactured by Mitsui Chemicals, Inc.), and MP0620 (manufactured by Mitsui Chemicals, Inc.)); maleic anhydride-modified ethylene-butene rubbers such as TAFMER M (for example, MA8510, MH7010, MH7020 (manufactured by Mitsui Chemicals, Inc.), MH5010, MH5020 (manufactured by Mitsui Chemicals, Inc.), and MH5040 (manufactured by Mitsui Chemicals, Inc.); maleic anhydride-modified polyethylenes such as Adtex series (maleic anhydride-modified EVA, maleic anhydride-modified EMA (manufactured by Japan Polypropylene Corporation)), HPR series (maleic anhydride-modified EEA, maleic anhydride-modified EVA (manufactured by DuPont-Mitsui Polyolefin)), Bondfast series (maleic anhydride-modified EMA (manufactured by Sumitomo Chemical Company, Limited)), Dumilan series (maleic anhydride-modified EVOH (manufactured by Takeda Pharmaceutical Company Limited)), Bondine (ethylene-acrylic acid ester-maleic anhydride ternary copolymer (manufactured by ATOFINA)), Tuftec (maleic anhydride-modified SEBS, M1943 (manufactured by Asahi Kasei Corporation)), Kraton (maleic anhydride-modified SEBS, FG1901 and FG1924 (manufactured by Kraton Polymers)), Tufprene (maleic anhydride-modified SBS, 912 (manufactured by Asahi Kasei Corporation)), Septon (maleic anhydride-modified SEPS (manufactured by KURARAY CO., LTD.)), Rexpearl (maleic anhydride-modified EVA, ET-182G, 224M, and 234M (manufactured by Japan Polypropylene Corporation)), and Auroren (maleic anhydride-modified EVA, 200S and 250S (manufactured by NIPPON PAPER Chemicals CO., LTD.)); maleic anhydride-modified polypropylenes such as ADMER (for example, QB550 and LF128 (manufactured by Mitsui Chemicals, Inc.)); and the like.

In addition, from the viewpoints of a high molecular weight and high strength, the maleic anhydride-modified elastomeric polymer (E1) is more preferably a maleic anhydride-modified ethylene-propylene rubber or a maleic anhydride-modified ethylene-butene rubber.

Meanwhile, examples of the hydroxy group-containing elastomeric polymer (E2) include hydroxy group-containing BR, hydroxy group-containing SBR, hydroxy group-containing IR, hydroxy group-containing natural rubbers, polyvinyl alcohols, ethylene-vinyl alcohol copolymers, and the like.

Among these hydroxy group-containing elastomeric polymers (E2), an elastomeric polymer having hydroxy groups in both terminals is preferable from the viewpoints that the polymer can be easily obtained industrially and has excellent physical properties. Among them, a hydroxy group-containing BR, hydroxy group-containing IR, or ethylene-vinyl alcohol copolymer is more preferable, and a hydroxy group-containing BR is even more preferable.

Examples of the carboxy group-containing elastomeric polymers (E3) include carboxy group-containing BR, carboxy group-containing SBR, carboxy group-containing IR, carboxy group-containing natural rubbers, polyacrylic acids, ethylene-acrylic acid copolymers, poly(meth)acrylates, ethylene-(meth)acrylate copolymers, and the like.

As such a carboxy group-containing elastomeric polymer (E3), carboxy group-containing IR, an ethylene-acrylic acid copolymer, or an ethylene-(meth)acrylate copolymer is preferable, and carboxy group-containing IR is more preferable from the viewpoints that the polymer can be easily obtained industrially and has excellent physical properties.

Further, examples of the amino group-containing elastomeric polymers (E4) include amino group-containing BR, amino group-containing SBR, amino group-containing IR, amino group-containing natural rubbers, amino group-containing polyethylene imines, and the like.

As such an amino group-containing elastomeric polymer (E4), an amino group-containing polyethylene imine is more preferable from the viewpoints that the polymer can be easily obtained industrially and has excellent physical properties.

As for the amino group-containing elastomeric polymer (E4), the amine value is preferably 1 to 50 mmol/g, more preferably 5 to 40 mmol/g, and further preferably 10 to 30 mmol/g preferable. If the amine value is less than the lower limit, it is necessary to add a large amount of the polymer, and the physical properties tend to deteriorate due to a decrease in the cross-linking density. Meanwhile, if the amine value exceeds the upper limit, the cross-linking density tends to be too high even with addition of a small amount of the polymer. As such an amine value, a value measured by a potentiometric titration method can be employed.

Examples of the alkoxysilyl group-containing elastomeric polymer (E5) include alkoxysilyl group-containing BR, alkoxysilyl group-containing SBR, alkoxysilyl group-containing IR, alkoxysilyl group-containing natural rubbers, alkoxysilyl group-containing polyethylene, alkoxysilyl group-containing polypropylene, and the like.

As such an alkoxysilyl group-containing elastomeric polymer (E5), an alkoxysilyl group-containing polyethylene is more preferable from the viewpoints that the polymer can be easily obtained industrially and has excellent physical properties.

Examples of the epoxy group-containing elastomeric polymer (E6) include epoxy group-containing BR, epoxy group-containing SBR, epoxy group-containing IR, epoxy group-containing natural rubbers, and the like.

As such an epoxy group-containing elastomeric polymer (E6), an epoxy group-containing SBR is more preferable from the viewpoints that the polymer can be easily obtained industrially and has excellent physical properties.

As the hydrocarbon compound used as the compound (M1) and having two or more substituents of at least one type selected from hydroxyl groups, thiol groups, and amino groups, there is a compound having a hydrocarbon compound as a main skeleton among the foregoing polyol compounds, polythiol compounds, and polyamine compounds. The hydrocarbon group in the main skeleton is preferably an aliphatic hydrocarbon compound (more preferably an aliphatic hydrocarbon compound having 1 to 30 carbon atoms). Further, as the hydrocarbon compound used as the compound (M1) and having two or more substituents of at least one type selected from hydroxyl groups, thiol groups, and amino groups, pentaerythritol, ethanedithiol, and ethanediamine are preferable and pentaerythritol is more preferable from the viewpoints that the polymer can be easily obtained industrially and has excellent physical properties with a high cross-linking density.

As the compound used as the compound (M2) and having two or more substituents of at least one type selected from carboxy groups, alkoxysilyl groups, and isocyanate groups, the aforementioned polycarboxy compounds, polyalkoxysilyl compounds, and polyisocyanate compounds can be preferably used. Among them, 2,6-pyridinedicarboxylic acid, 2,4-pyridine dicarboxylic acid, or xylylene diisocyanate (XDI) is more preferable from the viewpoints that the polymer can be easily obtained industrially and has excellent physical properties.

Further, as the compound used as the compound (M3) and having two or more substituents of at least one type selected from hydroxyl groups, thiol groups, and amino groups, the aforementioned polyol compounds, polythiol compounds, and polyamine compounds are preferably used. Among them, tris(hydroxyethyl) isocyanurate, 2,4-diamino-6-phenyl-1,3,5-triazine, or tris[(3-mercaptopropionyloxy)-ethyl] isocyanurate is more preferable from the viewpoints that the compound can be easily obtained industrially and has excellent physical properties.

As the compound used as the compound (M4) and having two or more substituents of at least one type selected from carboxy groups, epoxy groups, alkoxysilyl groups, and isocyanate groups, the above-mentioned polycarboxy compounds, polyepoxy compounds, polyalkoxysilyl compounds, and polyisocyanate compounds can be preferably used. Among them, 2,6-pyridinedicarboxylic acid, 2,4-pyridinedicarboxylic acid, or tris(2,3-epoxypropyl) isocyanurate is more preferable from the viewpoints that the compound can be easily obtained industrially and has excellent physical properties.

As the compound used as the compound (M5) and having two or more substituents of at least one type selected from hydroxy groups, carboxy groups, and amino groups, the above-mentioned polyol compounds and polycarboxy compounds can be preferably used. Among them, tris(hydroxyethyl) isocyanurate, 2,6-pyridinedicarboxylic acid, and 2,4-pyridinedicarboxylic acid are more preferable from the viewpoints that the compound can be easily obtained industrially and has excellent physical properties.

Further, as the compound used as the compound (M6) and having two or more substituents of at least one type selected from thiol groups and amino groups, the above-mentioned polythiol compounds and polyamine compounds can be preferably used. Among them, tris[(3-mercaptopropionyloxy)-ethyl] isocyanurate, or 2,4-diamino-6-phenyl-1,3,5-triazine is more preferable.

Here, the main chains of the aforementioned elastomeric polymers (E1) to (E6) are the same as those explained as the main chains of the aforementioned elastomeric polymers (A) and (B) (the preferable examples are also the same) for the following reason. In the case of any of the elastomeric polymers (E1) to (E6) for use to produce the reaction products, a substituent contained in any of the compounds (M1) to (M6) for use to produce the reaction products reacts with a portion of a functional group (a maleic anhydride group, a hydroxy group, a carboxy group, an amino group, an alkoxysilyl group, or an epoxy group) in the polymer to form a side chain having a structure derived from the main skeleton of the compound (M1) to (M6), but the main chain of the polymer basically does not change between before and after the reaction. For this reason, the main chain of each of the reaction products (I) to (VI) (the main chain of the elastomeric polymer (A) or (B)) is one derived from the main chain of the elastomeric polymer (E1) to (E6).

Moreover, among these reaction products (I) to (VI), preferable ones are reaction products employed in Examples (reaction products of maleic anhydride-modified ethylene-butene copolymers with tris(hydroxyethyl) isocyanurate, reaction products of elastomeric polymers (E) and compounds (M), which are listed in Table 8 for Examples described below, and the like) from the viewpoints that the reaction product can be easily obtained industrially and can have excellent physical properties.

Here, from the viewpoints that the reaction product can be easily obtained industrially and the reaction proceeds efficiently, as the reaction product (I), preferred is a reaction product of a maleic anhydride-modified elastomeric polymer with at least one compound among triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurates, sulfamides, and polyether polyols.

A method for producing the reaction products (I) to (VI) for use as the elastomer component is not particularly limited, but it is possible to employ any method that can obtain an appropriate one of the reaction products (I) to (VI) by selecting the elastomeric polymer (E1) to (E6) and the compound (M1) to (M6) to react therewith as appropriate, and then by allowing them to react with each other as appropriate to form a side chain of a target design. Here, conditions (temperature condition, atmosphere condition, and so on) employed for the reaction may be set according to the types of the functional group and the main chain of the elastomeric polymer (E1) to (E6) as a material for obtaining the reaction product and further according to the type of the compound (M1) to (M6) to be reacted with the elastomeric polymer (E1) to (E6).

In the case of preparing the reaction product (I) to (VI), the preparation can be made, for example, in such a way that a polymer selected as appropriate from the elastomeric polymers (E1) to (E6) according to the target design is added to a pressure kneader, and a compound selected from the compounds (M1) to (M6) to be reacted with the polymer is added thereto during stirring to cause a reaction. In this process, a temperature that can make the reaction proceed can be set as appropriate. Note that the preparation for any of the reaction products (I) to (VI) may employ a method for forming a composition simultaneously with preparation for an elastomer component in such a way that a polymer selected as appropriate from the elastomeric polymers (E1) to (E6) for use to prepare the reaction product (I) to (VI) is mixed with an organically modified clay before the polymer is mixed with a compound selected from the compounds (M1) to (M6), and thereafter the compound is added to cause a reaction (a method in which an organically modified clay is added first). Note that, for the preparation of the composition, it is preferable to employ the foregoing method in which the organically modified clay is added first because the dispersibility of the organically modified clay is improved to lead to a higher level of heat resistance.

Moreover, as the polymer contained in the elastomer component, it is preferable that the main chain of the polymer be an olefin-based copolymer and that a side chain of the polymer have an isocyanurate ring from the viewpoints that deterioration is less likely to occur due to the absence of a double bond, and that interactions such as hydrogen bonding may occur between isocyanurate rings and between an isocyanurate ring and another hydrogen bond portion or the clay. A preferable example of such polymer in which the main chain is the olefin-based copolymer and a side chain has an isocyanurate ring is a reaction product of a maleic anhydride-modified elastomeric polymer formed of an olefin-based copolymer modified by a maleic anhydride (more preferably a maleic anhydride-modified ethylene-propylene rubber or a maleic anhydride-modified ethylene-butene rubber) with tris(hydroxyethyl) isocyanurate.

Moreover, in the case where the polymer contained as the elastomer component is a polymer in which the main chain is an olefin-based copolymer and a side chain has an isocyanurate ring as described above, a thermoplastic elastomer composition comprising the polymer preferably demonstrates an infrared adsorption spectrum in which a ratio between an absorption intensity (A) a peak around a wavelength of 2,920 $cm^{-1}$ derived from C—H stretching vibration in an olefin-based resin (the foregoing olefin-based resin comprises not only the α-olefin-based resin having no chemical-bond cross-linking moiety, but also the olefin-based resin forming the main chain of the polymer contained as the elastomer component (for example, the aforementioned olefin-based copolymer)), and an absorption intensity (B) of a peak around a wavelength of 1,695 $cm^{-1}$ derived from the carbonyl groups in the isocyanurate rings ([absorption intensity (B)]/[absorption intensity (A)]) is 0.01 or more (more preferably 0.012 to 10, and further preferably 0.015 to 5). If such an intensity ratio between the absorption peak intensity (A) and the absorption peak intensity (B) in the infrared adsorption spectrum (IR spectrum) is less than the lower limit, the abundance ratio of the side chains having isocyanurate rings present in the composition is so low that the cross-linking density in the system decreases and accordingly the physical properties such as mechanical strength tend to deteriorate. Meanwhile, if the intensity ratio exceeds the upper limit, there are so many branches of the elastomer component in the system that the cross-linking density in the entire system decreases and the mechanical properties tend to deteriorate. Here, as such an infrared adsorption spectrum (IR spectrum) of the thermoplastic elastomer composition, an absorption spectrum graph is used which is obtained: by using an IR measurement equipped with a total reflection type unit (for example, "NICOLET380" manufactured by Thermo Fisher Scientific Inc.), and also using a measurement sample prepared such that 40 g of the thermoplastic elastomer composition containing the polymer (the polymer contained as the elastomer component, in which the main chain is an olefin-based copolymer and a side chain has an isocyanurate ring) is pressed with a thickness of 2 mm so as to have a smooth surface; and by measuring an infrared adsorption spectrum (infrared attenuated total reflection (FTIR-ATR) spectrum) in a wavenumber range of 400 to 4,000 $cm^{-1}$ by an attenuated total reflection (ATR) method. In such measurement, the infrared adsorption spectrum peak of the carbonyl groups in the isocyanurate rings in the side chains appears around the wavelength of 1,695 $cm^{-1}$ (a range of about 1,690 to 1,700 $cm^{-1}$), whereas the infrared adsorption spectrum peak of the C—H stretching vibration in the olefin-based resin (the foregoing olefin-based resin comprising not only the α-olefin-based resin having no chemical-bond cross-linking moiety but also the olefin-based resin in the main chain (base polymer) of the elastomer component (for example, the olefin-based copolymer)) appears around the wavelength of 2,920 $cm^{-1}$ (a range of about 2,910 to 2,930 $cm^{-1}$).

Here, by taking, as an example, a thermoplastic elastomer composition comprising a reaction product of a maleic anhydride-modified elastomeric polymer formed of an olefin-based copolymer modified by a maleic anhydride (more preferably a maleic anhydride-modified ethylene-propylene rubber or a maleic anhydride-modified ethylene-butene rubber) with tris(hydroxyethyl) isocyanurate, a side chain is formed by a reaction of the acid anhydride group in the maleic anhydride-modified elastomeric polymer with a hydroxy group in the tris(hydroxyethyl) isocyanurate during the production of the reaction product, and thus the reaction product is a polymer in which the isocyanurate rings are introduced in the side chains. As described above, the infrared adsorption spectrum peak derived from the carbonyl groups in the isocyanurate rings in the side chains in the polymer (reaction product) appears around the wavelength of 1,695 cm$^{-1}$ (a range of 1,690 to 1,700 cm$^{-1}$), whereas the infrared adsorption spectrum peak derived from the C—H stretching vibration in the olefin-based copolymer in the main chain (base polymer) and the C—H stretching vibration in the α-olefin-based resin having no chemical-bond cross-linking moiety in the polymer (reaction product) appears around the wavelength of 2,920 cm$^{-1}$ (a range of 2,910 to 2,930 cm$^{-1}$). Hence, in the aforementioned composition containing such reaction product, a ratio of side chains in which isocyanurate rings are introduced (in the case of the above example, the side chains thus formed each basically have both a hydrogen-bond cross-linkable moiety and a covalent-bond cross-linking moiety) relative to the total amount of the olefin-based resin present in the system can be determined by obtaining the intensity ratio between the peak around the wavelength of 1,695 cm$^{-1}$ and the peak around the wavelength 2,920 cm$^{-1}$, and thereby the cross-linking density in the entire system can be estimated by analogy. Then, if the intensity ratio thus obtained is equal to or more than the foregoing lower limit, the abundance ratio of the side chains containing isocyanurate rings is sufficient with the result that the cross-linking density in the entire system is sufficient and the physical properties such as mechanical strength can be made sufficient.

A method for producing such an elastomeric polymer (A) or (B) is not particularly limited, and a known method can be employed, as appropriate, by which at least one selected from the group consisting of the side chain (a); the side chain (a') with the side chain (b); and the side chain (c) as described above can be introduced as a side chain of an elastomeric polymer having a glass-transition point of 25° C. or below. For example, as the method for producing the elastomeric polymer (B), it is also possible to employ a method described in Japanese Unexamined Patent Application Publication No. 2006-131663. In addition, to obtain the elastomeric polymer (B) comprising the side chain (a') and the side chain (b) as described above, for example, these side chains may be simultaneously introduced to an elastomeric polymer having a cyclic acid anhydride group (for example, a maleic anhydride group) serving as a functional group in a side chain by using a mixture (mixed raw material) of a compound that forms a covalent-bond cross-linking moiety upon a reaction with the cyclic acid anhydride group (a compound that forms a covalent bond) and a compound that forms a hydrogen-bond cross-linkable moiety upon a reaction with the cyclic acid anhydride group (a compound capable of introducing a nitrogen-containing heterocycle).

In addition, as a method for producing the elastomeric polymers (A) and (B), it is possible to employ, for example, a method in which an elastomeric polymer having a functional group (for example, a cyclic acid anhydride group or the like) in a side chain is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent cross-linking moiety upon a reaction with the functional group, to produce an elastomeric polymer having the side chain (a); an elastomeric polymer having the side chain (a') with the side chain (b); and/or an elastomeric polymer having the side chain (c) (the elastomeric polymers (A) and (B)). Note that conditions (temperature condition, atmosphere conditions, or the like) employed for the reaction are not particularly limited, and may be set, as appropriate, according to the types of the functional group and the compound to be reacted with the functional group (compound that forms a hydrogen-bond cross-linkable moiety and/or a compound that forms a covalent-bond cross-linking moiety). Note that the elastomeric polymer (A) may also be produced by polymerization of a monomer having a hydrogen bonding moiety.

The elastomeric polymer having such a functional group (for example, a cyclic acid anhydride group) in a side chain is preferably a polymer that can form a main chain of the above-described elastomeric polymers (A) and (B) and having a functional group in a side chain. Here, the "elastomeric polymer containing a functional group in a side chain" refers to an elastomeric polymer having a functional group (the above-described functional group or the like, for example, a cyclic acid anhydride group or the like) chemically stably bonded (covalently bonded) to an atom forming a main chain, and it is possible to preferably use one obtained by a reaction of an elastomeric polymer (for example, a known natural polymer or synthetic polymer) with a compound capable of introducing a functional group.

In addition, the functional group is preferably a functional group capable of forming at least one bond selected from the group consisting of amide, ester, lactone, urethane, ether, thiourethane, and thioether, among which a cyclic acid anhydride group, a hydroxy group, an amino group, a carboxy group, an isocyanate group, a thiol group, or the like is preferable. The functional group is particularly preferably a cyclic acid anhydride group, from the viewpoint that the clay can be dispersed more efficiently in the composition. In addition, the cyclic acid anhydride group is preferably a succinic anhydride group, a maleic anhydride group, a glutaric anhydride group, or a phthalic anhydride group. Especially, a maleic anhydride group is more preferable, from the viewpoint that it can be easily introduced to a side chain of a polymer and can be easily obtained industrially. In addition, when the functional group is a cyclic acid anhydride group, the functional group may be introduced to the elastomeric polymer (for example, a known natural polymer or synthetic polymer) by using, for example, a cyclic acid anhydride such as succinic anhydride, maleic anhydride, glutaric anhydride, phthalic anhydride, and an derivative thereof, as a compound enabling the introduction of the functional group.

Note that the compound that forms a hydrogen-bond cross-linkable moiety upon a reaction with the functional group is not particularly limited, and it is preferable to use the above-described "compound that forms a hydrogen-bond cross-linkable moiety (a compound capable of introducing a nitrogen-containing heterocycle)." In addition, the compound that forms a covalent-bond cross-linking moiety upon a reaction with the functional group is not particularly limited, and it is preferable to use the above-described "compound that forms a covalent-bond cross-linking moiety (compound that forms a covalent bond)." Moreover, as the compound that forms a hydrogen-bond cross-linkable moiety (a compound capable of introducing a nitrogen-containing heterocycle) and the compound that forms a covalent-bond cross-linking moiety (a compound that forms a covalent bond), a compound that forms both a hydrogen-bond cross-linkable moiety and a covalent-bond cross-linking moiety upon a reaction with the functional group (for example, a polyol, polyamine, or polythiol containing a nitrogen-containing heterocycle, or the like) can also be used preferably.

In addition, when a method in which an elastomeric polymer having a side chain in a functional group (for example, cyclic acid anhydride group) is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce the elastomeric polymer (A) having the side chain (a), or the elastomeric polymer (B) containing a hydrogen-bond cross-linkable moiety and a covalent-bond cross-linking moiety in a side chain is employed as a method for producing an elastomer component (elastomeric polymers (A) and (B)), it is possible to employ a method in which, before the reaction of the elastomeric polymer having a functional group in a side chain with the raw material compound, an clay is mixed with the elastomeric polymer having a functional group in a side chain, and then the raw material compound is added, followed by a reaction, to form the composition simultaneously with the preparation of the elastomer component (a method in which a clay is added first).

Note that it is preferable to prepare the composition simultaneously with the preparation of the elastomer component by employing the above-described method in which the clay is added first at the time of the production of the elastomer components (elastomeric polymers (A) and (B)) because the dispersibility of the clay is further improved to lead to a higher level of heat resistance. In addition, as the method in which the clay is added first, it is more preferable to employ a method for producing a thermoplastic elastomer composition of the present invention described later.

(Clay)

The clay according to the present invention is not particularly limited, and any publicly known clay (such as clay mineral) can be used. As such a clay, there are naturally occurring clays, synthetic clays, and organically modified clays. Examples thereof include montmorillonite, saponite, hectorite, beidellite, stevensite, nontronite, vermiculite, halloysite, mica, fluorinated mica, kaolinite, pyrophyllite, smectite, sericite, illite, glauconite, chlorite, talc, zeolite, hydrotalcite, and the like.

Of these clays, at least one selected from the group consisting of clays mainly containing silicon and magnesium, and organically modified clays is preferable.

In addition, in the present invention, a clay mainly containing silicon and magnesium refers to a clay in which main components of metals in metal oxides serving as components of the clay are silicon (Si) and magnesium (Mg), and may contain other metal oxides (aluminum (Al), iron (Fe), and the like) as sub components. The clay mainly containing silicon and magnesium is not particularly limited, and a known one can be used, as appropriate. Because of its small particle diameter, the use of a clay mainly containing silicon and magnesium makes it possible to increase reinforcing properties. In addition, the clay mainly containing silicon and magnesium is preferably a clay having a smectite structure, from the viewpoint of the availability.

In addition, examples of the clay mainly containing silicon and magnesium include stevensite, hectorite, saponite, talc, and the like, among which stevensite, hectorite, or saponite is more preferably used from the viewpoint of the dispersibility.

In addition, the clay mainly containing silicon and magnesium is preferably a synthetic clay. As the synthetic clay, a commercially available one can also be used, and, for example, it is possible to use, as appropriate, one manufactured by KUNIMINE INDUSTRIES CO., LTD. under the trade name of "Sumecton SA" or "Sumecton ST," manufactured by Mizusawa Industrial Chemicals, Ltd. under the trade name of "IONITE," or manufactured by Co-Op Chemical Co., Ltd. under the trade name of "Lucentite," or the like.

In addition, the organically modified clay is preferably, but not particularly limited to, one formed by organically modifying a clay with an organically modifying agent. The clay before the organic modification is not particularly limited, and may be any so-called clay mineral. Examples thereof include montmorillonite, saponite, hectorite, beidellite, stevensite, nontronite, vermiculite, halloysite, mica, fluorinated mica, kaolinite, pyrophyllite, smectite, sericite, illite, glauconite, chlorite, talc, zeolite, hydrotalcite, and the like. In addition, the clay may be a natural product or a synthetic product.

In addition, the organically modifying agent is not particularly limited, and a known organically modifying agent capable of organically modifying a clay can be used, as appropriate. For example, it is possible to use hexylammonium ions, octylammonium ions, 2-ethylhexylammonium ions, dodecylammonium ions, laurylammonium ions, octadecylammonium ions, dioctyldimethylammonium ions, trioctylammonium ions, dioctadecyldimethylammonium ions, trioctylammonium ions, dioctadecyldimethylammonium ions, trioctadecylammonium ions, or the like.

In addition, from the viewpoint of single-layer dispersibility, a quaternary ammonium salt of a clay can be used preferably as the organically modified clay. Examples of the quaternary ammonium salt of the organically modified clay which can be preferably used include, but are not particularly limited to, trimethylstearylammonium salts, oleylbis (2-hydroxylethyl) methylammonium salts, dimethylstearylbenzylammonium salts, dioctadecyldimethylammonium salts, and mixtures of two or more thereof. Note that as the quaternary ammonium salt of an organically modified clay, a dimethylstearylbenzylammonium salt, a dioctadecyldimethylammonium salt, or a mixture thereof can be used more preferably, and a mixture of a dimethylstearylbenzylammonium salt and a dioctadecyldimethylammonium salt can be used further preferably, from the viewpoint of improvement in tensile strength and heat resistance.

In addition, a commercially available one can be used as the organically modified clay, and, for example, those manufactured by KUNIMINE INDUSTRIES CO., LTD. under the trade name of "Kunfil-D36," "Kunfil-B1," "Kunfil-HY," and the like, as well as those manufactured by HOJUN Co., Ltd. under the trade name of "S-BEN series (C, E, W, WX, N-400, NX, NX80, NZ, NZ70, NE, NEZ, NO12S, and NO12," and "ORGANITE series (D, T), and the like, can be used, as appropriate. Among the commercially available organically modified clays, those manufactured by KUNIMINE INDUSTRIES CO., LTD. under the trade name of "Kunfil-D36" and manufactured by HOJUN Co., Ltd. under the trade name of "S-BEN series WX" can be used preferably.

As described above, the clay according to the present invention is preferably a clay mainly containing silicon and magnesium or an organically modified clay from the viewpoint of high dispersibility, and especially, an organically modified clay is particularly preferably used, because a higher level of tensile stress (modulus) can be obtained.

(α-Olefin-based Resin Having No Chemical-Bond Cross-Linking Moiety)

The α-olefin-based resin according to the present invention has no chemical-bond cross-linking moiety. The "chemical-bond cross-linking moiety" mentioned herein means a moiety in which a cross linkage is formed by a chemical bond such as a hydrogen bond, a covalent bond, a chelate formed between a metal ion and a polar functional group, and a bond formed by σ-π interaction in a metal-unsaturated bond (double bond, triple bond). Accordingly, "having no chemical-bond cross-linking moiety" mentioned in the present invention means a state where a resin does not have any chemical bond such as the hydrogen bond, the covalent bond, the chelate formed between a metal ion and a polar functional group, or the bond formed by σ-π interaction in a metal-unsaturated bond (double bond, triple bond) listed above. As the α-olefin-based resin having no chemical-bond cross-linking moiety, preferably used is a resin that neither contains any functional group (for example, a hydroxy group, a carbonyl group, a carboxyl group, a thiol group, an amide group, or an amino group) capable of forming a cross-linking point by chemical bonding, nor contains a bonding moiety in which polymer chains are directly cross-linked (such as a cross-linking moiety by a covalent bond). Moreover, such an α-olefin-based resin having no chemical-bond cross-linking moiety is a polymer that does not have at least any of the aforementioned side chain (a), side chain (a'), side chain (b), side chain (c), and the like.

Then, the "α-olefin-based resin" mentioned herein is an α-olefin homopolymer or an α-olefin copolymer. The "α-olefin" mentioned herein is an alkene containing a carbon-carbon double bond at the α position (alkene containing a carbon-carbon double bond at the terminal: note that such an alkene may be in the form of a linear chain or a branched chain, and preferably has 2 to 20 carbon atoms (more preferably 2 to 10 carbon atoms). Examples thereof include ethylene, propylene, 1-butene, 1-pentene, 1-hexene, 1-heptene, 1-octene, 1-nonene, 1-decene, and the like.

The α-olefin-based resin having no chemical-bond cross-linking moiety may be any polymer of α-olefin (ploy-α-olefin: which may be a homopolymer or a copolymer), which is not limited to a particular one. Examples thereof include polyethylene, polypropylene, ethylene-propylene copolymer, ethylene-butene copolymer, propylene-ethylene-butene copolymer, and the like. Among the α-olefin-based resins having no chemical-bond cross-linking moiety, polypropylene, polyethylene, ethylene-butene copolymer, and ethylene-propylene copolymer are preferable, and polypropylene, polyethylene, and ethylene-propylene copolymer are more preferable from the viewpoint of compatibility with the base elastomer. Incidentally, one of these α-olefin-based resins having no chemical-bond cross-linking moiety may be used alone or two or more thereof may be used in combination.

In the α-olefin-based resin having no chemical-bond cross-linking moiety, the degree of crystallinity is preferably 10% or more, more preferably 10 to 80%, and further preferably 10 to 75%. If the degree of crystallinity is less than the lower limit, the resinous properties are so weak that it tends to be difficult to enhance the levels of mechanical properties and flowability. Meanwhile, if the degree of crystallinity exceeds the upper limit, the resinous properties are so strong that it tends to be difficult to exert the mechanical properties at higher levels in a well-balanced manner. Here, the degree of crystallinity can be obtained in such a way that diffraction peaks are measured by using an X-ray diffraction instrument (for example, one manufactured by Rigaku Corporation under the trade name "Mini-Flex 300") as a measurement instrument and an integral ratio between the scattering peaks derived from crystalline and amorphous structures is calculated.

In addition, in the α-olefin-based resin having no chemical-bond cross-linking moiety, the melt flow rate (MFR) at 190° C. under a load of 2.16 kg, which is measured according to JIS K6922-2 (published in 2010), is preferably 40 g/10 min or more. If the melt flow rate (MFR) is less than the lower limit, the α-olefin-based resin tends to have difficulty in improving the flowability even when blended in the elastomer composition. Here, the melt flow rate (MFR) is a value measured according to the B method described in JIS K6922-2 (published in 2010) and can be obtained by using, as a melt flow rate measurement instrument, an instrument manufactured by Toyo Seiki Seisaku-sho, Ltd. under the trade name "Melt Indexer G-01". Specifically, 3 g of the α-olefin-based resin is added to the furnace of the instrument, is heated to a temperature of 190° C., and then is left for 5 minutes at 190° C. Thereafter, under the conditions of the temperature kept at 190° C. and a load of 2.16 kg, a mass (g) of the elastomer is measured, as the melt flow rate, which flows out for 10 minutes from an opening of the tubular orifice member having a diameter of 1 mm and a length of 8 mm, and connected to a lower portion of the furnace (the resin is left for 5 minutes at temperature of 190° C. in the furnace, and then the measurement of the mass of the elastomer flowing out is started after the start of the load application). Moreover, the weight average molecular weight (Mw) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the weight average molecular weight is less than the lower limit, the mechanical strength tends to decrease. Meanwhile, if the weight average molecular weight exceeds the upper limit, the compatibility with the elastomer component decreases so much that phase separation tends to easily occur.

In addition, the number average molecular weight (Mn) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the number average molecular weight is less than the lower limit, the mechanical strength tends to decrease. Meanwhile, if the number average molecular weight exceeds the upper limit, the compatibility with the elastomer component tends to decrease so much that phase separation tends to easily occur.

In addition, the polydispersity index (Mw/Mn) of the α-olefin-based resin having no chemical-bond cross-linking moiety is preferably 5 or less, and more preferably 1 to 3. If the value of the polydispersity index (Mw/Mn) is less than the lower limit, the flowability tends to decrease. Meanwhile, if the value exceeds the upper limit, the compatibility with the elastomer tends to decrease.

The aforementioned weight average molecular weight (Mw), number average molecular weight (Mn) and polydispersity index (Mw/Mn) of the α-olefin-based resin can be determined by what is termed gel permeation chromatography (GPC). Then, "Prominence GPC system" manufactured by Shimadzu Corporation can be used for a specific instrument and conditions for measuring such molecular weights and so on.

The glass-transition point of the α-olefin-based resin having no chemical-bond cross-linking moiety is preferably −150 to 5° C., and more preferably −125 to 0° C. If the glass transition point is less than the lower limit, the melting point is so low that the heat resistance tends to decrease. Meanwhile, if the glass transition point exceeds the upper limit, the rubber elasticity of the elastomer blended with the α-olefin-based resin tends to decrease. The "glass transition point" mentioned herein is a glass transition point measured by differential scanning calorimetry (DSC) as described above. In such DSC measurement, it is preferable to set the rate of temperature rise at 10° C./min.

A method for producing the α-olefin-based resin having no chemical-bond cross-linking moiety is not particularly limited, but any known method can be employed as appropriate. As such an α-olefin-based resin, a commercially available product may be used, and examples thereof usable as appropriate include ones manufactured by Mitsui Chemicals, Inc. under the trade name "TAFMER"; manufactured by Japan Polyethylene Corporation under the trade names "NOVATEC HD", "NOVATEC LD", "NOVATEC LL", and "KERNEL"; manufactured by Prime Polymer Co., Ltd. under the trade names "HI-NEX", "NEO-ZEX", "ULTZEX", "Evolue", "Prime Polypro", "POLY FINE", and "MOSTRON L"; and manufactured by SunAllomer Ltd. under the name of PP; and the like (Composition)

The thermoplastic elastomer composition of the present invention contains the elastomer component, the clay, and the α-olefin resin having no chemical-bond cross-linking moiety.

Note that although it is not exactly clear why the thermoplastic elastomer composition of the present invention can have sufficiently high levels of heat resistance and tensile strength at break, the present inventors speculate as follows.

Specifically, first, the elastomer component in the present invention contains an elastomeric polymer containing a side chain having at least a hydrogen-bond cross-linkable moiety (a polymer containing at least any of: the side chain (a); the side chain (a') and the side chain (b); and the side chain (c) in a side chain(s)). For this reason, when such an elastomeric polymer is used in combination with a clay, interactions between the clay and hydrogen-bond cross-linkable moieties occur (such as the formation of new hydrogen bonds), so that the elastomer component undergoes plane cross-linking by utilizing the surface of the clay. Then, the formation of the plane cross-linking makes it possible for the elastomer component to express sufficiently high heat resistance stemming from its structure. In addition, the present inventors speculate that the formation of the plane cross-linking then makes it possible to suppress the stress concentration at each cross-linking point, so that the elastomer component can express higher tensile strength at break (the tensile strength at the moment at which break occurs) than in the case where the clay is not contained. Especially, when the hydrogen-bond cross-linkable moiety is "a hydrogen-bond cross-linkable moiety having a carbonyl-containing group and/or a nitrogen-containing heterocycle (more preferably, a hydrogen-bond cross-linkable moiety having a carbonyl-containing group and a nitrogen-containing heterocycle)" as described for the side chain (a), hydrogen bonds can be formed at a larger number of points. The elastomer molecules form hydrogen bonds not only between themselves at a larger number of points, but also form hydrogen bonds with the clay at a larger number of points. Hence, the plane cross-linking can be formed more strongly, and higher effects tend to be obtained in terms of tensile strength (tensile strength at break) and heat resistance.

In contrast, in the case of using, as the elastomer component, only a different elastomer component instead of using at least one of the elastomeric polymers (A) and (B) having a hydrogen-bond cross-linkable moiety in a side chain, it is not possible to obtain the effects as described above even when the different elastomer component is used in combination with a clay. In this respect, the present inventors speculate as follows. Specifically, first, ordinary thermoplastic elastomers can be roughly classified into two types: a type utilizing pseudo-cross-linking based on physical interaction between molecular chains of a polymer (a type in which weak bonds are physically formed by interactions based on intermolecular force of a polymer and the like), and a type in which a rubber is dispersed in a matrix of a thermoplastic resin. Representative ones of thermoplastic elastomers of the type utilizing the pseudo-cross-linking include polymers each containing a soft segment and a hard segment, such as a block polymer and a urethane elastomer. Here, if the thermoplastic elastomer of the type utilizing the pseudo-cross-linking is only blended with a filler such as a clay without introducing a polymer having the aforementioned side chain, the clay hinders interactions at pseudo-cross-linking points (physical interactions between molecular chains of the polymer), which rather results in a decrease in the mechanical strength of the polymer, making the resultant composition unsuitable for practical use as a rubber product. In this way, when a conventional thermoplastic elastomer only containing a thermoplastic elastomer of the type utilizing pseudo-cross-linking is used just in combination with a clay, the formation of the pseudo-cross-linking is rather hindered in the composition, and the mechanical strength (such as tensile stress) of the composition decreases. Meanwhile, in the case of a thermoplastic elastomer of the type in which a rubber is dispersed in a matrix of a thermoplastic resin, a filler such as a clay is introduced only in the matrix phase, as is apparent from the constitution of the thermoplastic elastomer. In this connection, in the case of a matrix in a thermoplastic resin not having the aforementioned side chain, the matrix does not form interaction with the clay. For this reason, simple introduction of a filler results in a state in which the filler is introduced at high concentration in some portions, while the filler is not introduced at all in other some portions. As a result, a difference in the concentration of the filler causes a difference in the hardness inside the elastomer to decrease the mechanical strength and the like. For this reason, in the case where a polymer having no hydrogen-bond cross-linkable moiety in aside chain is used in a thermoplastic elastomer of the type in which a rubber is dispersed in the matrix of a thermoplastic resin, even when a clay is simply introduced into the thermoplastic elastomer, the clay cannot be dispersed sufficiently and the mechanical strength (such as tensile strength at break) of the composition decreases. In view of these points, the present inventors speculate that when none of the elastomeric polymers (A) and (B) is used in a base elastomer component, the obtained composition cannot always have properties sufficient as an elastomer (rubber), because the elastomer component cannot form interactions with the clay and even worse the presence of the clay rather decreases the mechanical strength.

In addition, in the present invention, the amount of the clay contained is 20 parts by mass or less relative to 100 parts by mass of the elastomer component. Even such a content ratio (sufficiently low ratio) can produce sufficiently high effects in the heat resistance and the like. In this regard, the present inventors speculate that the clay is dispersed sufficiently uniformly as described above and thus can form the plane cross-linking sufficiently (note that a case where the ratio of the clay dispersed as single layers is increased can be regarded as a more preferred mode, because a larger number of plane cross-linkages tend to be formed in the elastomer), and therefore even a trace amount of the clay contained of 20 parts by mass or less enables the composition to exhibit a sufficiently high level of tensile stress and sufficiently high heat resistance.

In addition, the thermoplastic elastomer composition of the present invention comprises the α-olefin resin having no chemical-bond cross-linking moiety in addition to the thermoplastic elastomer composition and the clay. When the composition comprises such an α-olefin resin having no chemical-bond cross-linking moiety, the α-olefin resin is dispersed in the cross-linking structure of the base elastomer component, and the physical properties peculiar to the α-olefin resin can be expressed. Hence, the present inventors speculate that excellent flowability and mechanical properties stemming from the α-olefin resin having no chemical-bond cross-linking moiety can be imparted to the thermoplastic elastomer composition of the present invention. Moreover, in the present invention, since the α-olefin resin and the elastomer component are of a combination having high compatibility, the α-olefin resin and the elastomer component are both sufficiently uniformly dispersed in the composition. Then, since the elastomer component thus sufficiently dispersed interacts (forms hydrogen bonds or the like) with the clay, the clay is also sufficiently dispersed. The present inventors speculate that this makes it possible to sufficiently keep the effects obtained by use of the α-olefin resin (for example, such as the effects of imparting excellent flowability and mechanical properties) while allowing the clay to be sufficiently dispersed to achieve the sufficiently high levels of heat resistance, tensile strength at break, and the like. Further, in the present invention, use of a certain type of elastomer component enables the obtained composition to also exhibit sufficient rubber properties and flowability (formability) by means of hydrogen bonds formed in the hydrogen-bond cross-linkable moieties in the side chains contained in the elastomer component, although depending on the entire structure and others of the elastomer component. This is because, even if the hydrogen bonds once disappear during heating, a certain structure can cause hydrogen bonds to be formed again during curing, and thereby also enables the composition to maintain sufficient rubber properties and flowability (formability). Moreover, comprising the foregoing components, the composition of the present invention can also express sufficient hardness and other properties usable as rubber products.

Further, the present inventors speculate that, when an elastomer component containing a covalent-bond cross-linking moiety in a side chain is contained in the present invention (for example, when the elastomeric polymer (B) is contained), the side chains containing the covalent-bond cross-linking moieties make it possible to express a higher level of resistance to compression set. Moreover, when the hydrogen-bond cross-linkable moiety and the covalent-bond cross-linking moiety are present in the elastomer component (such as cases where: the elastomeric polymer (B) is contained, a mixture of the elastomeric polymer (B) with another elastomeric polymer is contained; a mixture of the elastomeric polymer (A) and the elastomeric polymer (B) is contained; and a mixture of the elastomeric polymer (A) with an elastomeric polymer containing the side chain (b) other than the elastomeric polymer (B) is used), the presence of the hydrogen-bond cross-linkable moiety and the covalent-bond cross-linking moiety enables the obtained composition to simultaneously express a higher level of mechanical strength attributed to covalent bonds during use and a higher level of flowability (formability) attributed to cleavage of hydrogen bonds during heating. The present inventors speculate that, by taking advantage of the above, properties required depending on an application can be exhibited, as appropriate, by changing, as appropriate, the constitution according to the type of a side chain. Note that, the above-described elastomeric polymer having a side chain (b) other than the elastomeric polymer (B) can be obtained by a method in which an elastomeric polymer having a functional group (for example, cyclic acid anhydride group) in a side chain is used, and the elastomeric polymer is reacted with a compound that forms a covalent-bond cross-linking moiety upon a reaction with the functional group (compound that forms a covalent bond) to produce the elastomeric polymer having the side chain (b). Note that, also in this case, the above-described "compound that forms a covalent-bond cross-linking moiety (compound that forms a covalent bond)" can be used as the compound that forms a covalent-bond cross-linking moiety (compound that forms a covalent bond).

Hereinabove, the reasons that the foregoing effects of the present invention can be obtained by the thermoplastic elastomer composition of the present invention and the other things have been discussed. Hereinafter, preferred embodiments of the thermoplastic elastomer composition of the present invention (such as a preferable condition of the content ratio of each component) will be further explained.

The thermoplastic elastomer composition of the present invention comprises the elastomer component, the clay, and the α-olefin-based resin having no chemical-bond cross-linking moiety, and the amount of the clay contained is 20 parts by mass or less relative to 100 parts by mass of the elastomer component. If the amount of the clay contained exceeds the upper limit, the heat resistance and the tensile strength at break decrease. The amount of the clay contained in the thermoplastic elastomer composition is more preferably 0.1 to 10 parts by mass, further preferably 0.5 to 5 parts by mass, and particularly preferably 1 to 3 parts by mass relative to 100 parts by mass of the elastomer component. If the amount of the clay contained is less than the lower limit, the amount of the clay contained is so small that sufficient effects tend not to be obtained. Meanwhile, if the amount of the clay contained exceeds the upper limit, the cross-linking is so strong that the elongation and the strength tend to decrease rather, making it difficult to use the thermoplastic elastomer composition for various applications (deteriorating the practicability).

In addition, the clay is preferably such that the clay in a single-layer morphology (single-layered clay) be present in the composition. The presence of such a clay in the single-layered morphology can be confirmed by observing the surface of the composition under a transmission electron microscope (TEM).

Moreover, regarding the thermoplastic elastomer composition of the present invention, when randomly selected three or more measurement points in a size of 5.63 $\mu m^2$ on the surface of the thermoplastic elastomer composition are observed under a transmission electron microscope (TEM), 50% or more (more preferably 70% or more, further preferably 80 to 100%, and particularly preferably 85 to 100%) of all the clay based on the number is preferably present as the single-layered clay in all the measurement points. If the ratio of the single-layered clay present is less than the lower limit, the elongation at break and the strength at break tend to be lowered. Note that the ratio (proportion) of such a single-layered clay present can be determined as follows. Specifically, a transmission electron microscope (for example, one manufactured by JEOL Ltd. under the trade name of "JEM-2010") is used; 10 g of the thermoplastic elastomer composition is prepared as a sample; three or more measurement points in a size of 5.63 $\mu m^2$ on the surface of the thermoplastic elastomer composition are each observed; the number of the single-layered clay and the number of the multi-layered clay are determined in each TEM image obtained by such observation; the ratio (proportion) of the single-layered clay present relative to all the clay is calculated for each of the measurement points (each of the TEM images) based on these numbers to determine the above-described ratio. Note that the interlayer distance of montmorillonite having a multi-layered structure before taking the single-layer morphology is about 9.8 angstrom, whereas the interlayer distances of ordinary organically modified clays are about 20 to 40 angstrom (2 to 4 nm). In addition, when an ordinary organically modified clay is dispersed in an organic solvent and single-layers are formed, the interlayer distance thereof is 50 angstrom (>5 nm) or more. Hence, layers may be determined as single-layers based on the fact that the interlayer distance of layers observed in a TEM image is wider than such an interlayer distance. As described above, layers may be determined to be in a single-layer state, for example, based on the fact that the intervals of the layers are 5 nm or more, and, in some cases, layers may be determined to be in a single-layer state based on the fact that the layers have intervals of several tens of nanometers or more, although it depends on the type of the clay.

Note that, in a case where the single-layered clay is contained at the above-described proportion (the abundance ratio) in the composition, the clay is contained more dispersedly than in a case where a multi-layered clay is directly dispersed (this is because the multi-layered clay is decomposed to form a single-layered clay), and hence the clay can be dispersed in the composition with a higher dispersibility. Thus, if the single-layered clay is contained at the above-described proportion in the composition, the higher dispersibility than in the case where the multi-layered clay is present in the composition can be obtained, so that the heat resistance and the tensile strength at break can be enhanced to higher levels. For this reason, it is more preferable the clay in a single-layered state be contained at the above-described proportion, and this causes the clay to be more dispersed, making it possible to more efficiently improve the heat resistance and the tensile strength at break. In addition, a method for causing the single-layered clay to be contained at the above-described proportion (the abundance ratio) is not particularly limited, and the single-layered clay can be contained at the above-described proportion more efficiently when a thermoplastic elastomer composition is produced by employing the method for producing a thermoplastic elastomer composition of the present invention to be described later.

In addition, the thermoplastic elastomer composition of the present invention is preferably such that when randomly selected three or more measurement points in a size of 5.63 $\mu m^2$ on the surface of the thermoplastic elastomer composition are observed under a transmission electron microscope, 1 to 100 (more preferably 3 to 80, and further preferably 5 to 50) be dispersed per $\mu m^2$ in all the measurement points. If the number of single layers of the clay is less than the lower limit, the amount of the clay is so small that a sufficient effect tends not to be obtained. Note that the number of the single layers of the clay can be determined by obtaining a TEM image by the same method as that for measuring the ratio of presence (proportion) of the single-layered clay.

In the thermoplastic elastomer composition of the present invention, the amount of the contained α-olefin-based resin having no chemical-bond cross-linking moiety (content ratio) is preferably 250 parts by mass or less, more preferably 5 to 250 parts by mass, further preferably 10 to 225 parts by mass, particularly preferably 25 to 200 parts by mass, and most preferably 35 to 175 parts by mass relative to 100 parts by mass of the elastomer component. If the amount of the contained α-olefin-based resin having no chemical-bond cross-linking moiety is less than the lower limit, the flowability tends to decrease. Meanwhile, if the amount of the α-olefin-based resin contained exceeds the upper limit, the mechanical properties (tensile strength at break, and compression set) tend to decrease.

Moreover, in the thermoplastic elastomer composition of the present invention, the amount of the contained α-olefin-based resin having no chemical-bond cross-linking moiety is preferably 1 to 50% by mass, more preferably 3 to 45% by mass, and further preferably 5 to 40% by mass relative to the total amount of the thermoplastic elastomer composition. If the amount of the contained α-olefin-based resin having no chemical-bond cross-linking moiety is less than the lower limit, the flowability tends to decrease. Meanwhile, if the amount of the α-olefin-based resin contained exceeds the upper limit, the mechanical properties (tensile strength at break, and compression set) tend to decrease.

Note that, in the thermoplastic elastomer composition of the present invention, properties depending on an application can be also imparted, as appropriate, according to a type of an elastomer component used. For example, in a thermoplastic elastomer composition containing the elastomeric polymer (A) as the elastomer component, the properties stemming from the side chain (a) can be imparted to the composition, and therefore the elongation at break, tensile strength at break, and flowability, in particular, can be improved. Meanwhile, in a thermoplastic elastomer composition containing the elastomeric polymer (B) as the elastomer component, the properties stemming from the covalent-bond cross-linking moiety in the side chain can be imparted to the composition, and therefore the resistance to compression set, in particular, can be improved. Note that, in a thermoplastic elastomer composition containing the elastomeric polymer (B) as the elastomer component, not only the properties stemming from the covalent-bond cross-linking moiety but also the properties stemming from the hydrogen-bond cross-linkable moiety (the hydrogen-bond cross-linkable moiety described for the side chain (a')) can be imparted to the composition, and therefore it is also possible to more improve the resistance to compression set while maintaining the flowability (formability). Thus, it is possible to even more efficiently exhibit properties desired for an application by changing the type of the side chain, the type of the polymer (B), and so on, as appropriate.

In addition, regarding the thermoplastic elastomer composition of the present invention, the thermoplastic elastomer composition containing the elastomeric polymer (A) as an elastomer component and the thermoplastic elastomer composition containing the elastomeric polymer (B) as an elastomer component may be produced separately, and then mixed with each other to prepare a thermoplastic elastomer composition containing the elastomeric polymers (A) and (B) as elastomer components. In addition, in the present invention, it is only necessary that at least the elastomeric polymers (A) and (B) be contained as the elastomer component. From the viewpoint of utilizing properties of covalent-bond cross-linking moieties more efficiently by causing a covalent-bond cross-linking moiety to be present in the composition, an additional elastomeric polymer having a side chain (b) other than the elastomeric polymer (B) may be mixed for use. For example, when an additional elastomeric polymer having a side chain (b) other than the elastomeric polymer (B) is used in combination in a case where the elastomeric polymer (A) is used as an elastomer component, it is also possible to provide, owing to the side chains contained in the composition, substantially the same properties as those of a thermoplastic elastomer composition utilizing the elastomeric polymer (B) containing a hydrogen-bond cross-linkable moiety and a covalent-bond cross-linking moiety in aside chain. In addition, when the thermoplastic elastomer composition containing the elastomeric polymers (A) and (B) as elastomer components is produced, or when a thermoplastic elastomer composition containing the elastomeric polymer (A) and the additional elastomeric polymer having a side chain (b) other than the elastomeric polymer (B) is produced, desired properties can also be exhibited, as appropriate, by changing, as appropriate, the ratio of these components (for example, the components including the elastomeric polymer (A) and the elastomeric polymer (B)).

In addition, when the thermoplastic elastomer composition of the present invention contains the elastomeric polymers (A) and (B) as elastomer components, the content ratio of the elastomeric polymer (A) to the elastomeric polymer (B) is preferably 1:9 to 9:1, and more preferably 2:8 to 8:2 in terms of the mass ratio ([polymer (A)]:[polymer (B)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

Moreover, when the thermoplastic elastomer composition of the present invention contains the elastomeric polymer (A) and an additional elastomeric polymer having a side chain (b) other than the elastomeric polymer (B) (hereinafter, sometimes referred to as "elastomeric polymer (C)") as elastomer components, the content ratio of the elastomeric polymer (A) to the elastomeric polymer (C) is preferably 1:9 to 9:1, and more preferably 2:8 to 8:2 in terms of mass ratio ([elastomeric polymer (A)]:[elastomeric polymer (C)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

In addition, regarding the thermoplastic elastomer composition of the present invention, when both the side chain (a') and the side chain (b) are present in the composition, the total amount of the side chain (a') and the total amount of the side chain (b) are preferably 1:9 to 9:1, and more preferably 2:8 to 8:2 based on the mass ratio. If the total amount of the side chain (a') is less than the lower limit, the flowability (formability) and the mechanical strength tend to be insufficient. Meanwhile, if the total amount of the side chain (a') exceeds the upper limit, the resistance to compression set tends to decrease. Note that such a side chain (a') is a concept including the side chain (a). For this reason, also when only the side chain (a) is contained as the side chain (a'), it is preferable that both the side chain (a) and the side chain (b) be present in the composition at the above-described mass ratio.

Furthermore, the thermoplastic elastomer composition of the present invention may contain an additional additive component (another component: an additive) as appropriate besides the elastomer component, the clay, and the α-olefin-based resin having no chemical-bond cross-linking moiety.

As an additive component (another component: an additive) further contained in the thermoplastic elastomer composition of the present invention, a paraffin oil is preferable from the viewpoint that the flowability can be more improved without deteriorating the various physical properties. Note that, in the case of using the paraffin oil in combination with a styrene block polymer to be described later, it is possible to cause the block polymer to absorb the oil component, so that processability improvement (flowability enhancement) by the oil addition, and enhancement in the mechanical properties by the addition of the styrene-based block polymer can be both achieved at sufficiently high levels. This leads to higher levels of production processability such as extrusion processability and injection moldability while more sufficiently maintaining the mechanical properties and the heat resistance. Moreover, in the case of using the paraffin oil, the thermoplastic elastomer composition tends to achieve excellent extrusion processability such that, when the composition heated is extruded from an orifice (such for example as an orifice having an opening with a diameter of 1 mm), for example, a cord-like composition extruded from the opening of the orifice has a shape (strand shape) sufficiently uniform in thickness and has a surface without any fluff. Such a paraffin oil is not particularly limited, but any known paraffin oil may be used as appropriate.

Then, when such a paraffin oil is measured by correlation ring analysis (n-d-M ring analysis) according to ASTM D3238-85 to obtain a percentage of the number of paraffin's carbon atoms to the total number of carbon atoms (paraffin part: $C_P$), a percentage of the number of naphthene's carbon atoms to the total number of carbon atoms (naphthene part: $C_N$), and a percentage of the number of aromatic carbon atoms to the total number of carbon atoms (aromatic part: $C_A$), it is preferable that the paraffin oil have 60% or more as the percentage ($C_P$) of the number of paraffin's carbon atoms to the total number of carbon atoms.

Moreover, in the paraffin oil, a kinematic viscosity at 40° C. measured according to JIS K 2283 (published in 2000) is preferably 50 mm$^2$/s to 700 mm$^2$/s, more preferably 150 to 600 mm$^2$/s, and further preferably 300 to 500 mm$^2$/s. If the kinematic viscosity (ν) is less than the lower limit, oil bleeding tends to occur. Meanwhile, if the kinematic viscosity (ν) exceeds the upper limit, sufficient flowability tends not to be imparted. As the kinematic viscosity of the paraffin oil, a value is employed which is measured under a temperature condition of 40° C. according to JIS K 2283 (published in 2000). For example, a value may be employed which is automatically measured under a temperature condition of 40° C. by using a Cannon-Fenske Viscometer (for example, one manufactured by SIBATA SCIENTIFIC TECHNOLOGY LTD. under the trade name "SO series") according to JIS K 2283 (published in 2000).

Further, in the paraffin oil, an aniline point measured by a U-tube method according to JIS K 2256 (published in 2013) is preferably 80° C. to 145° C., more preferably 100 to 145° C., and further preferably 105 to 145° C. As the aniline point of the paraffin oil, a value is employed which is measured by the U-tube method according to JIS K 2256 (published in 2013). For example, a value may be employed which is measured by using, for example, an aniline point tester (for example, one manufactured by Tanaka Scientific Limited. under the trade name "aap-6") according to JIS K 2256 (published in 2013).

Then, as the paraffin oil, any commercially available paraffin oil can be used as appropriate. Examples thereof usable as appropriate include oils manufactured by JXTG Nippon Oil & Energy Corporation under the trade names of "Super Oil M Series P200", "Super Oil M Series P400", and "Super Oil M Series P500S"; oils manufactured by Idemitsu Kosan Co., Ltd. under the trade names of "Diana Process Oil PW90", "Diana Process Oil PW150", and "Diana Process Oil PW380"; oils manufactured by JAPAN SUN OIL COMPANY, LTD. under the trade names of "SUNPAR series" (110, 115, 120, 130, 150, 2100, 2280, and so on); oils manufactured by ExxonMobil Corporation under the trade names of "Gargoyle Arctic series (1010, 1022, 1032, 1046, 1068, 1100, and so on)"; and the like.

When the paraffin oil is further contained in the thermoplastic elastomer composition of the present invention, the amount of the paraffin oil contained is preferably 10 to 1,500 parts by mass, more preferably 10 to 1,400 parts by mass, further preferably 50 to 1,200 parts by weight, particularly preferably from 75 to 1,100 parts by weight, and most preferably 100 to 1,000 parts by weight relative to 100 parts by mass of the elastomer component. Moreover, the amount of the paraffin oil contained is more preferably 600 parts by mass or less relative to 100 parts by mass of the elastomer component, and in this case, is preferably 10 to 600 parts by mass, more preferably 50 to 550 parts by mass, further preferably 75 to 500 parts by mass, and particularly 100 to 400 parts by mass. If the amount of the paraffin oil contained is less than the lower limit, the amount of the paraffin oil contained is so small that the effects that can be obtained by the addition of the paraffin oil (in particular, the effects of enhancing the flowability and the processability) tend to be insufficient in some cases. Meanwhile, if the amount of the paraffin oil contained exceeds the upper limit, bleeding of the paraffin oil tends to be induced easily. From the viewpoint that the JIS-A hardness is adjusted to a lower value (preferably 10 or less), the amount of the paraffin oil contained is preferably 500 to 1,500 parts by mass, more preferably 600 to 1,400 parts by mass, and further preferably 800 to 1,200 parts by mass.

When the paraffin oil is further contained in the thermoplastic elastomer composition of the present invention, the amount of the paraffin oil contained is preferably 20 to 80% by mass, preferably 20 to 60% by mass, more preferably 25 to 55% by mass, and further preferably 35 to 55% by mass relative to the total amount of the thermoplastic elastomer composition. If the amount of the paraffin oil contained is less than the lower limit, the amount of the paraffin oil contained is so small that sufficient effects in the flowability and the processability, in particular, tend not to be obtained. Meanwhile, if the amount of the paraffin oil contained exceeds the upper limit, bleeding of the paraffin oil tends to be induced easily. From the viewpoint that the JIS-A hardness is adjusted to a lower value (preferably 10 or less), the amount of the paraffin oil contained is preferably 50 to 80% by mass, more preferably 55 to 75% by mass, and further preferably 60 to 70% by mass.

In addition, as the additive component (the other component: the additive) further contained in the thermoplastic elastomer composition of the present invention, a styrene block copolymer having no chemical-bond cross-linking moiety is preferable from the viewpoint that the component does not interfere with the cross-linking reaction of the base elastomer. In this connection, the present inventors speculate as follows. Specifically, such a styrene block copolymer, when used, basically does not interfere with the cross-linking structure of the base elastomeric polymer (the above-mentioned elastomer component) or the cross-linking reaction during production, or thus does not damage the physical properties peculiar to the structure of the base elastomer cross-linked. Hence, it is possible to sufficiently maintain the properties stemming from the elastomer component and to reflect (impart) the excellent mechanical properties stemming from the styrene block copolymer (in particular, the tensile properties, compression set, and so on) to the thermoplastic elastomer composition of the present invention, so that the composition can have the higher levels of properties.

The styrene block copolymer which is a component preferably used in the thermoplastic elastomer composition of the present invention is one having no chemical-bond cross-linking moiety. The expression "having no chemical-bond cross-linking moiety" mentioned herein has the same meaning as that described for the α-olefin-based resin. Accordingly, as the styrene block copolymer having no chemical-bond cross-linking moiety, preferably used is a copolymer that neither contains any functional group (for example, a hydroxy group, a carbonyl group, a carboxyl group, a thiol group, an amide group, or an amino group) capable of forming a cross-linking point by chemical bonding, nor contains a bonding moiety with which polymer chains are directly cross-linked (such as a cross-linking moiety by a covalent bond). Moreover, such a styrene block copolymer having no chemical-bond cross-linking moiety is a polymer that does not have at least any of the aforementioned side chain (a), side chain (a'), side chain (b), side chain (c), and the like.

Then, the "styrene block copolymer" mentioned herein may be a polymer having a styrene block structure in any moiety. In general, the styrene block copolymer has a styrene block structure. Moieties of the styrene block structures are flocculated to form physically cross-linking points (physically pseudo-cross-linking points) at normal temperature, and the physically pseudo-cross-linking points decompose when heated. Based on these properties, the styrene block copolymer is usable as a thermoplastic substance having rubber-like properties (such as elasticity) at normal temperature.

From the viewpoint that the rubber elasticity and thermoplasticity can be both achieved, preferable copolymers as the styrene block copolymer having no chemical-bond cross-linking moiety include a styrene-isoprene-styrene block copolymer (SIS), a styrene-ethylene-propylene-styrene block copolymer (SEPS), styrene-ethylene-ethylene-propylene-styrene block copolymer (SEEPS), a styrene-butadiene-styrene block copolymer (SBS), a styrene-ethylene-butylene-styrene block copolymer (SEBS), a styrene-isoprene-butadiene-styrene block copolymer (SIBS), and products thereof generated by addition of hydrogen (so-called hydrogenated products). Among them, SEBS and SEEPS are more preferable. One of these styrene block copolymers may be used alone, or two or more thereof may be used in combination.

Then, as the styrene block copolymer having no chemical-bond cross-linking moiety, a styrene block copolymer is preferable in which the styrene content is 20 to 40% by mass (more preferably, 25 to 37% by mass). If the styrene content is less than the lower limit, the thermoplasticity tends to decrease due to a decrease in the styrene block component. Meanwhile, if the styrene content exceeds the upper limit, the rubber elasticity tends to decrease due to a decrease in the olefin component. Here, the styrene content in the styrene block styrene block copolymer can be measured by a method in accordance with the IR method described in JIS K6239 (published in 2007).

Moreover, the weight average molecular weight (Mw) of the styrene block copolymer having no chemical-bond cross-linking moiety is preferably 200,000 to 700,000, both inclusive, more preferably 300,000 to 600,000, both inclusive, and further preferably 350,000 to 550,000, both inclusive. If the weight average molecular weight is less than the lower limit, the heat resistance tends to decrease. Meanwhile, if the weight average molecular weight exceeds the upper limit, the compatibility with the elastomeric polymer tends to decrease.

Further, the number average molecular weight (Mn) of the styrene block copolymer having no chemical-bond cross-linking moiety is preferably 100,000 to 600,000, both inclusive, more preferably 150,000 to 550,000, both inclusive, and further preferably 200,000 to 500,000, both inclusive. If the number average molecular weight is less than the lower limit, the heat resistance tends to decrease. Meanwhile if the number average molecular weight exceeds the upper limit, the compatibility with the elastomeric polymer (the aforementioned elastomer component) tends to decrease.

In addition, the polydispersity index (Mw/Mn) of the styrene block copolymer having no chemical-bond cross-linking moiety is preferably 5 or less, and more preferably 1 to 3. Here, these weight average molecular weight (Mw), number average molecular weight (Mn) and polydispersity index (Mw/Mn) can be determined by what is termed gel permeation chromatography (GPC). Then, "Prominence GPC system" manufactured by Shimadzu Corporation can be used for a specific instrument and conditions for measuring such molecular weights and so on.

Further, the glass-transition point of the styrene block copolymer having no chemical-bond cross-linking moiety is preferably −80 to −40° C., and more preferably −70 to −50. If the glass-transition point is less than the lower limit, the melting point is so low that the heat resistance tends to decrease. Meanwhile if the glass-transition point exceeds the upper limit, the rubber elasticity tends to decrease. Here, the "glass-transition point" mentioned herein is a glass transition point measured by differential scanning calorimetry (DSC) as described above. In such DSC measurement, it is preferable to set the rate of temperature rise at 10° C./min.

A method for producing the styrene block copolymer having no chemical-bond cross-linking moiety is not particularly limited, but any known method can be employed as appropriate. As such a styrene block copolymer, a commercially available product may be used, and it is possible to use, as appropriate, any of copolymers: manufactured by Kraton Corporation under the trade names of "G1633", "G1640", "G1641", "G1642", "G1643", "G1645", "G1650", "G1651", "G1652", "G1654", "G1657", and "G1660"; manufactured by KURARAY CO., LTD. under the trade names of "S4055", "S4077", "S4099", "S8006", "S4044", "S8006", "S4033", "S8004", "S8007", and "S8076"; manufactured by Asahi Kasei Corporation under the trade names of "Tuftec H1041", "Tuftec N504", "Tuftec H1272", "Tuftec M1911", "Tuftec M1913", and "Tuftec MP10"; and manufactured by ARONKASEI CO., LTD. under the trade names of "AR-710", "AR-720", "AR-731", "AR-741", "AR-750", "AR-760", "AR-770", "AR-781", and "AR-791"; and the like, for example.

Then, when the thermoplastic elastomer composition of the present invention further contains the styrene block copolymer having no chemical-bond cross-linking moiety, the amount of the contained styrene block copolymer having no chemical-bond cross-linking moiety (content ratio) is preferably 10 to 400 or less parts by mass, more preferably 15 to 350 parts by mass, further preferably 20 to 300 parts by mass, and particularly preferably 30 to 250 parts by mass relative to 100 parts by mass of the elastomer component. If the amount of the contained styrene block copolymer having no chemical-bond cross-linking moiety is less than the lower limit, the amount of the contained styrene block copolymer having no chemical-bond cross-linking moiety is so small that the sufficient effects tend not to be obtained particularly in the flowability and the processability. Meanwhile, if the amount of the styrene block copolymer contained exceeds the upper limit, the properties peculiar to the base structure of the cross-linked elastomer (the aforementioned properties stemming from the elastomer component) tend to be weak.

Moreover, when the thermoplastic elastomer composition of the present invention further contains the styrene block copolymer having no chemical-bond cross-linking moiety, the amount of the contained styrene block copolymer having no chemical-bond cross-linking moiety is preferably 5 to 60% by mass, more preferably 7 to 45% by mass, and further preferably 10 to 30% by mass relative to the total amount of the thermoplastic elastomer composition. If the amount of the contained styrene block copolymer having no chemical-bond cross-linking moiety is less than the lower limit, the amount of the styrene block copolymer contained is so small that the sufficient effects tend not to be obtained particularly in the flowability and the processability. Meanwhile, if the amount of the styrene block copolymer contained exceeds the upper limit, the properties peculiar to the base structure of the cross-linked elastomer (the aforementioned properties stemming from the elastomer component) tend to be weak.

In the present invention, from the viewpoints of improvements in the flowability and the mechanical properties, it is preferable to further contain both the paraffin oil and the styrene block copolymer having no chemical-bond cross-linking moiety as the additive components. In short, the thermoplastic elastomer composition of the present invention more preferably comprises the elastomer component, the clay, the α-olefin-based resin having no chemical-bond cross-linking moiety, the paraffin oil, and the styrene block copolymer having no chemical-bond cross-linking moiety.

Comprising the elastomer component, the clay, the α-olefin-based resin, the paraffin oil, and the styrene block copolymer as described above, the thermoplastic elastomer composition tends to be capable of exerting the higher levels of properties such as heat resistance, tensile strength at break, and further resistance to compression set in a well-balanced manner. Although it is not exactly clear why such effects can be achieved, the present inventors speculate as follows. Specifically, first, when the paraffin oil and the styrene block copolymer are used in combination, the paraffin oil is sufficiently uniformly dispersed in the system containing the styrene block copolymer because of sufficiently high compatibility between them. Moreover, since the styrene block copolymer and the α-olefin-based resin have high compatibility therebetween, they are uniformly dispersed in the system. Moreover, in the system containing the styrene block copolymer and the α-olefin-based resin, the elastomer component has high compatibility with both of them. Accordingly, the elastomer component is also sufficiently uniformly dispersed in the composition. Since the elastomer component and the clay interact with each other to form plane cross-linking as described above, the clay is also present in a state sufficiently dispersed with the dispersion of the elastomer component. Thus, when the elastomer component, the clay, the α-olefin-based resin, the paraffin oil, and the styrene block copolymer are contained, all the components are contained in the states sufficiently dispersed. For this reason, the state of the elastomer component which strongly influences the properties of the thermoplastic elastomer composition is that the elastomer component is sufficiently dispersed while having interaction with the clay (forming strong bonds by plane cross-linking), which makes it possible to exert the higher levels of mechanical strength and heat resistance in a well-balanced manner. Further, the α-olefin-based resin and the paraffin oil, which are components strongly influencing the flowability of the thermoplastic elastomer composition, are also sufficiently dispersed, so that the higher level of flowability (the flowability under heating) can be achieved. Still further, the styrene block copolymer enables adjustment of the mechanical strength depending on the amount of the styrene block copolymer added, and thus enables the thermoplastic elastomer composition to be adjusted to have desired mechanical physical properties. Therefore, the present inventors speculate that in the case of containing the elastomer component, the clay, the α-olefin-based resin, the paraffin oil, and the styrene block copolymer, it is possible to obtain the effects of exerting the higher levels of properties such as the heat resistance, the tensile strength at break, and further the resistance to compression set in a well-balanced manner.

Moreover, unless the object of the present invention is not impaired, the thermoplastic elastomer composition of the present invention may further contain, as needed, various kinds of additives or the like, such as polymers other than the elastomer component, the α-olefin-based resin and the styrene block copolymer), reinforcing agents (bulking agents), hydrogen bond reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers other than the paraffin oil (including what are termed softening agents), thioxotropy-imparting agents, ultraviolet absorbers, flame retardants, solvents, surfactants (including leveling agents), dispersing agents, dehydrating agents, corrosion inhibitors, tackiness agents, antistats, and fillers. These additives or the like are not particularly limited, and commonly used ones (publicly known ones) can be used as appropriate. For example, anti-aging agents, antioxidants, pigments (dyes), and plasticizers described below can be used as appropriate.

As the polymers other than the elastomer component, any publicly known polymer to be used as appropriate in the field of thermoplastic elastomers for the purposes of adjusting the hardness, maintaining the mechanical physical properties, and doing the like can be used as appropriate without particular limitation, and a different elastomeric polymer having the side chain (b) other than the elastomeric polymer (B) can be used preferably.

Meanwhile, examples of the reinforcing agents (bulking agents) include carbon black, silica, calcium carbonate, and the like. As the silica, Wet-process silica is preferably used.

As the anti-aging agents, for example, hindered phenol-based compounds, aliphatic and aromatic hindered amine-based compounds, and other compounds can be used, as appropriate. In addition, as the antioxidants, for example, butylhydroxytoluene (BHT), butylhydroxyanisole (BHA), and the like can be used, as appropriate. Meanwhile, as the pigments, for example, inorganic pigments such as titanium dioxide, zinc oxide, ultramarine, red iron oxide, lithopone, lead, cadmium, iron, cobalt, aluminum, hydrochloric acid salts, and sulfuric acid salts; organic pigments such as azo pigments and copper phthalocyanine pigments; masterbatches of them; and the like can be used as appropriate (as the color masterbatches of them, it is possible to use commercially available products (for example, ones manufactured by Nippon Pigment Company Limited under the trade name of "Nippisun Colour", color masterbatches manufactured by TOYO INK CO., LTD., color masterbatches manufactured by TOYO COLOR CO., LTD., and the like). Meanwhile, as the plasticizers, for example, derivatives of benzoic acid, phthalic acid, trimellitic acid, pyromellitic acid, adipic acid, sebacic acid, fumaric acid, maleic acid, itaconic acid, citric acid, and the like, as well as polyester, polyether, or epoxy-based plasticizers, and the like can be used as appropriate. As the plasticizers (softening agents), plasticizers usable for the thermoplastic elastomer from the viewpoint of further improving the flowability can be used as appropriate, and oils can be used, for example. Note that, as the additives and the like, those listed as examples in Japanese Unexamined Patent Application Publication No. 2006-131663 may also be used, as appropriate.

Note that when the thermoplastic elastomer composition of the present invention contains additional components (for example, the above-described additives or the like) other than the elastomer component, the clay, the α-olefin-based resin having no chemical-bond cross-linking moiety, the paraffin oil, and the styrene block copolymer having no chemical-bond cross-linking moiety, the amounts of the additional components contained are not particularly limited. Regarding each of a polymer and a reinforcing material (bulking agent), the amount is preferably 400 parts by mass or less, and more preferably 20 to 300 parts by mass relative to 100 parts by mass of the elastomer component. If the amount of the additional component contained is less than the lower limit, the effect of the use of the additional component tends not to be expressed sufficiently. Meanwhile, if the amount of the additional component contained exceeds the upper limit, the effect of the elastomer serving as a substrate tends to be less influential, so that physical properties tend to deteriorate, although it depends on the type of the component used.

In addition, when the above-described additional components are the other additives (when the above-described additional components are other than the polymer and the reinforcing material (bulking agent)), the amount of each additional component contained is preferably 20 parts by mass or less, and more preferably 0.1 to 10 parts by mass relative to 100 parts by mass of the elastomer component. If the amount of the additional component contained is less than the lower limit, the effect by the use of the additional component tends not to be expressed sufficiently. Meanwhile, if the amount of the additional component contained exceeds the upper limit, the additional component adversely affects the reaction of the elastomer serving as a substrate, so that the physical properties tend to deteriorate rather.

When the thermoplastic elastomer composition of the present invention is heated (for example, heated to 100 to 250° C.), dissociation or the like of hydrogen bonds formed at the hydrogen-bond cross-linkable moieties and other cross-linking structures (such as physical cross-linkages in the case where a styrene block copolymer is contained) occurs, so that the thermoplastic elastomer composition softens to provide flowability. This is presumably because the heating weakens the interaction (interaction mainly by hydrogen bonds) created between side chains intermolecularly or intramolecularly. Note that an elastomer component containing at least a hydrogen-bond cross-linkable moiety in a side chain is contained in the present invention. Owing to the above feature and so on, when the thermoplastic elastomer composition is left after the flowability is provided by the heating, the dissociated hydrogen bonds again form the bonds to harden the thermoplastic elastomer composition. Hence, it is also possible to cause the thermoplastic elastomer composition to express recyclability more efficiently depending on the constitution.

Further, in the thermoplastic elastomer composition of the present invention, the melt flow rate (MFR) measured at 230° C. under a load of 10 kg according to JIS K6922-2 (published in 2010) is preferably 2 g/10 min or more, more preferably 4 g/10 min or more, and more preferably 8 g/10 min or more. If the melt flow rate (MFR) is less than the lower limit, there is a tendency that the sufficient processability cannot be always expressed. Here, the melt flow rate (MFR) is a value measured according to the B method described in JIS K6922-2 (published in 2010) and can be obtained by using, as a melt flow rate measurement instrument, an instrument manufactured by Toyo Seiki Seisaku-sho, Ltd. under the trade name "Melt Indexer G-01". Specifically, 3 g of the thermoplastic elastomer composition is added to the furnace of the instrument, is heated to a temperature of 230° C., and then is left for 5 minutes at 230° C. Thereafter, under the conditions of the temperature kept at 230° C. and a load of 10 kg, a mass (g) of the elastomer is measured, as the melt flow rate, which flows out for 10 minutes from an opening of the tubular orifice member having a diameter of 1 mm and a length of 8 mm, and connected to a lower portion of the furnace (the composition is left for 5 minutes at temperature of 230° C. in the furnace, and then the measurement of the mass of the elastomer flowing out is started after the start of the load application).

Further, in the thermoplastic elastomer composition of the present invention, a 5% weight loss temperature is preferably 320° C. or above, and more preferably 325° C. or above. If the 5% weight loss temperature is less than the lower limit, the heat resistance tends to be poor. Here, the 5% weight loss temperature can be obtained by: preparing 10 mg of a thermoplastic elastomer composition as a measurement sample; using a thermogravimetric analyzer (TGA) as a measurement instrument to heat the thermoplastic elastomer composition at a rate of temperature rise of 10° C./min; and measuring a temperature at which the weight loss reaches 5% of the initial weight.

The thermoplastic elastomer composition of the present invention can be used with its properties such as the hardness changed by changing its constitution depending on an application. For example, for applications as gaskets, packings, stoppers and materials for 3D printer, the lower the hardness, the more desirable. In this case, the JIS-A hardness may be adjusted to 0 to 20 by decreasing the amount of the α-olefin resin contained in the composition, adding a large amount of a paraffin oil usable as a preferable component to the composition, or doing the like. Alternatively, for applications as rubber parts for automobile such as a weather strip, the higher the hardness, the more desirable. In this case, the JIS-A hardness may be adjusted to 60 to 90 by increasing the amount of the resin, decreasing the amount of the oil, or doing the like. In this way, it is desirable to use the thermoplastic elastomer composition of the present invention, the JIS-A hardness of which is adjusted to an optimal value by changing the constitution as appropriate depending on an application. The JIS-A hardness is not limited to a particular value, but is preferably 0 to 90 and more preferably 10 to 80. If the JIS-A hardness is less than the lower limit, the bleeding of the oil tends to occur. Meanwhile, if the JIS-A hardness exceeds the upper limit, the rubber elasticity tends to decrease.

The thermoplastic elastomer composition of the present invention can be used for, for example, various rubber applications by utilizing the rubber elasticity. The use of the thermoplastic elastomer composition of the present invention as a hot-melt adhesive or an additive contained in a hot-melt adhesive is preferable, because the heat resistance and the recyclability can be improved. The thermoplastic elastomer composition of the present invention can be used preferably for applications such as automotive rubber components, hoses, belts, sheets, antivibration rubbers, rollers, lining, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, PET bottle cap liners, and the like.

Specific examples of the above-described automotive rubber components include tire portions such as tread, carcass, sidewall, inner-liner, under-tread, and belt portions of tires; radiator grilles, side molding, garnishes (pillar, rear, and cowl top), aero parts (airdams and spoilers), wheel covers, weather strips, cowbelt grilles, air outlet louvers, air scoops, hood bulges, parts of ventilation ports, barrier parts (overfenders, side-seal panels, molding (window, hood, and door belt)), marks in the exterior; parts for interiors and window frames such as weather strips for doors, lights, and wipers, glass runs, and glass run channels; air duct hoses, radiator hoses, and brake hoses; parts for lubricating oil systems such as crankshaft seals, valve stem seals, head cover gaskets, A/T oil cooler hoses, transmission oil seals, P/S hoses, and P/S oil seals; parts for fuel systems such as fuel hoses, emission control hoses, inlet filler hoses, and diaphragms; antivibration parts such as engine mounts and in-tank pump mounts; boots such as CVJ boots and rack and pinion boots; air conditioning parts such as A/C hoses and A/C seals; parts for belts such as timing belts and belts for auxiliaries; sealers such as windshield sealers, vinyl plastisol sealers, anaerobic sealers, body sealers, and spot weld sealers; and the like.

In addition, when the thermoplastic elastomer composition of the present invention is contained as a rubber modifier, for example, an anti-flowing agent in a resin or rubber that undergoes cold flow at room temperature, the flow during extrusion and cold flow can be prevented.

The thermoplastic elastomer composition of the present invention can have a higher level of heat resistance and also exhibit a higher level of tensile property based on tensile strength at break. Note that it is possible to cause the thermoplastic elastomer composition to exhibit properties required depending on an application (for example, properties such as a self-repairing property) as appropriate, by changing the constitution as appropriate. Thus, properties required depending on an application of the thermoplastic elastomer composition can be exhibited as appropriate in a well-balanced manner by changing the constitution as appropriate. Hence, in a case of using a thermoplastic elastomer composition for any of the above-described various applications, it is preferable to use the thermoplastic elastomer composition with the types (constitution) of components in the composition changed as appropriate in consideration of the properties required depending on the application.

Hereinabove, the thermoplastic elastomer composition of the present invention is described. Next, a method for producing a thermoplastic elastomer composition of the present invention is described below, which can be preferably used as a method for producing the above-described thermoplastic elastomer composition of the present invention.

[Method for Producing Thermoplastic Elastomer Composition]

A method for producing a thermoplastic elastomer composition of the present invention comprises:

a first step of mixing an elastomeric polymer having a cyclic acid anhydride group in a side chain, a clay, and an α-olefin-based resin having no chemical-bond cross-linking moiety together to obtain a mixture; and a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein the thermoplastic elastomer composition obtained in the second step is a composition comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

the clay, a content ratio of which is 20 parts by mass or less relative to 100 parts by mass of the elastomer component; and the α-olefin-based resin, and in the first step, the elastomeric polymer having a cyclic acid anhydride group in a side chain, the clay, and the α-olefin-based resin are mixed by using the clay at such a ratio that the amount of the clay contained in the thermoplastic elastomer composition is 20 parts by mass or less relative to 100 parts by mass of the elastomer component. The first step and the second step are described separately below.

(First Step)

The first step is a step of mixing an elastomeric polymer having a cyclic acid anhydride group in aside chain, a clay, and an α-olefin-based resin having no chemical-bond cross-linking moiety together to obtain a mixture.

Here, the "elastomeric polymer having a cyclic acid anhydride group in a side chain" refers to an elastomeric polymer in which a cyclic acid anhydride group is chemically stably bonded (covalently bonded) to an atom forming the main chain of the polymer. For example, it is preferable to use a product obtained by a reaction of a polymer that can form a main chain portion of the elastomeric polymer (A) or (B) with a compound capable of introducing acyclic acid anhydride group.

Note that the polymer that can form a main chain portion is not particularly limited, as long as the polymer is generally a natural polymer or synthetic polymer having a glass-transition point of room temperature (25° C.) or lower (as long as the polymer is a so-called elastomer).

Examples of the polymers that can form the main chain portions of the elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), and hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubber; silicone rubber; urethane rubber; and the like.

In addition, the polymer that can form the main chain portion of the elastomeric polymer (A) or (B) may also be an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

Moreover, the polymer that can form the main chain portion of the elastomeric polymer (A) or (B) preferably comprises at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the polymer is preferably a diene-based rubber from the viewpoints of the ease of introduction of a maleic anhydride group preferred as the cyclic acid anhydride group, and the like, and is preferably an olefin-based rubber from the viewpoint of anti-ageing properties.

Meanwhile, examples of the compound capable of introducing a cyclic acid anhydride group include cyclic acid anhydrides such as succinic anhydride, maleic anhydride, glutaric anhydride, phthalic anhydride, and derivatives thereof.

In addition, the cyclic acid anhydride group of the elastomeric polymer having a cyclic acid anhydride group in a side chain used in the first step is preferably a succinic anhydride group, a maleic anhydride group, a glutaric anhydride group, or a phthalic anhydride group. Especially, a maleic anhydride group is more preferable, from the viewpoints that the raw material has high reactivity and further the raw material is industrially readily available.

Moreover, the elastomeric polymer having a cyclic acid anhydride group in a side chain used in the first step may be produced by a commonly used method, for example, by a method of graft polymerization of a cyclic acid anhydride onto a polymer that can form the main chain portion of the elastomeric polymer (A) or (B) under commonly employed conditions, for example, by stirring under heating or the like. In addition, it is also possible to use a commercially available product as the elastomeric polymer having a cyclic acid anhydride group in a side chain used in the first step.

Examples of commercially available products of the elastomeric polymer having a cyclic acid anhydride group in a side chain include maleic anhydride-modified isoprene rubbers such as LIR-403 (manufactured by KURARAY CO., LTD.) and LIR-410A (prototype provided by KURARAY CO., LTD.); modified isoprene rubbers such as LIR-410 (manufactured by KURARAY CO., LTD.); carboxy-modified nitrile rubbers such as Krynac 110, 221, and 231 (manufactured by Polysar Rubber Corporation); carboxy-modified polybutenes such as CPIB (manufactured by Nippon Petrochemicals Co., Ltd.) and HRPIB (prototype provided by the laboratory of Nippon Petrochemicals Co., Ltd.); maleic anhydride-modified ethylene-propylene rubbers such as Nucrel (manufactured by DUPONT-MITSUI POLYCHEMICALS CO., LTD), Yukaron (manufactured by Mitsubishi Chemical Corporation), TAFMER M (for example, MP0610 (manufactured by Mitsui Chemicals, Inc.), and MP0620 (manufactured by Mitsui Chemicals, Inc.)); maleic anhydride-modified ethylene-butene rubbers such as TAFMERM (for example, MA8510, MH7010, MH7020 (manufactured by Mitsui Chemicals, Inc.), MH5010, MH5020 (manufactured by Mitsui Chemicals, Inc.), and MH5040 (manufactured by Mitsui Chemicals, Inc.)); maleic anhydride-modified polyethylenes such as Adtex series (maleic anhydride-modified EVA, maleic anhydride-modified EMA (manufactured by Japan Polypropylene Corporation)), HPR series (maleic anhydride-modified EEA, maleic anhydride-modified EVA (manufactured by DuPont-Mitsui Polyolefin)), Bondfast series (maleic anhydride-modified EMA (manufactured by Sumitomo Chemical Company, Limited)), Dumilan series (maleic anhydride-modified EVOH (manufactured by Takeda Pharmaceutical Company Limited)), Bondine (ethylene-acrylic acid ester-maleic anhydride ternary copolymer (manufactured by ATOFINA)), Tuftec (maleic anhydride-modified SEBS, M1943 (manufactured by Asahi Kasei Corporation)), Kraton (maleic anhydride-modified SEBS, FG1901, FG1924 (manufactured by Kraton Polymers)), Tufprene (maleic anhydride-modified SBS, 912 (manufactured by Asahi Kasei Corporation)), Septon (maleic anhydride-modified SEPS (manufactured by KURARAY CO., LTD.)), Rexpearl (maleic anhydride-modified EVA, ET-182G, 224M, 234M (manufactured by Japan Polypropylene Corporation)), and Auroren (maleic anhydride-modified EVA, 200S, 250S (manufactured by NIPPON PAPER Chemicals CO., LTD.)); maleic anhydride-modified polypropylenes such as ADMER (for example, QB550, LF128 (manufactured by Mitsui Chemicals, Inc.)); and the like.

In addition, the elastomeric polymer having a cyclic acid anhydride group in a side chain is preferably a maleic anhydride-modified elastomeric polymer, and is more preferably a maleic anhydride-modified ethylene-propylene rubber or a maleic anhydride-modified ethylene-butene rubber from the viewpoints of high molecular weight and high strength.

Moreover, the clay used in the first step is the same as the clay described for the above-described thermoplastic elastomer composition of the present invention (the preferable clays are also the same). In addition, the α-olefin-based resin having no chemical-bond cross-linking moiety used in the first step is the same as the α-olefin-based resin having no chemical-bond cross-linking moiety described for the above-described thermoplastic elastomer composition of the present invention (the preferable α-olefin-based resins are also the same).

Then, in the first step, the elastomeric polymer having a cyclic acid anhydride group in a side chain, the clay, and the α-olefin-based resin having no chemical-bond cross-linking moiety are mixed together to obtain the mixture. In this mixture preparation step, an order of addition of the elastomeric polymer having a cyclic acid anhydride group in a side chain, the clay, and the α-olefin-based resin is not limited to a particular order. However, from the viewpoint of more improving the dispersibility of the clay, it is preferable to prepare a mixture precursor containing the α-olefin-based resin and the elastomeric polymer having a cyclic acid anhydride group in a side chain, and thereafter to add the clay to the precursor.

In addition, in adding the clay to obtain the mixture, it is preferable to plasticize the elastomeric polymer having a cyclic acid anhydride group in a side chain in advance and thereafter to add the clay so that the clay can be sufficiently dispersed, and it is more preferable to plasticize the mixture precursor and thereafter to add the clay thereto.

A method for plasticizing an elastomeric polymer having a cyclic acid anhydride group in a side chain or the mixture precursor is not limited to a particular one, and for example it is possible to employ, as appropriate, a method of mastication using rolls, a kneader, an extruder, an all-purpose mixer, or the like at temperature which allows these to be plasticized (for example, about 100 to 250° C.), or the like. The conditions such as temperature for plasticizing the elastomeric polymer having a cyclic acid anhydride group in a side chain or the mixture precursor are not particularly limited, and may be set, as appropriate, according to the type of a component contained (for example, the type of the elastomeric polymer having a cyclic acid anhydride group in a side chain) and the like.

Moreover, in the mixture preparation step, the elastomeric polymer having a cyclic acid anhydride group in a side chain, the clay, and the α-olefin-based resin having no chemical-bond cross-linking moiety are preferably mixed by using the clay at such a ratio that the amount of the clay contained in the finally obtained thermoplastic elastomer composition is 20 parts by mass or less (more preferably 0.1 to 10 parts by mass, further preferably 0.5 to 5 parts by mass, and particularly preferably 1 to 3 parts by mass) relative to 100 parts by mass of the elastomer component. If the amount of the clay contained exceeds the upper limit, the cross-linking is so strong that the elongation and the strength tend to decrease rather. Meanwhile, if the amount of the clay contained is less than the lower limit, the amount of the clay is so small that the effects obtained by the use of the clay tend to decrease.

In addition, the amount of the clay contained in the mixture is preferably 20 parts by mass or less, more preferably 0.5 to 5 parts by mass, and further preferably 1 to 3 parts by mass, relative to 100 parts by mass of the elastomeric polymer having a cyclic acid anhydride group in a side chain. If the content is less than the lower limit, the amount of the clay is so small that the effect obtained by using the clay tends to be lowered. Meanwhile, if the content exceeds the upper limit, the cross-linking is so strong that the elongation and the strength tend to be lowered rather. Note that when the clay is used at such a content, the amount of the clay contained in the finally obtained thermoplastic elastomer composition takes a value within the above-described range.

Moreover, the amount of the clay used for forming such a mixture is preferably such that the clay be contained at such a ratio that the amount of the clay is 0.01 g to 2.0 g (more preferably 0.02 to 1.0 g) per millimole of the cyclic acid anhydride group in the elastomeric polymer having a cyclic acid anhydride group in a side chain. If the ratio of the clay to the acid anhydride group is less than the lower limit, the amount is so small that the effect tends to be lowered. Meanwhile, if the ratio exceeds the upper limit, the cross-linking is so strong that the elongation and the strength tend to be lowered rather. Note that when the clay is contained within such a range of ratio, the clay introduced into the mixture is efficiently decomposed, so that the single-layered clay tends to be produced efficiently, and the dispersibility of the clay tends to be higher.

Still further in the mixture preparation step, the elastomeric polymer having a cyclic acid anhydride group in a side chain, the clay, and the α-olefin-based resin having no chemical-bond cross-linking moiety are preferably mixed by using the α-olefin-based resin at such a ratio that the amount of the α-olefin-based resin (the α-olefin-based resin having no chemical-bond cross-linking moiety) contained in the finally obtained thermoplastic elastomer composition is 250 parts by mass or less (more preferably 5 to 250 parts by mass, further preferably 10 to 225 parts by mass, particularly preferably 25 to 200 parts by mass, and most preferably 35 to 175 parts by mass) relative to 100 parts by mass of the elastomer component. If the amount of the α-olefin-based resin contained exceeds the upper limit, the mechanical properties (the tensile strength at break and the compression set) tend to decrease. Meanwhile, if the amount of the α-olefin-based resin contained is less than the lower limit, the flowability tends to decrease.

Then, the amount of the α-olefin-based resin contained in the mixture is preferably 250 parts by mass or less (more preferably 5 to 250 parts by mass, further preferably 10 to 225 parts by mass, particularly preferably 25 to 200 parts by mass, and most preferably 35 to 175 parts by mass) relative to 100 parts by mass of the elastomeric polymer having a cyclic acid anhydride group in a side chain. If the amount of the α-olefin-based resin contained is less than the lower limit, the mechanical properties (the tensile strength at break and the compression set) tend to decrease. Meanwhile, if the amount of the α-olefin-based resin contained is less than the lower limit, the flowability tends to decrease.

A mixing method for obtaining the mixture is not limited to a particular one, but any publicly known method or the like can be employed as appropriate. For example, it is possible to employ a method of mixing with rolls, a kneader, an extruder, an all-purpose mixer, or the like.

In addition, from the viewpoint of further increasing the flowability and the mechanical strength, the mixture may further contain a paraffin oil and/or a styrene block copolymer having no chemical-bond cross-linking moiety. The paraffin oil and the styrene block copolymer having no chemical-bond cross-linking moiety are the same as the paraffin oil and the styrene block copolymer having no chemical-bond cross-linking moiety described for the thermoplastic elastomer composition of the present invention (the preferable ones are also the same).

When the mixture further contains the paraffin oil and/or the styrene block copolymer having no chemical-bond cross-linking moiety, an order of addition of the elastomeric polymer having a cyclic acid anhydride group in a side chain, the clay, the α-olefin-based resin, the paraffin oil and/or the styrene block copolymer having no chemical-bond cross-linking moiety is not limited to a particular order. However, from the viewpoint of more improving the dispersibility of the clay, it is preferable to prepare a mixture precursor containing the α-olefin-based resin, the elastomeric polymer having a cyclic acid anhydride group in a side chain, and the paraffin oil and/or the styrene block copolymer having no chemical-bond cross-linking moiety, and thereafter to add the clay to the precursor.

When the paraffin oil is contained in the mixture, the amount of the paraffin oil contained is preferably 1,500 parts by mass or less relative to 100 parts by mass of the elastomer component, and in this case is preferably 10 to 1,500 parts by mass, more preferably 10 to 1,400 parts by mass, further preferably 50 to 1,200 parts by weight, particularly preferably from 75 to 1,100 parts by weight, and most preferably 100 to 1,000 parts by weight relative to 100 parts by mass of the elastomer component. Moreover, the amount of the paraffin oil contained is more preferably 600 parts by mass or less relative to 100 parts by mass of the elastomer component, and in this case, is more preferably 10 to 600 parts by mass, further preferably 50 to 550 parts by mass, particularly preferably 75 to 500 parts by mass, and most preferably 100 to 400 parts by mass. If the amount of the paraffin oil contained is less than the lower limit, the amount of the paraffin oil contained is so small that the effects that can be obtained by the addition of the paraffin oil (in particular, the effects of enhancing the flowability and the processability of the finally obtained thermoplastic elastomer composition) tend not to be necessarily sufficient. Meanwhile, if the amount of the paraffin oil contained exceeds the upper limit, bleeding of the paraffin oil tends to be induced easily in the finally obtained thermoplastic elastomer composition. Meanwhile, when the styrene block copolymer having no chemical-bond cross-linking moiety is contained in the mixture, the amount of the styrene block copolymer contained is preferably 400 parts by mass or less, more preferably 10 to 400 parts by mass, further preferably 15 to 350 parts by mass, particularly preferably 20 to 300 parts by mass, and most preferably 30 to 250 parts by mass relative to 100 parts by mass of the elastomer component.

Furthermore, unless the object of the present invention is not impaired, the mixture may further contain, depending on an application or the like of the finally obtained thermoplastic elastomer composition, an additional component(s) such as: polymers besides the elastomer component, the α-olefin-based resin and the styrene block copolymer; and various kinds of additives including reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers, thioxotropy-imparting agents, ultraviolet absorbers, flame retardants, solvents, surfactants (including leveling agents), dispersing agents, dehydrating agents, corrosion inhibitors, tackiness agents, antistats, fillers, and the like. When the mixture contains such an additional component, the component can be contained as appropriate in the finally obtained thermoplastic elastomer composition. Here, these additives and the like are not particularly limited, and commonly used ones (known ones) can be used, as appropriate. Then, as these additives and the like, those described above for the thermoplastic elastomer composition of the present invention may be used as appropriate.

Moreover, when an additional component is a polymer or a reinforcing agent (bulking agent), an amount of the additional component contained is preferably 500 parts by mass or less and more preferably 20 to 400 parts by mass relative to 100 parts by mass of the elastomer component. If the amount of the additional component contained is less than the lower limit, the effects obtained by the use of the additional component tend not to be expressed sufficiently. Meanwhile, if the amount of the additional component contained exceeds the upper limit, the effects of the elastomer serving as a substrate tend to be less influential, so that physical properties tend to deteriorate, although it depends on the type of the component used.

Meanwhile, when the additional components are the other additives (when the additional components are other than the polymers and reinforcing materials (bulking agents)), the amount of the additional components contained is preferably 20 parts by mass or less, and more preferably 0.1 to 10 parts by mass relative to 100 parts by mass of the elastomer component. If the amount of the additional components contained is less than the lower limit, the effect of the use of the additional components tends to be expressed insufficiently. Meanwhile, if the amount of the additional components contained exceeds the upper limit, the reaction of the elastomer serving as the substrate is adversely affected, so that physical properties tend to be lowered rather.

(Second Step)

The second step is a step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition.

As the compound (I) that forms a hydrogen-bond cross-linkable moiety upon a reaction with the cyclic acid anhydride group, the same compound as the compound that forms a hydrogen-bond cross-linkable moiety (the compound capable of introducing a nitrogen-containing heterocycle) described for the above-described thermoplastic elastomer composition of the present invention can be used preferably. For example, the compound (I) may be the nitrogen-containing heterocycle described for the above-described thermoplastic elastomer composition of the present invention itself, or may be a compound in which a substituent (for example, a hydroxy group, a thiol group, an amino group, or the like) that reacts with a cyclic acid anhydride group of maleic anhydride or the like is bonded to the above-described nitrogen-containing heterocycle (a nitrogen-containing heterocycle having the above-described substituent). Note that, as the compound (I), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may be used (note that a side chain having both a hydrogen-bond cross-linkable moiety and a covalent-bond cross-linking moiety can be considered as a preferred mode of the side chain having a hydrogen-bond cross-linkable moiety).

In addition, the compound (I) is not particularly limited, and it is possible to select and use, as appropriate, a preferred compound among the above-described compounds (I) according to the type of the side chain (the side chain (a) or the side chain (a')) in the target polymer. The compound (I) is preferably triazole, pyridine, thiadiazole, imidazole, isocyanurate, triazine, and hydantoins optionally having at least one substituent selected from hydroxy groups, thiol groups, and amino groups, more preferably triazole, pyridine, thiadiazole, imidazole, isocyanurate, triazine, and hydantoin having the above-described substituent, further preferably triazole, isocyanurate, or triazine having the above-described substituent, and particularly preferably triazole having the above-described substituent from the viewpoint that a higher reactivity can be obtained. Note that examples of the triazole, pyridine, thiadiazole, imidazole, and hydantoin optionally having the substituents include 4H-3-amino-1,2,4-triazole, aminopyridine, aminoimidazole, aminotriazine, aminoisocyanurate, hydroxypyridine, hydroxyethyl isocyanurate, and the like.

Meanwhile, as the compound (II) that forms a covalent-bond cross-linking moiety upon a reaction with the cyclic acid anhydride group, a compound which is the same as the "compound that forms a covalent-bond cross-linking moiety (the compound that forms a covalent bond)" described for the above-described thermoplastic elastomer composition of the present invention can be used preferably (compounds preferred as the compound (II) are also the same). In addition, as the compound (II), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may also be used (note that a side chain having both a hydrogen-bond cross-linkable moiety and a covalent-bond cross-linking moiety can be considered as a preferred mode of the side chain having a covalent-bond cross-linking moiety).

The compound (II) is preferably tris(hydroxyethyl) isocyanurate, sulfamide, or polyether polyol, more preferably tris(hydroxyethyl) isocyanurate or sulfamide, and further preferably tris(hydroxyethyl) isocyanurate, from the viewpoint of resistance to compression set.

Then, as the compound (I) and/or (II), it is preferable to use a compound having at least one substituent among hydroxy groups, thiol groups, amino groups, and imino groups from the viewpoint of introducing a hydrogen-bond cross-linkable moiety. Moreover, as the compound (I) and/or (II), it is preferable to use a compound that forms both of a hydrogen-bond cross-linkable moiety and a covalent-bond cross-linking moiety by reacting with the cyclic acid anhydride group (a compound that can introduce both of a hydrogen-bond cross-linkable moiety and a covalent-bond cross-linking moiety at the same time), because both of the hydrogen-bond cross-linkable moiety and the covalent-bond cross-linking moiety can be introduced more efficiently to the composition. As the compound that forms both of a hydrogen-bond cross-linkable moiety and a covalent-bond cross-linking moiety, the aforementioned heterocycle-containing polyol, heterocycle-containing polyamine, and heterocycle-containing polythiol can be preferably used, and tris(hydroxyethyl) isocyanurate is particularly preferable among them.

In addition, a preferable compound as the raw material compound (compound (I) and/or (II)) is at least one compound among triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, hydrocarbon compounds having two or more substituents of at least one type selected from hydroxy groups, thiol groups, and amino groups, tris(hydroxyethyl) isocyanurates, sulfamides, and polyether polyols. More specifically, as the hydrocarbon compounds having two or more substituents of at least one type selected from hydroxy groups, thiol groups, and amino groups, pentaerythritol, ethanedithiol, and ethanediamine are preferable, and pentaerythritol is more preferable.

In addition, the amount of the compound (I) and the compound (II) added (the total amount thereof: when only one compound is used, the amount of the one compound) is not particularly limited. In a case where active hydrogen of an amine, an alcohol, or the like is contained in the compound, the amount of the compound (I) and the compound (II) is such that the resulting amount of the active hydrogen of an amine, an alcohol, or the like in the compound is preferably 20 to 250% by mole, more preferably 50 to 150% by mole, and further preferably 80 to 120% by mole relative to 100% by mole of the cyclic acid anhydride group. If the amount added is less than the lower limit, the amount of the side chain introduced is reduced, making it difficult to obtain a sufficiently high level of cross-linking density, so that physical properties such as tensile strength tend to be lowered. Meanwhile, if the amount added exceeds the upper limit, the amount of the compound used is so large that many branches tends to be formed, and the cross-linking density tends to be rather lowered.

In addition, regarding the amount of the compound (I) and the compound (II) added, the total amount thereof (when only one compound is used, the amount of the one compound) is preferably 0.1 to 10 parts by mass, more preferably 0.3 to 7 parts by mass, and further preferably 0.5 to 5.0 parts by mass, relative to 100 parts by mass of the polymer (an elastomeric polymer having a cyclic acid anhydride group in a side chain) in the mixture. If the amount of the compound (I) and the compound (II) added (the amount based on parts by mass) is less than the lower limit, the amount is so small that the cross-linking density does not increase, and desired physical properties tend not to be expressed. Meanwhile, if the amount exceeds the upper limit, the amount is so large that many branches tends to be formed, and the cross-linking density tends to be lowered.

When both the compound (I) and the compound (II) are used, the order of addition of the compound (I) and the compound (II) is not particularly limited, and either one may be added first. In addition, when both the compound (I) and the compound (II) are used, the compound (I) may be reacted with part of the cyclic acid anhydride groups in the elastomeric polymer having a cyclic acid anhydride group in a side chain. This also makes it possible to form a covalent-bond cross-linking moiety by a reaction of unreacted cyclic acid anhydride groups (cyclic acid anhydride groups not reacted) with the compound (II). Herein, the "part" is preferably 1% by mole or more and 50% by mole of less relative to 100% by mole of the cyclic acid anhydride group. Within this range, the effect of the introduction of the group derived from the compound (I) (for example, a nitrogen-containing heterocycle or the like) tends to be sufficiently expressed in the obtained elastomeric polymer (B), and the recyclability thereof tends to be further improved. Note that the compound (II) is preferably reacted with the cyclic acid anhydride group such that the cross-linkages formed by the covalent bonds can be in a suitable number (for example, 1 to 3 in one molecule).

When the polymer is reacted with the raw material compound (compound (I) and/or compound (II)), the cyclic acid anhydride group of the polymer undergoes ring-opening, so that the cyclic acid anhydride group and the raw material compound (the compound (I) and/or compound (II)) are chemically bonded to each other. A temperature condition for the reaction (ring-opening of the cyclic acid anhydride group) of the polymer with the raw material compound (the compound (I) and/or compound (II)) is not particularly limited, and may be adjusted to a temperature at which the compound and the cyclic acid anhydride group can react with each other according to the types of the compound and the cyclic acid anhydride group. The temperature condition is preferably 100 to 250° C., and more preferably 120 to 230° C., from the viewpoint that the reaction is allowed to proceed in a moment by softening.

Such a reaction results in the formation of at least a hydrogen-bond cross-linkable moiety at a site where the compound (I) has reacted with the cyclic acid anhydride group. Hence, it is possible to cause a side chain of the polymer to contain a hydrogen-bond cross-linkable moiety (a moiety having a carbonyl-containing group and/or a nitrogen-containing heterocycle, more preferably a moiety having a carbonyl-containing group and a nitrogen-containing heterocycle). The side chain formed (introduced) by the reaction can be one containing the structure represented by the above-described formula (2) or (3).

In addition, at a site where the compound (II) has reacted with a cyclic acid anhydride group during the reaction, at least a covalent-bond cross-linking moiety is formed. Hence, a side chain of the polymer can be one containing a covalent-bonding cross-linking portion (a side chain (b) or a side chain (c)). Thus, side chains formed by such a reaction can be those containing the structures represented by the above-described formulae (7) to (9).

Note that groups (structures) of side chains in such polymers, specifically, unreacted cyclic acid anhydride groups, the structures represented by the above-described formulae (2), (3), and (7) to (9), and the like can be identified by ordinarily used analytic techniques such as NMR or IR spectroscopy.

Through the reaction as mentioned above, it is possible to obtain a compound comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay, a content ratio of which is 20 parts by mass or less relative to 100 parts by mass of the elastomer component; and the α-olefin-based resin.

Note that the elastomeric polymer (A) and the elastomeric polymer (B) in the thermoplastic elastomer composition thus obtained are the same as the elastomeric polymer (A) and the elastomeric polymer (B) described above for the thermoplastic elastomer composition of the present invention, except that the side chain (a), the side chain (a'), the side chain (b), and the side chain (c) in the polymers are each derived from a reaction with a cyclic acid anhydride group (for example, such as a side chain containing the structure represented by any of the above-described formulae (2), (3), and (7) to (9)).

Note that, in the present invention, it is preferable that the elastomeric polymer having a cyclic acid anhydride group in a side chain be a maleic anhydride-modified elastomeric polymer and the elastomer component be a reaction product of a maleic anhydride-modified elastomeric polymer with at least one compounds among triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, hydrocarbon compounds having two or more substituents of at least one type selected from hydroxy groups, thiol groups, and amino groups, tris(hydroxyethyl) isocyanurates, sulfamides, and polyether polyols.

Note that, according to the present invention, it is possible to efficiently produce a thermoplastic elastomer composition capable of having sufficiently high levels of heat resistance and tensile strength at break. Although it is not exactly clear why such effects are achieved by the present invention, the present inventors speculate as follows. Specifically, first, in the present invention, the thermoplastic elastomer composition is produced by modifying the elastomeric polymer having a cyclic acid anhydride group in a side chain (hereinafter, sometimes referred to as "acid anhydride-containing polymer"). By dispersing the clay in the acid anhydride polymer in advance by mixing the clay with the acid anhydride polymer as described above, the acid anhydride groups and the clay interact with each other to facilitate the delamination of layers of the clay. Especially when the clay is an organically modified clay preferably usable in the present invention, the organic material such as an ammonium salt present between layers more efficiently interacts with the acid anhydride. Hence, the organically modified clay tends to cause delamination of the layers more easily. In addition, after the clay is dispersed, the raw material compound (which functions as a cross-linking agent that forms cross linkages, and which is hereinafter sometimes referred to as a "cross-linking agent") is added. Consequently, the cross-linking agent reacts with acid anhydride groups, and at least hydrogen-bond cross-linkable moieties (for example, carboxylic acid groups, or the like) are generated in the system. For this reason, interaction of hydrogen bonds with the clay is caused, and the clay is further dispersed in the elastomer. The present inventors speculate that, for this reason, the clay is sufficiently dispersed in the thermoplastic elastomer composition obtained by the present invention, and the clay interacts with the hydrogen-bond cross-linkable moieties to form plane cross-linking moieties uniformly, so that the sufficient heat resistance can be obtained. Moreover, in the present invention, the obtained thermoplastic elastomer composition contains the α-olefin-based resin together with the clay and the elastomer component. The present inventors speculate that since the α-olefin-based resin is a substance with high crystallinity, the α-olefin-based resin can exhibit high flowability stemming from a change in the crystal structure under heating. The present inventors speculate that, for this reason, the present invention makes it possible for the obtained thermoplastic elastomer composition to have sufficiently high levels of heat resistance and tensile strength at break and also have resistance to compression set and hardness with which the thermoplastic elastomer composition is sufficiently usable as a rubber product, and to be provided with flowability under heating.

In addition, as described above, the thermoplastic elastomer composition obtained by the present invention can be such that a single-layered clay is contained in the composition. Moreover, the thus obtained thermoplastic elastomer composition can also be such that, when randomly selected three or more measurement points in a size of 5.63 $\mu m^2$ on a surface of the thermoplastic elastomer composition are observed under a transmission electron microscope (TEM), 50% or more (more preferably 70% or more, further preferably 80 to 100%, and particularly preferably 85 to 100%) of all the clay based on the number is present as the single-layered clay in all the measurement points. If the ratio of such a single-layered clay present is less than the lower limit, the elongation at break and the strength at break tend to be lowered.

Note that the method for producing a thermoplastic elastomer composition of the present invention makes it possible to more efficiently adjust the ratio of the clay (single-layered clay) present in the single-layer morphology in the thermoplastic elastomer composition to the above-described preferred ratio. Regarding this point, the present inventors speculate that the clay interacts with cyclic acid anhydride groups in the above-described first step, making it possible to more efficiently delaminate layers of the clay having the multi-layered structure, and in turn making it possible to disperse (finely disperse) the clay in the single-layer state, so that the clay in the single-layer morphology (single-layered clay) is present at a higher ratio in the composition, which makes it possible for the composition to contain the single-layered clay at the above-described preferred ratio. Note that the presence of the clay in such a single-layered morphology can be confirmed by observing the surface of the obtained composition under a transmission electron microscope (TEM).

In addition, in the present invention, it is also possible to, for example, separately produce a thermoplastic elastomer composition containing an elastomeric polymer (A) as an elastomer component and a thermoplastic elastomer composition containing an elastomeric polymer (B) as an elastomer component, followed by mixing to prepare an thermoplastic elastomer composition containing the elastomeric polymers (A) and (B) as elastomer components. Meanwhile, when a thermoplastic elastomer composition containing a combination of the elastomeric polymers (A) and (B) as elastomer components is produced, it is also possible to cause a desired property to be exhibited by changing the ratio of the elastomeric polymer (A) and the elastomeric polymer (B), as appropriate, to change, as appropriate, the ratio between the hydrogen-bond cross-linkable moieties and the covalent-bond cross-linking moieties present in the composition and the like.

The thus obtained thermoplastic elastomer composition can be preferably used for, for example, various rubber applications by utilizing its rubber elasticity, and, for example, can be used preferably for applications such as hot-melt adhesives, or additives added thereto, automotive rubber components, hoses, belts, sheets, antivibration rubbers, rollers, linings, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, and PET bottle cap liners.

Thus, the thermoplastic elastomer composition of the present invention is useful as materials and the like for producing various kinds of rubber products for use in the fields of, for example, electrical and electronic instruments, home appliances, chemicals, pharmaceuticals, glass, earth materials, steels, nonferrous metals, machineries, precision equipment, cosmetics, textiles, mining, pulp, paper, construction/civil engineering/building, foods/beverages, general consumer goods/services, transportation equipment, construction machines, electrical equipment, facilities (industrial facilities, air conditioners, hot water supplies, energy farms), metals, media, information, communication devices, lighting devices, displays, agriculture, fishery, forestry, marine industry, agribusiness, biotechnologies, nanotechnologies, and the like.

Hereinabove, the method for producing a thermoplastic elastomer composition of the present invention comprising the aforementioned first step and the aforementioned second step has been described as one of the methods preferably usable to produce a thermoplastic elastomer composition of the present invention, but the methods preferably usable to produce a thermoplastic elastomer composition of the present invention are not limited to the aforementioned one. For example, the aforementioned method for producing a thermoplastic elastomer composition of the present invention is preferably usable in the case such as one where the elastomer component is the aforementioned reaction product (I). Instead, in the case of producing a thermoplastic elastomer composition in which the elastomer component is an elastomer component of the reaction product (II), for example, the same method as the aforementioned method for producing a thermoplastic elastomer composition of the present invention may be employed, except that a hydroxy group-containing elastomeric polymer is used instead of the elastomeric polymer having a cyclic acid anhydride group in a side chain used in the aforementioned first step, and a compound having two or more substituents of at least one type selected from carboxy groups and alkoxysilyl groups is used instead of the raw material compound used in the aforementioned second step. For example, it is possible to produce a thermoplastic elastomer composition containing any of the aforementioned reaction products (II) to (VI) as the elastomer component, by employing the same method as the aforementioned method for producing a thermoplastic elastomer composition of the present invention except that the type of the elastomeric polymer used in the first step and the type of the raw material compound are changed as appropriate depending on the type of the targeted elastomer component.

EXAMPLES

Hereinafter, the present invention is described more specifically on the basis of Examples and Comparative Examples; however, the present invention is not limited to Examples below.

First, methods for evaluating properties of thermoplastic elastomer compositions obtained in Examples and Comparative Examples are described.

<Melt Flow Rate (MFR)>

Each of the thermoplastic elastomer compositions obtained in Examples and Comparative Examples was used to measure the melt flow rate (MFR, unit: g/10 min) according to the B method described in JIS K6922-2 (published in 2010). More specifically, each of the thermoplastic elastomer compositions obtained in Examples and Comparative Examples was used and an instrument manufactured by Toyo Seiki Seisaku-sho, Ltd. under the trade name "Melt Indexer G-01" was used as a melt flow rate measurement instrument. Then, 3 g of the thermoplastic elastomer composition was added to the furnace of the instrument, was heated to a temperature of 230° C., and then was left for 5 minutes at 230° C. Thereafter, under the conditions of the temperature kept at 230° C. and a load of 10 kg (here, the load condition was changed to 5 kg in Examples 47, and 51 to 54, and Comparative Examples 17, and 21 to 24, while the load condition was changed to 2.16 kg in Examples 48 to 50, and Comparative Examples 18 to 20), a mass (g) of the elastomer was measured, as the melt flow rate, which flowed out for 10 minutes from an opening (opening with a diameter of 1 mm) of the tubular orifice member having a diameter of 1 mm and a length of 8 mm, and connected to a lower portion of the furnace (the composition was left for 5 minutes at temperature of 230° C. in the furnace, and then the measurement of the mass of the elastomer flowing out was started after the start of the load application).

In addition, the melt flow rate (MFR, unit: g/10 min) of each of the α-olefin-based resins (PP, PE, EBM) used in Examples and Comparative Examples was measured in the same method as the measurement method for measuring the melt flow rate (MFR, unit: g/10 min) of the aforementioned thermoplastic elastomer compositions except that the temperature was changed from 230° C. to 190° C., and the load was changed from 10 kg to 2.16 kg.

<Compression Set (C-Set)>

Each of the thermoplastic elastomer compositions obtained in Examples and Comparative Examples was used. First, the thermoplastic elastomer composition was hot pressed at 200° C. for 10 minutes to prepare a sheet having a thickness of about 2 mm. From the sheet thus obtained, seven pieces having a disk shape with a diameter of 29 mm were punched out, and stacked on each other to prepare a sample with a height (thickness) of 12.5±0.5 mm. Using the sample thus obtained, the sample was compressed by 25% with a dedicated jig, and left at 70° C. for 22 hours. After that, the compression set (unit: %) was measured according to JIS K6262 (published in 2013). Note that the compressor used was one manufactured by DUMBBELL CO., LTD. under the trade name of "Vulcanized Rubber Compression Set Test Machine SCM-1008 L".

<5% Weight Loss Temperature>

Each of the thermoplastic elastomer compositions obtained in Examples and Comparative Examples was used. The measurement instrument used was a thermogravimetric analyzer (TGA), and the measurement was conducted at a rate of temperature rise of 10° C./min. The temperature (unit: ° C.) at which the weight loss reached 5% of the initial weight was measured. Note that the measurement sample used was approximately 10 mg.

<Tensile Properties>

Each of the thermoplastic elastomer compositions obtained in Examples and Comparative Examples was used. First, the thermoplastic elastomer composition was hot pressed at 200° C. for 10 minutes to prepare a sheet having a thickness of 2 mm. From the sheet thus obtained, test pieces in the No. 3 dumbbell shape were punched out, and subjected to a tensile test at a tensile speed of 500 mm/min according to JIS K6251 (published in 2010) to measure the tensile strength at break ($T_B$) [unit: MPa] and the elongation at break ($E_B$) [unit: %] at room temperature (25° C.)

<JIS-A Hardness>

Each of the thermoplastic elastomer compositions obtained in Examples and Comparative Examples was used. The thermoplastic elastomer composition was hot pressed at 200° C. for 10 minutes to prepare a sheet having a thickness of about 2 mm. From the sheet thus obtained, seven pieces having a disk shape with a diameter of 29 mm were punched out, and stacked on each other to prepare a sample with a height (thickness) of 12.5±0.5 mm. Then, the sample thus obtained was measured for the JIS-A hardness according to JIS K6253 (published in 2012).

Example 1

First, 50 g of a styrene block copolymer (a styrene-ethylene-butylene-styrene block copolymer (SEBS): manufactured by Kraton Corporation under the trade name of "G1633", molecular weight: 400,000 to 500,000, and styrene content: 30% by mass) was placed into a pressure kneader, 100 g of a paraffin oil (manufactured by JXTG Nippon Oil & Energy Corporation under the trade name of "Super Oil M Series P500S", kinematic viscosity: 472 mm$^2$/s, Cp value: 68.7%, aniline point: 123° C.) was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 100 g of an α-olefin-based resin, that is, polypropylene (PP: manufactured by SunAllomer Ltd. under the trade name of "PWH00N", crystallinity: 62%, MFR: 500 g/10 min (2.16 kg, 190° C.), weight average molecular weight (Mw): 200,000), and 0.3 g of an anti-aging agent (manufactured by ADEKA Corporation under the trade name of "AO-50") were further added to the pressure kneader, followed by mastication for 2 minutes at temperature of 200° C. to obtain a first mixture (a mixture containing the PP and the maleic EBM). Here, the first mixture was plasticized in the mastication step. Subsequently, 2 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture.

Next, 2.62 g of tris(hydroxyethyl) isocyanurate (manufactured by NISSEI CORPORATION under the trade name of "TANAC") was added to the second mixture in the pressure kneader, followed by mixing for 8 minutes at 200° C. to prepare the thermoplastic elastomer composition. Table 1 presents data such as property evaluation results of the obtained thermoplastic elastomer composition.

Note that, from the results of the infrared spectroscopic analysis of the raw material compound used, it can be understood that maleic anhydride groups in the maleic anhydride-modified ethylene-butene copolymer reacted with tris(hydroxyethyl) isocyanurate to form an elastomeric polymer mainly having a side chain containing the structure represented by the following formula (28) (hereinafter, simply referred to as "side chain (iii)" in some cases), among a side chain containing the structure represented by the following formula (26) (hereinafter, simply referred to as "side chain (i)" in some cases), a side chain containing the structure represented by the following formula (27) (hereinafter, simply referred to as "side chain (ii)" in some cases), and the side chain (iii) in the composition (note that, considering the stoichiometry based on the raw materials used, it is obvious that the side chain (iii) was mainly formed among the side chains (i) to (iii), but the side chain (i) and/or the side chain (ii) may be formed depending on the position of the side chain in the polymer or the like. Hereinbelow, an elastomeric polymer in which the main type of the side chain formed by the reaction can be considered to be the side chain (iii) on the basis of the raw materials used is sometimes simply referred to as an "elastomeric polymer mainly having a side chain (iii)"). In addition, it was found that the elastomeric polymer had a glass-transition point of 25° C. or below, which was attributable to the main chain made of ethylene and butene.

[Chem. 17]

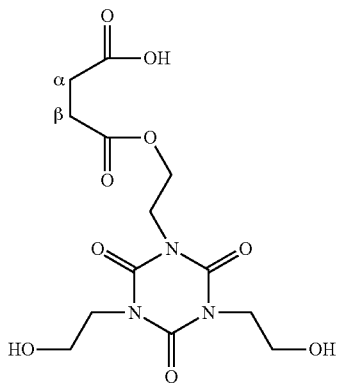

(26)

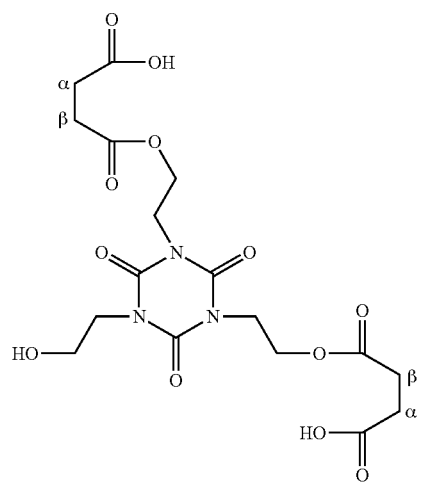

(27)

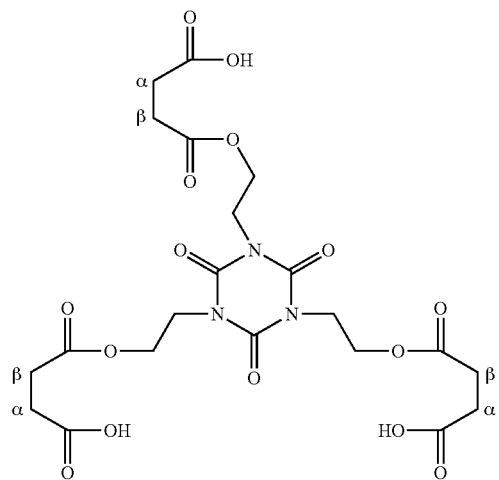

(28)

[in the formulae (26) to (28), the carbons indicated by α and β indicate that the carbon at either position (the α position or the β position) is bonded to the main chain of the elastomeric polymer].

Examples 2 to 4

The thermoplastic elastomer compositions were obtained in the same manner as in Example 1 except that the α-olefin-based resin was changed and various α-olefin-based resins to be described later were used instead of the polypropylene (PP). Note that, as is obvious from the description of the production method, the thermoplastic elastomer compositions obtained in Examples 1 to 4 have the same constitution except that the types of the α-olefin-based resins are different. Table 1 presents data such as property evaluation results of the obtained thermoplastic elastomer compositions in Examples.

<α-Olefin-Based Resin Used in Example 2>

Polyethylene (PE: manufactured by Japan Polyethylene Corporation under the trade name of "HJ590N", crystallinity: 74%, MFR: 40 g/10 min (2.16 kg, 190° C.), Mw: 70,000)

<α-Olefin-Based Resin Used in Example 3>

Polyethylene (PE: manufactured by Japan Polyethylene Corporation under the trade name of "UJ790", crystallinity: 74%, MFR: 50 g/10 min (2.16 kg, 190° C.), Mw: 120,000)

<α-Olefin-Based Resin Used in Example 4>

Ethylene-butene copolymer (EBM: manufactured by Mitsui Chemicals, Inc. under the trade name of "TAFMER DF7350", crystallinity: 10%, MFR: 35 g/10 min (2.16 kg, 190° C.), Mw: 100,000).

Comparative Example 1

The thermoplastic elastomer composition was obtained in the same manner as in Example 1 except that 2.62 g of tris(hydroxyethyl) isocyanurate (manufactured by NISSEI CORPORATION under the trade name of "TANAC") was added to the first mixture, without adding the organically modified clay (manufactured by KUNIMINE INDUSTRIES Co., Ltd. under the trade name of "Kunfil D-36") to the first mixture, followed by mixing for 8 minutes at 200° C. (except that the organically modified clay was not used). Table 1 presents data such as property evaluation results of the obtained thermoplastic elastomer composition.

TABLE 1

| | | Example 1 | Example 2 | Example 3 | Example 4 | Comp Ex 1 |
|---|---|---|---|---|---|---|
| Raw Materials of Composition (g) | Maleic EBM (MH5040) | 100 | 100 | 100 | 100 | 100 |
| | Organically Modified Clay (Kunfil D-36) | 2 | 2 | 2 | 2 | — |
| | Tris(hydroxyethyl) Isocyanurate (TANAC) | 2.62 | 2.62 | 2.62 | 2.62 | 2.62 |
| | Anti-aging Agent (AO-50) | 0.3 | 0.3 | 0.3 | 0.3 | 0.3 |
| | SEBS (G1633) | 50 | 50 | 50 | 50 | 50 |
| | Paraffin Oil (P500S) | 100 | 100 | 100 | 100 | 100 |
| α-Olefin-based Resin | Polypropylene (PP: PWH00N) [Crystallinity: 62%] | 100 | — | — | — | — |
| | Polyethylene (PE: HJ590N) [Crystallinity: 74%] | — | 100 | — | — | — |
| | Polyethylene (PE: UJ790) [Crystallinity: 52%] | — | — | 100 | — | — |
| | Ethylene-Butene Copolymer (EBM: DF7350) [Crystallinity: 10%] | — | — | — | 100 | 100 |
| Physical Property Value | 5% Weight Loss Temperature (° C.) | 341 | 340 | 339 | 342 | 317 |
| | Tensile Strength at Break (MPa) | 10.2 | 9.5 | 7.0 | 4.4 | 3.2 |
| | Compression Set (%, 70° C., 22 H, 25%) | 43 | 40 | 40 | 36 | 38 |
| | MFR (g/10 min, 230° C., 10 Kg) | 85 | 5 | 6 | 9 | 8 |
| | Elongation at Break (%) | 239 | 624 | 598 | 422 | 475 |
| | JIS-A Hardness | 70.5 | 74 | 66 | 35.5 | 33 |

Property Evaluation of Thermoplastic Elastomer Compositions (Examples 1 to 4 and Comparative Example 1)

As is apparent from the results presented in Table 1, the constitution of the thermoplastic elastomer composition obtained in Example 4 and the constitution of the thermoplastic elastomer composition obtained in Comparative Example 1 were different only in the presence or absence of the organically modified clay. From both of the difference in constitution and the property evaluation results of these compositions, it was found that the thermoplastic elastomer composition of the present invention (Example 4) achieved a higher level of heat resistance, because the 5% weight loss temperature is higher in the case where the thermoplastic elastomer composition contained the organically modified clay (Example 4) than in the case where the organically modified clay was not used (Comparative Example 1).

In addition, the property evaluation results of the thermoplastic elastomer composition obtained in Example 4 and the thermoplastic elastomer composition obtained in Comparative Example 1 demonstrated that the thermoplastic elastomer composition of the present invention (Example 4) achieved a higher level of tensile strength at break than in the case where the organically modified clay was not used (Comparative Example 1). Further, the property evaluation results of the thermoplastic elastomer composition obtained in Example 4 and the thermoplastic elastomer composition obtained in Comparative Example 1 demonstrated that the thermoplastic elastomer composition of the present invention (Example 4) also achieved further enhancement in the flowability (MFR) and the resistance to compression set.

Hence, from the property evaluation results of the thermoplastic elastomer composition obtained in Example 4 and the thermoplastic elastomer composition obtained in Comparative Example 1, it was found out that use of the clay in the thermoplastic elastomer composition of the present invention (Example 4) made it possible to improve all of the heat resistance, the flowability, the resistance to compression set, and the mechanical property (tensile strength at break) to higher levels, and thus to obtain a composition which has these properties at sufficiently high levels in a well-balanced manner.

Moreover, it was observed that all the thermoplastic elastomer compositions of the present invention (Examples 1 to 4) more enhanced the heat resistance based on the 5% weight loss temperature and also had the higher values in the tensile strength at break than the thermoplastic elastomer composition obtained in Comparative Example 1. Especially, the results presented in Table 1 demonstrated that the tensile strength at break was also enhanced by changing a type of an α-olefin resin. In addition, from the results presented in Table 1, it was found that the values of the compression set and the hardness of the thermoplastic elastomer compositions obtained in Examples 1 to 3 were at high levels sufficient for use as rubber products. Further, the results presented in Table 1 also demonstrated that all the thermoplastic elastomer compositions obtained in Examples to 4 had flowability, and thus had sufficient processability.

Hence, it was confirmed that the present invention (Examples 1 to 4) made it possible to obtain a thermoplastic elastomer composition having higher levels of heat resistance and tensile strength at break and also having sufficient processability (flowability) and resistance to compression set.

Example 5

First, 50 g of a styrene block copolymer (a styrene-ethylene-butylene-styrene block copolymer (SEBS): manufactured by Kraton Corporation under the trade name of "G1633", molecular weight: 400,000 to 500,000, and styrene content: 30% by mass) was placed into the pressure kneader, 100 g of a paraffin oil (manufactured by JXTG Nippon Oil & Energy Corporation under the trade name of "Super Oil M Series P500S", kinematic viscosity: 472 mm$^2$/s, Cp value: 68.7%, aniline point: 123° C.) was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5020", crystallinity: 4%), 100 g of an α-olefin-based resin, that is, an ethylene-butene copolymer (EBM: manufactured by Mitsui Chemicals, Inc. under the trade name of "TAFMER DF7350", crystallinity: 10%, MFR: 35 g/10 min (2.16 kg, 190° C.), Mw: 100,000), and 0.3 g of an anti-aging agent (manufactured by ADEKA Corporation under the trade name of "AO-50") were further added to the pressure kneader, followed by mastication for 2 minutes at temperature of 200° C. to obtain a first mixture (a mixture containing the EBM and the maleic EBM). Here, the first mixture was plasticized in the mastication step. Subsequently, 2 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture.

Next, 1.31 g of tris(hydroxyethyl) isocyanurate (manufactured by NISSEI CORPORATION under the trade name of "TANAC") was added to the second mixture in the pressure kneader, followed by mixing for 8 minutes at 200° C. to prepare the thermoplastic elastomer composition. Note that, from the results of an infrared spectroscopic analysis of the raw material compound used, it was found that the composition contained an elastomeric polymer mainly having the aforementioned side chain (iii) (which may have the aforementioned side chains (i) to (iii)), the elastomeric polymer formed by a reaction of maleic anhydride groups in the maleic anhydride-modified ethylene-butene copolymer with tris(hydroxyethyl) isocyanurate. It was also found that the elastomeric polymer had a glass-transition point of 25° C. or below, which was attributable to the main chain made of ethylene and butene. Table 2 presents data such as property evaluation results of the obtained thermoplastic elastomer composition.

Examples 6 to 8

The thermoplastic elastomer compositions were obtained in the same manner as in Example 5 except that an amount of the used α-olefin-based resin (EBM: manufactured by Mitsui Chemicals, Inc. under the trade name of "TAFMER DF7350", crystallinity: 10%, MFR: 35 g/10 min (2.16 kg, 190° C.), Mw: 100,000) was changed from 100 g to 75 g (Example 6), 50 g (Example 7), and 25 g (Example 8). Note that, as is obvious from the description of the production method, the thermoplastic elastomer compositions obtained in Examples 5 to 8 have the same constitution except that the different amounts of the α-olefin-based resin are contained. Table 2 presents data such as property evaluation results of the thermoplastic elastomer compositions obtained in Examples.

TABLE 2

| | | Example 5 | Example 6 | Example 7 | Example 8 |
|---|---|---|---|---|---|
| Raw Materials of Composition (g) | Maleic EBM (MH5020) | 100 | 100 | 100 | 100 |
| | Organically Modified Clay (Kunfil D-36) | 2 | 2 | 2 | 2 |
| | Tris(hydroxyethyl) Isocyanurate (TANAC) | 1.31 | 1.31 | 1.31 | 1.31 |
| | Anti-aging Agent (AO-50) | 0.3 | 0.3 | 0.3 | 0.3 |
| | SEBS (G1633) | 50 | 50 | 50 | 50 |
| | Paraffin Oil (P500S) | 100 | 100 | 100 | 100 |
| | α-Olefin-based Resin(EBM: DF7350) [Crystallinity: 10%] | 100 | 75 | 50 | 20 |

TABLE 2-continued

| | | Example 5 | Example 6 | Example 7 | Example 8 |
|---|---|---|---|---|---|
| Physical Property Value | 5% Weight Loss Temperature (° C.) | 341 | 340 | 340 | 340 |
| | Tensile Strength at Break (MPa) | 5.1 | 6.0 | 5.4 | 5.6 |
| | Compression Set (%, 70° C., 22 H, 25%) | 31 | 20 | 23 | 30 |
| | MFR (g/10 min, 230° C., 10 Kg) | 2.5 | 2.2 | 0.5 | 0.2 |
| | Elongation at Break (%) | 618 | 784 | 706 | 690 |
| | JIS-A Hardness | 39.5 | 39.0 | 36.5 | 34.0 |

Property Evaluation of Thermoplastic Elastomer Compositions (Examples 5 to 8)

As is apparent from the results presented in Table 2, it was found that the thermoplastic elastomer compositions of the present invention (Examples 5 to 8) containing the elastomer component (the elastomeric polymer mainly having the aforementioned side chain (iii)), the α-olefin-based resin (EBM), and the clay (the organically modified clay) each had such a sufficiently high level of heat resistance that the 5% weight loss temperature was 340° C. or above. Moreover, the thermoplastic elastomer compositions of the present invention (Examples 5 to 8) were each also found having a sufficiently high level of tensile strength at break of 5.1 MPa or more. Hence, the thermoplastic elastomer compositions of the present invention (Examples 5 to 8) were found achieving sufficiently high levels of heat resistance and tensile strength at break. Moreover, from the results presented in Table 2, the thermoplastic elastomer compositions of the present invention (Examples 5 to 8) demonstrated that it is possible to achieve sufficiently high levels of heat resistance and tensile strength at break and also achieve sufficient flowability under heating and resistance to compression set; therefore the composition can have these properties in a sufficiently well-balanced manner.

Hence, in view of the results presented in Table 2, the thermoplastic elastomer compositions of the present invention (Examples 5 to 8) demonstrated that all the heat resistance, the flowability, the resistance to compression set, and the mechanical property (tensile strength at break) can be improved to sufficient levels; therefore the composition can have these properties at sufficiently high levels in a well-balanced manner.

Note that, as described above, although the thermoplastic elastomer compositions obtained in Examples 5 to 8 even contained the different amounts of the ethylene-butene copolymer (EBM: manufactured by Mitsui Chemicals, Inc. under the trade name of "TAFMER DF7350", crystallinity: 10%, MFR: 35 g/10 min (2.16 kg, 190° C.), Mw: 100,000) used as the α-olefin-based resin, the compositions in all Examples had sufficiently high levels of the properties of the heat resistance, the flowability, the resistance to compression set, and the mechanical property (tensile strength at break) in a well-balanced manner. Then, among Examples 5 to 8, it was observed that the use of the α-olefin-based resin (EBM) in an amount of 100 g (Example 5: the amount of the EBM used was 100 parts by mass relative to 100 parts by mass of the maleic EBM) improved the flowability (MFR) and the hardness to higher levels; the use of the α-olefin-based resin (EBM) in an amount of 25 g, 50 g, or 75 g (Examples 6 to 8: the amount of the EBM used was 25 to 75 parts by mass relative to 100 parts by mass of the maleic EBM) improved the tensile strength at break to a higher level; and further the use of the α-olefin-based resin (EBM) in an amount of 50 g, or 75 g (Examples 6 and 7: the amount of the EBM used was 50 to 75 parts by mass relative to 100 parts by mass of the maleic EBM) improved the value of the compression set to a higher level. Hence, it was confirmed that it is possible to use a thermoplastic elastomer composition of the present invention with its design changed as appropriate, like a case where the amount of the α-olefin-based resin (EBM) used is changed as appropriate, such that the thermoplastic elastomer composition can have the sufficiently high levels of heat resistance, flowability, resistance to compression set, and mechanical property (tensile strength at break), while some of the properties depending on a target application or the like can be made especially high.

Example 9

First, 200 g of a styrene block copolymer (a styrene-ethylene-butylene-styrene block copolymer (SEBS): manufactured by Kraton Corporation under the trade name of "G1633", molecular weight: 400,000 to 500,000, styrene content: 30% by mass) was placed into the pressure kneader, 400 g of a paraffin oil (manufactured by JXTG Nippon Oil & Energy Corporation under the trade name of "Super Oil M Series P500S") was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 200 g of an α-olefin-based resin, that is, polyethylene (PE: manufactured by Japan Polyethylene Corporation under the trade name of "HJ590N", crystallinity: 74%, MFR: 40 g/10 min (2.16 kg, 190° C.), Mw: 70,000), and 0.3 g of an anti-aging agent (manufactured by ADEKA Corporation under the trade name of "AO-50") were further added to the pressure kneader, followed by mastication for 2 minutes at temperature of 200° C. to obtain a first mixture (a mixture containing the PE and the maleic EBM). Here, the first mixture was plasticized in the mastication step. Subsequently, 0.1 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture.

Next, 2.62 g of tris(hydroxyethyl) isocyanurate (manufactured by NISSEI CORPORATION under the trade name of "TANAC") was added to the second mixture in the pressure kneader, followed by mixing for 8 minutes at 200° C. to prepare the thermoplastic elastomer composition. Note that, from the results of an infrared spectroscopic analysis of the raw material compound used, it was found that the composition contained an elastomeric polymer mainly having the aforementioned side chain (iii) (which may have the aforementioned side chains (i) to (iii)), the elastomeric polymer formed by a reaction of maleic anhydride groups in the maleic anhydride-modified ethylene-butene copolymer with tris(hydroxyethyl) isocyanurate. It was also found that spectrum thus obtained, an absorption intensity (A) of a peak around the wavelength of 2,920 $cm^{-1}$ derived from the C—H stretching vibration in a olefin-based resin (comprising the α-olefin-based resin (PE) and the olefin-based copolymer in the main chain of the elastomer component which are contained in the composition), and an absorption intensity (B) at a peak around the wavelength of 1,695 $cm^{-1}$ derived from the carbonyl groups in the isocyanurate rings were obtained, and the intensity ratio between them ([absorption intensity (B)]/[absorption intensity (A)]) was obtained. Table 3 presents the obtained results together.

TABLE 3

| | | Example 9 | Example 10 | Example 11 | Example 12 | Example 13 |
|---|---|---|---|---|---|---|
| Raw Materials of Composition (g) | Maleic EBM (MH5040) | 100 | 100 | 100 | 100 | 100 |
| | Organically Modified Clay (Kunfil D-36) | 0.1 | 0.1 | 0.1 | 0.1 | 0.1 |
| | Tris(hydroxyothyl) Isocyanurate (TANAC) | 2.62 | 2.62 | 2.62 | 2.62 | 2.62 |
| | Anti-aging Agent (AO-50) | 0.3 | 0.3 | 0.3 | 0.3 | 0.3 |
| | SEBS (G1633) | 200 | 200 | 200 | 200 | 200 |
| | Paraffin Oil (P500S) | 400 | 400 | 400 | 400 | 400 |
| | α-Olefin-based Resin (PE: HJ590N) [Crystallinity: 74%] | 200 | 150 | 100 | 75 | 50 |
| Physical Property Value | 5% Weight Loss Temperature (° C.) | 335 | 335 | 336 | 335 | 337 |
| | Tensile Strength at Break (MPa) | 10.7 | 9.1 | 7.8 | 63 | 4.7 |
| | Compression Set (V 70° C. 22 H. 25%) | 30 | 26 | 22 | 16 | 14 |
| | MFR (g/10 min. 230° C. 10 Kg) | 73.5 | 45.9 | 20.2 | 11.8 | 5.9 |
| | Elongation at Break (%) | 742 | 726 | 753 | 691 | 675 |
| | JIS-A Hardness | 61 | 52 | 41 | 35 | 30 |
| | IR Spectrum Intensity Ratio ([Absorption Intensity (B)]/[Absorption Intensity (A)]) | 0.03 | 002 | 0.02 | 0.03 | 0.03 | the elastomeric polymer had a glass-transition point of 25° C. or below, which was attributable to the main chain made of ethylene and butene. Table 3 presents data such as property evaluation results of the obtained thermoplastic elastomer composition.

Examples 10 to 13

The thermoplastic elastomer compositions were obtained in the same manner as in Example 9 except that an amount of the used α-olefin-based resin (PE: manufactured by Japan Polyethylene Corporation under the trade name of "HJ590N", crystallinity: 74%, MFR: 40 g/10 min (2.16 kg, 190° C.), Mw: 70,000) was changed from 200 g to 150 g (Example 10), 100 g (Example 11), 75 g (Example 12), and 50 g (Example 13) in Examples. Note that, as is obvious from the description of the production method, the thermoplastic elastomer compositions obtained in Examples 9 to 13 have the same constitution except that the different amounts of the α-olefin-based resin are contained. Table 3 presents data such as property evaluation results of the thermoplastic elastomer compositions obtained in Examples.

Here, the thermoplastic elastomer compositions obtained in Examples 9 to 13 were measured for the infrared adsorption spectrum as follows. Specifically, first, 40 g of each of the thermoplastic elastomer compositions obtained in Examples 9 to 13 was pressed with a thickness of 2 mm so as to have a smooth surface to prepare a measurement sample, and then the measurement sample was measured for an infrared adsorption spectrum (infrared attenuated total reflection (FTIR-ATR) spectrum) in a wavenumber range of 400 to 4,000 $cm^{-1}$ by an attenuated total reflection (ATR) method using, as a measurement instrument, an IR measurement instrument ("NICOLET380" manufactured by Thermo Fisher Scientific Inc.) equipped with a total reflection type unit. From the graph of the infrared adsorption Property Evaluation of Thermoplastic Elastomer Compositions (Examples 9 to 13)

As is apparent from the results presented in Table 3, all the thermoplastic elastomer compositions of the present invention (Examples 9 to 13) containing the elastomer component (the elastomeric polymer mainly having the aforementioned side chain (iii)), the α-olefin-based resin (PE), and the clay (the organically modified clay) had a 5% weight loss temperature of 335° C. or above, which confirmed that a sufficiently high level of heat resistance can be achieved. Moreover, the thermoplastic elastomer compositions of the present invention (Examples 9 to 13) each also had a sufficiently high level of tensile strength at break of 4.7 MPa or more. Further, the thermoplastic elastomer compositions of the present invention (Examples 9 to 13) were observed having resistance to compression set at a high level sufficient as rubber products. In addition, all the thermoplastic elastomer compositions of the present invention (Examples 9 to 13) were observed having flowability under heating, and accordingly having sufficient processability. Still further, the thermoplastic elastomer compositions of the present invention (Examples 9 to 13) were also found having hardness with which the thermoplastic elastomer compositions are sufficiently usable as rubber products.

From these results, according to the thermoplastic elastomer compositions of the present invention (Examples 9 to 13), it was found that the sufficiently high levels of heat resistance and tensile strength at break can be obtained. In addition, the thermoplastic elastomer compositions of the present invention (Examples 9 to 13) demonstrated that it is possible to also improve the flowability under heating and the resistance to compression set to sufficiently high levels while achieving the sufficient levels of heat resistance and tensile strength at break as described above; therefore the composition can have these properties in a sufficiently well-balanced manner.

Hence, from the results presented in Table 3, the thermoplastic elastomer compositions of the present invention (Examples 9 to 13) demonstrated that all the heat resistance, the flowability, the resistance to compression set, and the mechanical property (tensile strength at break) can be improved to sufficient levels; therefore the composition can have these properties at sufficiently high levels in a well-balanced manner.

Further, even though the thermoplastic elastomer compositions obtained in Examples 9 to 13 contained the different amounts of the polyethylene (PE: manufactured by Japan Polyethylene Corporation under the trade name of "HJ590N", crystallinity: 74%, MFR: 40 g/10 min (2.16 kg, 190° C.), Mw: 70,000) used as the α-olefin-based resin, the compositions in all Examples had sufficiently high levels of the properties of the heat resistance, the flowability, the resistance to compression set, and the mechanical property (tensile strength at break) in a well-balanced manner as described above. Among Examples 9 to 13, in the cases where, for example, the amount of the α-olefin-based resin (PE) used was less than 100 g (less than 100 parts by mass relative to 100 parts by mass of the maleic EBM), the compression set was smaller than 20%. Thus, it was found that the resistance to compression set was improved to an even higher level. Meanwhile, in the cases where the amount of the α-olefin-based resin (PE) used was 100 g or more (100 parts by mass or more relative to 100 parts by mass of the maleic EBM), the MFR was 20 g/10 min or more. Thus, it was found that a further higher level of flowability was obtained. Then, in the thermoplastic elastomer compositions obtained in Examples 9 to 13, it was also found that the tensile strength at break and hardness were improved to higher values as the amount of the α-olefin-based resin (PE) used was increased. Hence, it was confirmed that it is possible to use a thermoplastic elastomer composition of the present invention with its design changed as appropriate, like a case where the amount of the α-olefin-based resin (EBM) used is changed as appropriate, such that the thermoplastic elastomer composition can have the sufficiently high levels of heat resistance, flowability, resistance to compression set, and mechanical property (tensile strength at break), while some of the properties depending on a target application or the like can be made especially high.

Example 14

First, 50 g of a styrene block copolymer (styrene-ethylene-butylene-styrene block copolymer (SEBS): manufactured by Kraton Corporation under the trade name of "G1633") was placed into the pressure kneader, 100 g of a paraffin oil (manufactured by JXTG Nippon Oil & Energy Corporation under the trade name of "P200", kinematic viscosity: 75 mm²/s, Cp value: 67.9%, aniline point: 109° C.) was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 100 g of polypropylene (PP: manufactured by SunAllomer Ltd. under the trade name of "VMD81M", crystallinity: 60%) and 0.3 g of an anti-aging agent (manufactured by ADEKA Corporation under the trade name of "AO-50") were further added to the pressure kneader, followed by mastication for 2 minutes at temperature of 200° C. to obtain a first mixture (a mixture containing the SEBS, the paraffin oil, the maleic EBM, the PP, and the anti-aging agent). Here, the first mixture was plasticized in the mastication step. Subsequently, 2 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture. Next, 2.62 g of tris(hydroxyethyl) isocyanurate (manufactured by NISSEI CORPORATION under the trade name of "TANAC") was added to the second mixture, followed by mixing for 8 minutes at 200° C. to prepare the thermoplastic elastomer composition. Note that, from the result of an infrared spectroscopic analysis of the raw material compound used, it was found that maleic anhydride groups in the maleic anhydride-modified ethylene-butene copolymer and the tris(hydroxyethyl) isocyanurate reacted with each other to form an elastomeric polymer mainly having the aforementioned side chain (iii) (which may have the aforementioned side chains (i) to (iii)). It was also found that the elastomeric polymer had a glass-transition point of 25° C. or below, which was attributable to the main chain made of ethylene and butene. Table 4 presents data such as property evaluation results of the obtained thermoplastic elastomer composition.

Example 15 to 17

The thermoplastic elastomer compositions were obtained in the same manner as in Example 14 except that the type of the paraffin oil was changed and the paraffin oils described below were used in Examples. Note that, as is obvious from the description of the production method, the thermoplastic elastomer compositions obtained in Examples 14 to 17 have the same constitution except that the different types of the paraffin oils are contained. Table 4 presents data such as property evaluation results of the obtained thermoplastic elastomer compositions.

<Paraffin Oil Used in Example 15>

A Paraffin oil manufactured by JXTG Nippon Oil & Energy Corporation under the trade name of "Super Oil M Series P400", kinematic viscosity: 156 mm²/s, Cp value: 68.1%, aniline point: 113° C.

<Paraffin Oil Used in Example 16>

A Paraffin oil manufactured by Idemitsu Kosan Co., Ltd. under the trade name of "Diana Process Oil PW380", kinematic viscosity: 380=²/s, Cp value: 68.0%, aniline point: 143° C.

<Paraffin Oil Used in Example 17>

A Paraffin oil manufactured by JXTG Nippon Oil & Energy Corporation under the trade name of "Super Oil M Series P500S", kinematic viscosity: 472 mm²/s, Cp value: 68.7%, aniline point: 123° C.

Example 18

First, 50 g of a styrene block copolymer (styrene-ethylene-butylene-styrene block copolymer (SEBS): manufactured by Kraton Corporation under the trade name of "G1633") was placed into the pressure kneader, and then 100 g of a maleic anhydride-modified ethylene-butene copolymer (manufactured by Mitsui Chemicals, Inc. under the trade name of "TAFMER MH5040", crystallinity: 40), 100 g of an α-olefin-based resin, that is, polypropylene (PP: manufactured by SunAllomer Ltd. under the trade name of "VMD81M", crystallinity: 60%), and 0.3 g of an anti-aging agent (manufactured by ADEKA Corporation under the trade name of "AO-50") were added into the pressure kneader during kneading under the condition of 200° C., followed by mastication for 2 minutes at temperature of 200° C. to obtain a mixture precursor. Here, the mixture precursor was plasticized in the mastication step. Subsequently, 2 g of an organically modified clay (manufactured by KUNIMINE INDUSTRIES Co., Ltd. under the trade name of "Kunfil D-36") was further added to the mixture precursor in the pressure kneader, followed by kneading for 4 minutes at 200° C. to obtain a mixture.

Next, 2.62 g of tris(hydroxyethyl) isocyanurate (manufactured by NISSEI CORPORATION under the trade name of "TANAC") was added to the mixture, followed by mixing for 8 minutes at 200° C. to prepare the thermoplastic elastomer composition not containing a paraffin oil. In this way, the thermoplastic elastomer composition was obtained in the same manner as in Example 14 except that the paraffin oil was not used. As is obvious from the description of the production method, the thermoplastic elastomer composition obtained in Example 18 has the same constitution as the thermoplastic elastomer compositions obtained in Examples 14 to 17 except that the paraffin oil is not contained. Table 4 presents data such as property evaluation results of the obtained thermoplastic elastomer composition.

to 18), it was found that the sufficiently high levels of heat resistance and tensile strength at break can be obtained.

In addition, from the property evaluation results of the thermoplastic elastomer compositions obtained in Examples 14 to 18, it was found that the use of the paraffin oils (in Example 14 to 17) led to a drastic improvement of the value of the MFR, and thus achieved an even higher level of the flowability. Further, from the property evaluation results of the thermoplastic elastomer compositions obtained in Examples 14 to 18, it was also found that the use of the paraffin oils (in Example 14 to 17) led to a small value of the compression set. Moreover, from the property evaluation results of the thermoplastic elastomer compositions obtained in Examples 14 to 18, it was also found that as the value of the kinematic viscosity of the paraffin oil added becomes higher, the composition can have smaller compression set and accordingly a higher level of resistance to compression set. Hence, it was confirmed that it is possible to use a thermoplastic elastomer composition of the present invention with its design changed as appropriate depending on a target application, like a case where the use/no-use and the type of an additive component (such as a type of paraffin oil) are changed as appropriate, such that some properties

TABLE 4

| | | Example 14 | Example 15 | Example 16 | Example 17 | Example 18 |
|---|---|---|---|---|---|---|
| Raw Materials of Composition (g) | Maleic EBM (MH5040) | 100 | 100 | 100 | 100 | 100 |
| | Organically Modified Clay (Kunfil D-36) | 2 | 2 | 2 | 2 | 2 |
| | Tris(hydroxyethyl) Isocyanurate (TANAC) | 2.62 | 2.62 | 2.62 | 2.62 | 2.62 |
| | Anti-aging Agent (AO-50) | 0.3 | 0.3 | 0.3 | 0.3 | 0.3 |
| | SEBS (G1633) | 50 | 50 | 50 | 50 | 50 |
| | PP (VMD81M) | 100 | 100 | 100 | 100 | 100 |
| | Paraffin Oil (P200) | 100 | — | — | — | — |
| | Paraffin Oil (P400) | — | 100 | — | — | — |
| | Paraffin Oil (Process Oil PW380) | — | — | 100 | — | — |
| | Paraffin Oil (P500S) | — | — | — | 100 | — |
| | Kinematic Viscosity of Paraffin Oil (mm$^2$/s) | 75 | 156 | 380 | 472 | — |
| Physical Property Value | 5% Weight Loss Temperature (° C) | 337 | 349 | 340 | 341 | 425 |
| | Tensile Strength at Break (MPa) | 3.5 | 4.6 | 5.1 | 5.0 | 8.5 |
| | Compression Set (% 70° C. 22 H. 25%) | 51 | 46 | 43 | 42 | 55 |
| | MFR (g/10 min. 230° C., 10 Kg) | 98 | 65 | 60 | 56 | 10 |
| | JIS-A Hardness | 69.5 | 70.5 | 71 | 71 | 75 |

Property Evaluation of Thermoplastic Elastomer Compositions (Examples 14 to 18)

As is apparent from the results presented in Table 4, all the thermoplastic elastomer compositions of the present invention (Examples 14 to 18) containing the elastomer component (the elastomeric polymer mainly having the aforementioned side chain (iii)), the α-olefin-based resin (PP), and the clay (the organically modified clay) had a 5% weight loss temperature of 337° C. or above, which confirmed that a sufficiently high level of heat resistance can be achieved. Moreover, the thermoplastic elastomer compositions of the present invention (Examples 14 to 18) each also had a sufficiently high level of tensile strength at break of 3.5 MPa or more. Further, the thermoplastic elastomer compositions of the present invention (Examples 14 to 18) were observed achieving resistance to compression set and hardness sufficient as rubber products. In addition, all the thermoplastic elastomer compositions of the present invention (Examples 14 to 18) were observed having flowability under heating, and accordingly having sufficient processability.

From these results, according to the thermoplastic elastomer compositions of the present invention (Examples 14 required depending on the application or the like can be enhanced to especially high levels.

Examples 19 to 21

The thermoplastic elastomer compositions were obtained in the same manner as in Example 4 except that the type of the paraffin oil was changed and the paraffin oils described below were used respectively. Note that, as is obvious from the description of the production method, the thermoplastic elastomer compositions obtained in Examples 19 to 21 have the same constitution as the thermoplastic elastomer composition obtained in Example 4 except that the different types of the paraffin oils are contained. Table 5 presents data such as property evaluation results of the obtained thermoplastic elastomer compositions.

<Paraffin Oil Used in Example 19>

A Paraffin oil manufactured by JXTG Nippon Oil & Energy Corporation under the trade name of "Super Oil M Series P200", kinematic viscosity: 75=$^2$/s, Cp value: 67.9%, aniline point: 109° C.

<Paraffin Oil Used in Example 20>

A Paraffin oil manufactured by JXTG Nippon Oil & Energy Corporation under the trade name of "Super Oil M Series P400", kinematic viscosity: 156 mm$^2$/s, Cp value: 68.1%, aniline point: 113° C.

<Paraffin Oil Used in Example 21>

A Paraffin oil manufactured by Idemitsu Kosan Co., Ltd. under the trade name of "Diana Process Oil PW380", kinematic viscosity: 380=$^2$/s, Cp value: 68.0%, aniline point: 143° C.

Example 22

The thermoplastic elastomer composition was obtained in the same manner as in Example 4 except that an aroma oil (manufactured by JXTG Nippon Oil & Energy Corporation under the trade name of "T-DAE", kinematic viscosity: 32 mm$^2$/s) was used instead of the paraffin oil. Note that, as is obvious from the description of the production method, the thermoplastic elastomer composition obtained in Example 22 has the same constitution as the thermoplastic elastomer composition obtained in Example 4 except that the different type of oil is contained. Table 5 presents data such as property evaluation results of the obtained thermoplastic elastomer composition.

Example 23

The thermoplastic elastomer composition was obtained in the same manner as in Example 4 except that a naphthenic oil (manufactured by JXTG Nippon Oil & Energy Corporation under the trade name of "Grade 200", kinematic viscosity: 1.56 mm$^2$/s) was used instead of the paraffin oil. Note that, as is obvious from the description of the production method, the thermoplastic elastomer composition obtained in Example 23 has the same constitution as the thermoplastic elastomer composition obtained in Example 4 except that the different type of oil is contained. Table 5 presents data such as property evaluation results of the obtained thermoplastic elastomer composition.

Here, Table 5 additionally presents the property evaluation results of the thermoplastic elastomer compositions obtained in Example 4 and Comparative Example 1.

component (the elastomeric polymer mainly having the aforementioned side chain (iii)), the α-olefin-based resin (PP), and the clay (the organically modified clay) had a 5% weight loss temperature of 334° C. or above, which confirmed that a sufficiently high level of heat resistance can be achieved. Moreover, the thermoplastic elastomer compositions of the present invention (Examples 4 and 19 to 23) each also had a sufficiently high level of tensile strength at break of 4.2 MPa or more. Further, the thermoplastic elastomer compositions of the present invention (Examples 14 to 18) were observed achieving resistance to compression set and hardness sufficient as rubber products. In addition, all the thermoplastic elastomer compositions of the present invention (Examples 4 and 19 to 23) were observed having flowability under heating, and accordingly having sufficient processability.

From these results, the thermoplastic elastomer compositions of the present invention (Examples 4 and 19 to 23) demonstrated that it is possible to obtain the sufficiently high levels of heat resistance and tensile strength at break, and also have resistance to compression set and hardness with which the thermoplastic elastomer composition is sufficiently usable as a rubber product, and to be provided with flowability under heating.

In addition, from the property evaluation results of the thermoplastic elastomer compositions obtained in Examples 4 and 19 to 23, it was found that the use of the paraffin oils (in Example 4 and Examples 19 to 21) led to higher values of the MFR than in the case where the other types of oils were used (Examples 22 and 23), and thus also were enabled to achieve an even higher level of flowability and enhance the resistance to compression set to a higher level. Moreover, from the property evaluation results of the thermoplastic elastomer compositions obtained in Examples 4 and Examples 19 to 21, it was also found that as the value of the kinematic viscosity of the paraffin oil added becomes higher, the composition can have smaller compression set and accordingly a higher level of resistance to compression set.

TABLE 5

|  |  | Example 19 | Example 20 | Example 21 | Example 22 | Example 23 | Example 4 | Comp. Ex 1 |
|---|---|---|---|---|---|---|---|---|
| Raw Materials of Composition (g) | Maleic EBM (MH5040) | 100 | 100 | 100 | 100 | 100 | 100 | 100 |
| | Organically Modified Clay (Kunfil D-36) | 2 | 2 | 2 | 2 | 2 | 2 | — |
| | Tris(hydroxyethyl) Isocyanurate (TANAC) | 2.62 | 2.62 | 2.62 | 2.62 | 2.62 | 2.62 | 2.62 |
| | Anti-aging Agent (AO-50) | 0.3 | 0.3 | 0.3 | 0.3 | 0.3 | 0.3 | 0.3 |
| | SEBS (G1633) | 50 | 50 | 50 | 50 | 50 | 50 | 50 |
| | EBM (DF735C) | 100 | 100 | 100 | 100 | 100 | 100 | 100 |
| | Paraffin Oil (P200) | 100 | — | — | — | — | — | — |
| | Paraffin Oil (P400) | — | 100 | — | — | — | — | — |
| | Paraffin Oil (Process Oil PW380) | — | — | 100 | — | — | — | — |
| | Paraffin Oil (P500S) | — | — | — | — | — | 100 | 100 |
| | Aroma Oil (T-DAE) | — | — | — | 100 | — | — | — |
| | Naphthemc Oil (Grade 200) | — | — | — | — | 100 | — | — |
| | Kinematic Viscosity of Oil (mm$^2$/s) | 75 | 156 | 380 | 32 | 1.56 | 472 | 472 |
| Physical Property Value | 5% Weight Loss Temperature (° C.) | 336 | 356 | 341 | 336 | 334 | 342 | 317 |
| | Tensile Strength at Break (MPa) | 4.2 | 4.5 | 4.5 | 4.3 | 4.4 | 4.4 | 3.2 |
| | Compression Set (%, 70° C. 22 H. 25%) | 46 | 40 | 38 | 50 | 55 | 36 | 38 |
| | MFR (g/10 min. 230° C. 10 Kg) | 12 | 10 | 9 | 7 | 7 | 9 | 8 |
| | JIS-A Hardness | 35.5 | 35 | 35 | 52 | 53 | 35.5 | 33 |

Property Evaluation of Thermoplastic Elastomer Compositions (Examples 4 and 19 to 23, and Comparative Example 1)

As is apparent from the results presented in Table 5, all the thermoplastic elastomer compositions of the present invention (Examples 4 and 19 to 23) containing the elastomer Example 24

First, 50 g of a styrene block copolymer (styrene-ethylene-butylene-styrene block copolymer (SEBS): manufactured by Kraton Corporation under the trade name of "G1633") was placed into the pressure kneader, 100 g of a paraffin oil (manufactured by JXTG Nippon Oil & Energy Corporation under the trade name of "Super Oil M Series P200", kinematic viscosity: 75=²/s, Cp value: 67.9%, aniline point: 109° C.) was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 100 g of an ethylene-propylene copolymer (EPM: manufactured by Mitsui Chemicals, Inc. under the trade name of "TAFMER PN20300", crystallinity: 12%) and 0.3 g of an anti-aging agent (manufactured by ADEKA Corporation under the trade name of "AO-50") were further added to the pressure kneader, followed by mastication for 2 minutes at temperature of 200° C. to obtain a first mixture <Paraffin Oil Used in Example 25>

A Paraffin oil manufactured by JXTG Nippon Oil & Energy Corporation under the trade name of "Super Oil M Series P400", kinematic viscosity: 156 mm$^2$/s, Cp value: 68.1%, aniline point: 113° C.

<Paraffin Oil Used in Example 26>

A Paraffin oil manufactured by Idemitsu Kosan Co., Ltd. under the trade name of "Diana Process Oil PW380", kinematic viscosity: 380=²/s, Cp value: 68.0%, aniline point: 143° C.

<Paraffin Oil Used in Example 27>

A Paraffin oil manufactured by JXTG Nippon Oil & Energy Corporation under the trade name of "Super Oil M Series P500S", kinematic viscosity: 472 mm$^2$/s, Cp value: 68.7%, aniline point: 123° C.

TABLE 6

| | | Example 24 | Example 25 | Example 26 | Example 27 |
|---|---|---|---|---|---|
| Raw Materials of Composition (g) | Maleic EBM (MH5040) | 100 | 100 | 100 | 100 |
| | Organically Modified Clay (Kunfil D-36) | 2 | 2 | 2 | 2 |
| | Tris(hydroxyethyl) Isocyanurate (TANAC) | 2.62 | 2.62 | 2.62 | 2.62 |
| | Anti-aging Agent (AO-50) | 0.3 | 0.3 | 0.3 | 0.3 |
| | SEBS (G1633) | 50 | 50 | 50 | 50 |
| | EPM (PN20300) | 100 | 100 | 100 | 100 |
| | Paraffin Oil (P200) | 100 | — | — | — |
| | Paraffin Oil (P400) | — | 100 | — | — |
| | Paraffin Oil (Process Oil PW380) | — | — | 100 | — |
| | Paraffin Oil (P500S) | — | — | — | 100 |
| Kinematic Viscosity of Oil (mm$^2$/s) | | 75 | 156 | 380 | 472 |
| Physical Property Value | 5% Weight Loss Temperature (° C.) | 337 | 345 | 354 | 340 |
| | Tensile Strength at Break (MPa) | 4.0 | 6.4 | 6.0 | 5.3 |
| | Compression Set (%, 70° C., 22 H, 25%) | 55 | 48 | 46 | 45 |
| | MFR (g/10 min, 230° C., 10 Kg) | 45 | 38 | 35 | 34 |
| | JIS-A Hardness | 35 | 37 | 36 | 37 |

(a mixture containing the SEBS, the paraffin oil, the maleic EBM, the EPM, and the anti-aging agent). Here, the first mixture was plasticized in the mastication step. Subsequently, 2 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture.

Next, 2.62 g of tris(hydroxyethyl) isocyanurate (manufactured by NISSEI CORPORATION under the trade name of "TANAC") was added to the second mixture, followed by mixing for 8 minutes at 200° C. to prepare the thermoplastic elastomer composition of a type not containing the paraffin oil. Table 4 presents data such as property evaluation results of the obtained thermoplastic elastomer composition. Note that, from the results of an infrared spectroscopic analysis of the raw material compound used, it was understood that the composition contained the elastomeric polymer mainly having the side chain (iii) as described above. It was also found that the elastomeric polymer had a glass-transition point of 25° C. or below, which was attributable to the main chain made of ethylene and butene. Table 6 presents data such as property evaluation results of the obtained thermoplastic elastomer composition.

Examples 25 to 27

The thermoplastic elastomer compositions were obtained in the same manner as in Example 24 except that the type of the paraffin oil was changed and the paraffin oils described below were used in Examples. Table 6 presents data such as property evaluation results of the obtained thermoplastic elastomer compositions.

Property Evaluation of Thermoplastic Elastomer Compositions (Examples 24 to 27)

As is apparent from the results presented in Table 6, all the thermoplastic elastomer compositions of the present invention (Examples 24 to 27) containing the elastomer component (the elastomeric polymer mainly having the aforementioned side chain (iii)), the α-olefin-based resin (EPM), and the clay (the organically modified clay) had a 5% weight loss temperature of 337° C. or above, which confirmed that a sufficiently high level of heat resistance can be achieved. Moreover, the thermoplastic elastomer compositions of the present invention (Examples 24 to 27) each also had a sufficiently high level of tensile strength at break of 4.0 MPa or more, which confirmed that sufficiently high tensile strength at break can be achieved. Further, the thermoplastic elastomer compositions of the present invention (Examples 24 to 27) were observed achieving sufficient resistance to compression set and hardness with which the thermoplastic elastomer compositions are usable as rubber products. In addition, all the thermoplastic elastomer compositions of the present invention (Examples 24 to 27) were observed having flowability under heating, and accordingly having sufficient processability.

From these results, the thermoplastic elastomer compositions of the present invention (Examples 24 to 27) were found achieving sufficiently high levels of heat resistance and tensile strength at break. In addition, the thermoplastic elastomer compositions of the present invention (Examples 24 to 27) were also found obtaining sufficiently high levels of heat resistance and tensile strength at break and also having the flowability under heating and the resistance to compression set in a sufficiently well-balanced manner.

Moreover, from the property evaluation results of the thermoplastic elastomer compositions obtained in Examples 24 to 27, it was also found that as the value of the kinematic viscosity of the paraffin oil added becomes higher, the composition can have smaller compression set and accordingly a higher level of resistance to compression set. Hence, in the thermoplastic elastomer composition of the present invention, it has been found that some properties required depending on an application can be enhanced to especially high levels by using a paraffin oil as an additive component and doing the like as appropriate.

Example 28

First, 50 g of a styrene block copolymer (styrene-ethylene-butylene-styrene block copolymer (SEBS): manufactured by Kraton Corporation under the trade name of "G1633", molecular weight: 400,000 to 500,000, styrene content: 30% by mass) was placed into the pressure kneader, 100 g of a paraffin oil (manufactured by JXTG Nippon Oil & Energy Corporation under the trade name of "Super Oil M Series P500S") was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 75 g of an ethylene-butene copolymer (EBM: manufactured by Mitsui Chemicals, Inc. under the trade name of "TAFMER DF7350", crystallinity: 10%) and 0.3 g of an anti-aging agent (manufactured by ADEKA Corporation under the trade name of "AO-50") were further added to the pressure kneader, followed by mastication for 2 minutes at temperature of 200° C. to obtain a first mixture (a mixture containing the EBM and the maleic EBM). Here, the first mixture was plasticized in the mastication step. Subsequently, 1 g of an organically modified clay (manufactured by KUNIMINE INDUSTRIES Co., Ltd. under the trade name of "Kunfil D-36") was further added to the first mixture in the pressure kneader, followed by kneading for 4 minutes at 200° C. to obtain a second mixture.

Next, 2.62 g of tris(hydroxyethyl) isocyanurate (manufactured by NISSEI CORPORATION under the trade name of "TANAC") was added to the second mixture in the pressure kneader, followed by mixing for 8 minutes at 200° C. to prepare the thermoplastic elastomer composition. Table 1 presents data such as property evaluation results of the obtained thermoplastic elastomer composition. Note that, from the results of an infrared spectroscopic analysis of the raw material compound used, it was found that the composition contained the elastomeric polymer mainly having the side chain (iii) as described above. It was also found that the elastomeric polymer had a glass-transition point of 25° C. or below, which was attributable to the main chain made of ethylene and butene. Table 7 presents data such as property evaluation results of the obtained thermoplastic elastomer composition.

Examples 29 to 32

The thermoplastic elastomer compositions were obtained in the same manner as in Example 28 except that the type of the styrene block copolymer was changed and the styrene block copolymers described below were used in Examples. Note that, as is obvious from the description of the production method, the thermoplastic elastomer compositions obtained in Examples 28 to 32 have the same constitution except that the different types of the styrene block copolymers are contained. Table 7 presents data such as property evaluation results of the thermoplastic elastomer compositions thus obtained in Examples.

<Styrene Block Copolymer Used in Example 29>

SEBS: manufactured by Kraton Corporation under the trade name of "G1641", molecular weight: 250,000 to 350,000, styrene content: 33% by mass.

<Styrene Block Copolymer Used in Example 30>

SEBS: manufactured by Kraton Corporation under the trade name of "G1651", molecular weight: 250,000 to 350,000, styrene content: 33% by mass.

<Styrene Block Copolymer Used in Example 31>

SEEPS: manufactured by KURARAY CO., LTD. under the trade name of "4077", molecular weight: 400,000 to 500,000, styrene content: 30% by mass.

<Styrene Block Copolymer Used in Example 32>

SEEPS: manufactured by KURARAY CO., LTD. under the trade name of "4099", molecular weight: 500,000 to 600,000, styrene content: 30% by mass.

Comparative Example 2

First, 50 g of a styrene block copolymer (styrene-ethylene-butylene-styrene block copolymer (SEBS): manufactured by Kraton Corporation under the trade name of "G1633", molecular weight: 400,000 to 500,000, styrene content: 30% by mass) was placed into the pressure kneader, 100 g of a paraffin oil (manufactured by JXTG Nippon Oil & Energy Corporation under the trade name of "Super Oil M Series P500S") was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 75 g of an ethylene-butene copolymer (EBM: manufactured by Mitsui Chemicals, Inc. under the trade name of "TAFMER DF7350", crystallinity: 10%) and 0.3 g of an anti-aging agent (manufactured by ADEKA Corporation under the trade name of "AO-50") were further added to the pressure kneader, followed by mastication for 2 minutes at temperature of 200° C. to obtain a mixture (a mixture containing the EBM and the maleic EBM). Here, the mixture was plasticized in the mastication step. Next, 2.62 g of tris(hydroxyethyl) isocyanurate (manufactured by NISSEI CORPORATION under the trade name of "TANAC") was added to the mixture, followed by mixing for 8 minutes at 200° C. to prepare the thermoplastic elastomer composition. Table 7 presents data such as property evaluation results of the obtained thermoplastic elastomer composition.

TABLE 7

|  |  | Example 28 | Example 29 | Example 30 | Example 31 | Example 32 | Comp. Ex. 2 |
|---|---|---|---|---|---|---|---|
| Raw Materials of Composition (g) | Malec EBM (MH5040) | 100 | 100 | 100 | 100 | 100 | 100 |
| | Organically Modified Clay (Kunfil D-36) | 1 | 1 | 1 | 1 | 1 | — |
| | Tris(hydroxyethyl) Isocyanurate (TANAC) | 2.62 | 2.62 | 2.62 | 2.62 | 2.62 | 2.62 |
| | Anti-aging Agent (AO-50) | 0.3 | 0.3 | 0.3 | 0.3 | 0.3 | 0.3 |
| | Paraffin Oil (P500S) | 100 | 100 | 100 | 100 | 100 | 100 |
| | EBM (DF7350) | 75 | 75 | 75 | 75 | 75 | 75 |
| | SEBS (G1633) [Mw: 400,000 to 500,000, Styrene Content: 30% by mass] | 50 | — | — | — | — | 50 |
| | SEBS (G1641) [Mw: 250,000 to 350,000, Styrene Content: 33% by mass] | — | 50 | — | — | — | — |
| | SEBS (G1651) [Mw: 250,000 to 350,000, Styrene Content: 33% by mass] | — | — | 50 | — | — | — |
| | SEEPS (4077) [Mw: 400,000 to 500,000, Styrene Content: 30% by mass] | — | — | — | 50 | — | — |
| | SEEPS (4099) [Mw: 500,000 to 600,000, Styrene Content: 30% by mass] | — | — | — | — | 50 | — |
| Physical Property Value | 5% Weight Loss Temperature (° C.) | 341 | 342 | 340 | 341 | 343 | 319 |
| | Tensile Strength at Break (MPa) | 4.4 | 4.0 | 4.3 | 4.2 | 4.2 | 2.8 |
| | Compression Set (%, 70° C. 22 H. 25%) | 20 | 28 | 27 | 22 | 23 | 20 |
| | MFR (g/10 min. 230° C. 10 Kg) | 13 | 9 | 8 | 10 | 6 | 14 |
| | Elongation at Break (%) | 650 | 721 | 674 | 595 | 555 | 456 |
| | J1S-A Hardness | 36 | 34 | 35 | 35 | 41 | 33 |

Property Evaluation of Thermoplastic Elastomer Compositions (Examples 28 to 32 and Comparative Example 2)

As is apparent from the results presented in Table 7, all the thermoplastic elastomer compositions of the present invention (Examples 28 to 32) containing the elastomer component (the elastomeric polymer mainly having the aforementioned side chain (iii)), the α-olefin-based resin (the EBM), and the clay (the organically modified clay) had a 5% weight loss temperature of 340° C. or above. Meanwhile, the thermoplastic elastomer composition (Comparative Example 2) not containing the clay (the organically modified clay) had a 5% weight loss temperature of 319° C. From these results, the thermoplastic elastomer compositions of the present invention (Examples 28 to 32) were found achieving a higher level of heat resistance based on the 5% weight loss temperature.

In addition, it was also found that all the thermoplastic elastomer compositions of the present invention (Examples 28 to 32) containing the elastomer component (the elastomeric polymer mainly having the aforementioned side chain (iii)), the α-olefin-based resin (the EBM), and the clay (the organically modified clay) had tensile strength at break of 4.0 MPa or more, and accordingly achieved an even higher level of tensile strength at break than the thermoplastic elastomer composition (Comparative Example 2) not containing the clay (the organically modified clay). Further, the thermoplastic elastomer compositions of the present invention (Examples 28 to 32) were observed achieving sufficient resistance to compression set and having sufficient hardness, with both of which the thermoplastic elastomer compositions are usable as rubber products. In addition, all the thermoplastic elastomer compositions of the present invention (Examples 28 to 32) were observed having flowability under heating, and accordingly having sufficient processability.

From these result, the thermoplastic elastomer compositions of the present invention (Examples 28 to 32) were found obtaining sufficiently high levels of heat resistance and tensile strength at break. In addition, according to the thermoplastic elastomer compositions of the present invention (Examples 28 to 32), it was also found that the composition can obtain the sufficiently high levels of heat resistance and tensile strength at break and also have the flowability under heating and the resistance to compression set in a sufficiently well-balanced manner. In sum, from the results presented in Table 7, the thermoplastic elastomer compositions of the present invention (Examples 28 to 32) demonstrated that all the heat resistance, the flowability, the resistance to compression set, and the mechanical property (tensile strength at break) can be improved to sufficient levels; therefore the composition can have these properties at sufficiently high levels in a well-balanced manner.

Here, when the thermoplastic elastomer composition obtained in Example 28 is compared with the thermoplastic elastomer composition obtained in Comparative Example 2, their constitutions are different from each other only in the presence/absence of the organically modified clay. Thus, in view of such a difference between the constitutions and the results presented in Table 7, it was found that the thermoplastic elastomer composition containing the organically modified clay (Example 28) achieved higher values of the tensile strength at break and the elongation at break and therefore obtained the higher tensile properties (it is possible to obtain a composition which can be extended more easily and has higher resistance to elongation) than the thermoplastic elastomer composition not containing the organically modified clay (Comparative Example 2).

Moreover, as is apparent from the results presented in Table 7, it was found that the compositions using the styrene block copolymer (Examples 28 to 32) achieved a higher level of resistance to compression set in the case where the weight average molecular weight (Mw) of the styrene block copolymer was 400,000 to 600,000 (Example 1 and Examples 4 to 5).

Thus, it was confirmed that the thermoplastic elastomer composition of the present invention can have sufficiently high levels of heat resistance and tensile strength at break. Moreover, it was also found that it is possible to use a thermoplastic elastomer composition of the present invention in which some properties required for a target application or the like are enhanced to higher levels by a change in the constitution depending on the application (for example, such as a change in an amount of an α-olefin-based resin contained as appropriate, and changes in a type and an amount of an additive component (a styrene block copolymer or the like) used as appropriate).

Example 33

First, 20 g of a styrene block copolymer (styrene-ethylene-butylene-styrene block copolymer (SEBS): manufactured by Kraton Corporation under the trade name of "G1633", molecular weight: 400,000 to 500,000, styrene content: 30% by mass) was placed into the pressure kneader, 40 g of a paraffin oil (manufactured by JXTG Nippon Oil & Energy Corporation under the trade name of "Super Oil M Series P500S", kinematic viscosity: 472 mm$^2$/s, Cp value: 68.7%, aniline point: 123° C.) was dropwise added to the pressure kneader during kneading under the condition of 200° C., and thereby the styrene-ethylene-butylene-styrene block copolymer and the paraffin oil were mixed together for 1 minute. Thereafter, 10 g of a maleic anhydride-modified ethylene-butene copolymer (maleic EBM: manufactured by Mitsui Chemicals, Inc. under the trade name of "TAFMER MH5040", crystallinity: 4%), 7.5 g of an α-olefin-based resin, that is, an ethylene-butene copolymer (EBM: manufactured by Mitsui Chemicals, Inc. under the trade name of "TAFMER DF7350", crystallinity: 10%, MFR: 35 g/10 min (2.16 kg, 190° C.), Mw: 100,000), and 0.0778 g of an anti-aging agent (manufactured by ADEKA Corporation under the trade name of "AO-50") were further added to the pressure kneader, followed by kneading for 2 minutes at 200° C. to obtain a first mixture (a mixture of the EBM and the maleic EBM). Here, the first mixture was plasticized in the mastication step. Subsequently, 0.01 g of an organically modified clay (manufactured by HOJUN Co., Ltd. under the trade name of "S-VEN WX") was further added to the first mixture in the pressure kneader, followed by kneading for 4 minutes at 200° C. to obtain a second mixture.

Next, 0.102 g of pentaerythritol (manufactured by the Nippon Synthetic Chemical Industry Co., Ltd. under the trade name of "Neulizer P") was added to the second mixture in the pressure kneader, followed by mixing for 8 minutes at 200° C. to prepare the thermoplastic elastomer composition. Table 8 presents the constitution and Table 10 presents the data such as property evaluation results of the obtained thermoplastic elastomer composition.

Note that the elastomeric polymer thus formed is a reaction product of the maleic anhydride-modified ethylene-butene copolymer and the pentaerythritol, and has a side chain formed by the reaction of an acid anhydride group in the maleic anhydride-modified ethylene-butene copolymer with a hydroxy group in the pentaerythritol. Thus, a cross-linking structure containing a carboxylate group is formed at a side chain (the side chain is a side chain containing both a hydrogen-bond cross-linkable moiety and a covalent-bond cross-linking moiety).

Example 34

The thermoplastic elastomer composition was prepared in the same manner as in Example 33 except that 10 g of hydroxy-terminated polybutadiene (manufactured by Idemitsu Kosan Co., Ltd. under the trade name of "Polybd R-45HT", hydroxy equivalent: 1,400) was used instead of the use of g of the maleic anhydride-modified ethylene-butene copolymer (maleic EBM), 0.597 g of 2,6-pyridinedicarboxylic acid (manufactured by AIR WATER INC. under the trade name of "2,6-pyridinedicarboxylic acid") was used instead of the use of 0.102 g of the pentaerythritol (manufactured by the Nippon Synthetic Chemical Industry Co., Ltd. under the trade name of "Neulizer P"), and the amount of the anti-aging agent (manufactured by ADEKA Corporation under the trade name of "AO-50") used was changed from 0.0778 g to 0.0782 g. Table 8 presents the constitution and Table 10 presents the data such as property evaluation results of the obtained thermoplastic elastomer composition.

Note that the elastomeric polymer thus formed is a reaction product of the hydroxy-terminated polybutadiene with the 2,6-pyridinedicarboxylic acid, and has a side chain formed by the reaction of the hydroxy group at a terminal of the polybutadiene with a carbonyl group in the 2,6-pyridinedicarboxylic acid. Thus, a cross-linking structure containing a pyridine ring and a carboxylate group is formed at a side chain (the side chain is a side chain containing both a hydrogen-bond cross-linkable moiety and a covalent-bond cross-linking moiety).

Example 35

The thermoplastic elastomer composition was prepared in the same manner as in Example 33 except that 10 g of carboxy group-containing polyisoprene (manufactured by KURARAY CO., LTD. under the trade name of "LIR-410", carboxy equivalent: 4000) was used instead of the use of 10 g of the maleic anhydride-modified ethylene-butene copolymer (maleic EBM), 0.218 g of tris(hydroxyethyl) isocyanurate (manufactured by NISSEI CORPORATION under the trade name of "TANAC") was used instead of the use of 0.102 g of the pentaerythritol (manufactured by the Nippon Synthetic Chemical Industry Co., Ltd. under the trade name of "Neulizer P"), and 15 g of high-density polyethylene (HDPE: manufactured by Japan Polyethylene Corporation under the trade name of "HJ590N") was used instead of the use of 7.5 g of the ethylene-butene copolymer (EBM: manufactured by Mitsui Chemicals, Inc. under the trade name of "TAFMER DF7350"), and the amount of the anti-aging agent (manufactured by ADEKA Corporation under the trade name of "AO-50") used was changed from 0.0778 g to 0.0853 g. Table 8 presents the constitution and Table 10 presents the data such as property evaluation results of the obtained thermoplastic elastomer composition.

Note that the elastomeric polymer thus formed is a reaction product of the carboxy group-containing polyisoprene with the tris(hydroxyethyl) isocyanurate, and has a side chain formed by the reaction of a carboxy group in the polyisoprene with a hydroxy group in the tris(hydroxyethyl) isocyanurate. Thus, a cross-linking structure containing an isocyanurate ring and a carboxylate group is formed at a side chain (the side chain is a side chain containing both a hydrogen-bond cross-linkable moiety and a covalent-bond cross-linking moiety).

Example 36

The thermoplastic elastomer composition was prepared in the same manner as in Example 35 except that 0.085 g of pentaerythritol (manufactured by the Nippon Synthetic Chemical Industry Co., Ltd. under the trade name of "Neulizer P") was used instead of the use of 0.218 g of the tris(hydroxyethyl) isocyanurate (manufactured by NISSEI CORPORATION under the trade name of "TANAC"), and the amount of the anti-aging agent (manufactured by ADEKA Corporation under the trade name of "AO-50") used was changed from 0.0853 g to 0.0852 g. Table 8 presents the constitution and Table 10 presents the data such as property evaluation results of the obtained thermoplastic elastomer composition.

Note that the elastomeric polymer thus formed is a reaction product of the carboxy group-containing polyisoprene with the pentaerythritol, and has a side chain formed by the reaction of a carboxy group in the polyisoprene with a hydroxy group in the pentaerythritol. Thus, a cross-linking structure containing a carboxylate group and a hydroxy group is formed at a side chain (the side chain is a side chain containing both a hydrogen-bond cross-linkable moiety and a covalent-bond cross-linking moiety).

Example 37

The thermoplastic elastomer composition was prepared in the same manner as in Example 35 except that 0.234 g of 2,4-diamino-6-phenyl-1,3,5-triazine (manufactured by NIPPON SHOKUBAI CO., LTD. under the trade name of "Benzoguanamine") was used instead of the use of 0.218 g of the tris(hydroxyethyl) isocyanurate (manufactured by NISSEI CORPORATION under the trade name of "TANAC"). Table 8 presents the constitution and Table 10 presents the data such as property evaluation results of the obtained thermoplastic elastomer composition.

Note that the elastomeric polymer thus formed is a reaction product of the carboxy group-containing polyisoprene with the 2,4-diamino-6-phenyl-1,3,5-triazine, and has a side chain formed by the reaction of a carboxy group in the polyisoprene with an amino group ($—NH_2$) in the 2,4-diamino-6-phenyl-1,3,5-triazine. Thus, a cross-linking structure containing a triazine ring and a bond moiety represented by an amide bond (formula: —CONH—) is formed at a side chain (the side chain is a side chain containing both a hydrogen-bond cross-linkable moiety and a covalent-bond cross-linking moiety).

Example 38

The thermoplastic elastomer composition was prepared in the same manner as in Example 35 except that 0.438 g of tris[(3-mercaptopropionyloxy)-ethyl] isocyanurate (manufactured by SC Organic Chemical Co., Ltd.) was used instead of the use of 0.218 g of the tris(hydroxyethyl) isocyanurate (manufactured by NISSEI CORPORATION under the trade name of "TANAC"), 7.5 g of an ethylene-butene copolymer (EBM: manufactured by Mitsui Chemicals, Inc. under the trade name of "TAFMER DF7350") was used instead of the use of 15 g of the high-density polyethylene (HDPE: manufactured by Japan Polyethylene Corporation under the trade name of "HJ590N"), and the amount of the anti-aging agent (manufactured by ADEKA Corporation under the trade name of "AO-50") used was changed from 0.0853 g to 0.078 g. Table 8 presents the constitution and Table 10 presents the data such as property evaluation results of the obtained thermoplastic elastomer composition.

Note that the elastomeric polymer thus formed is a reaction product of the carboxy group-containing polyisoprene with the tris[(3-mercaptopropionyloxy)-ethyl] isocyanurate, and has a side chain formed by the reaction of a carboxy group in the polyisoprene with a thiol group (—SH) in the tris[(3-mercaptopropionyloxy)-ethyl] isocyanurate. Thus, a cross-linking structure containing an isocyanurate ring and a thioester (a group represented by the formula: —CO—S—) is formed at a side chain (the side chain is a side chain containing both a hydrogen-bond cross-linkable moiety and a covalent-bond cross-linking moiety).

Example 39

The thermoplastic elastomer composition was prepared in the same manner as in Example 33 except that 10 g of an amino group-containing polyethylene imine (manufactured by NIPPON SHOKUBAI CO., LTD. under the trade name of "EPOMIN SP-200", amine value: 18 mmol/g) was used instead of the use of 10 g of the maleic anhydride-modified ethylene-butene copolymer (maleic EBM), 1.504 g of 2,6-pyridinedicarboxylic acid (manufactured by AIR WATER INC. under the trade name of "2,6-pyridinedicarboxylic acid") was used instead of the use of 0.102 g of the pentaerythritol (manufactured by the Nippon Synthetic Chemical Industry Co., Ltd. under the trade name of "Neulizer P"), 15 g of high-density polyethylene (HDPE: manufactured by Japan Polyethylene Corporation under the trade name of "HJ590N") was used instead of the use of 7.5 g of the ethylene-butene copolymer (EBM: manufactured by Mitsui Chemicals, Inc. under the trade name of "TAFMER DF7350"), and the amount of the anti-aging agent (manufactured by ADEKA Corporation under the trade name of "AO-50") used was changed from 0.0778 g to 0.0866 g. Table 8 presents the constitution and Table 10 presents the data such as property evaluation results of the obtained thermoplastic elastomer composition.

Note that the elastomeric polymer thus formed is a reaction product of the amino group-containing polyethylene imine with the 2,6-pyridinedicarboxylic acid, and has a side chain formed by the reaction of an amino group in the polyethylene imine with a carboxy group in the 2,6-pyridinedicarboxylic acid. Thus, a cross-linking structure containing a pyridine ring and a bond moiety represented by an amide bond (formula: —CONH—) is formed at a side chain (the side chain is a side chain containing both a hydrogen-bond cross-linkable moiety and a covalent-bond cross-linking moiety).

Example 40

The thermoplastic elastomer composition was prepared in the same manner as in Example 39 except that 1.784 g of tris(2,3-epoxypropyl) isocyanurate (manufactured by Nissan Chemical Industries, Ltd.) was used instead of the use of 1.504 g of the 2,6-pyridinedicarboxylic acid (manufactured by AIR WATER INC. under the trade name of "2,6-Pyridinedicarboxylic acid"), 7.5 g of an ethylene-butene copolymer (EBM: manufactured by Mitsui Chemicals, Inc. under the trade name of "TAFMER DF7350") was used instead of the use of 15 g of the high-density polyethylene (HDPE: manufactured by Japan Polyethylene Corporation under the trade name of "HJ590N"), and the amount of the anti-aging agent (manufactured by ADEKA Corporation under the trade name of "AO-50") used was changed from 0.0866 g to 0.0794 g. Table 8 presents the constitution and Table 10 presents the data such as property evaluation results of the obtained thermoplastic elastomer composition.

Note that the elastomeric polymer thus formed is a reaction product of the amino group-containing polyethylene imine with the tris(2,3-epoxypropyl) isocyanurate, and has a side chain formed by the reaction of an amino group in the polyethylene imine with an epoxy group in the tris(2,3-epoxypropyl) isocyanurate. Thus, a cross-linking structure containing an isocyanurate ring, a hydroxy group (—OH group), and an imino group is formed at a side chain (the side chain is a side chain containing both a hydrogen-bond cross-linkable moiety and a covalent-bond cross-linking moiety).

Example 41

The thermoplastic elastomer composition was prepared in the same manner as in Example 33 except that 10 g of alkoxysilyl group-containing polyethylene (manufactured by Mitsubishi Chemical Corporation under the trade name of "LINKLON", alkoxy equivalent: 10,000) was used instead of the use of 10 g of the maleic anhydride-modified ethylene-butene copolymer (maleic EBM), 0.087 g tris(hydroxyethyl) isocyanurate (manufactured by NISSEI CORPORATION under the trade name of "TANAC") was used instead of the use of 0.102 g of the pentaerythritol (manufactured by the Nippon Synthetic Chemical Industry Co., Ltd. under the trade name of "Neulizer P"), 15 g of high-density polyethylene (HDPE: manufactured by Japan Polyethylene Corporation under the trade name of "HJ590N") was used instead of the use of 7.5 g of the ethylene-butene copolymer (EBM: manufactured by Mitsui Chemicals, Inc. under the trade name of "TAFMER DF7350"), and the amount of the anti-aging agent (manufactured by ADEKA Corporation under the trade name of "AO-50") used was changed from 0.0778 g to 0.0852 g. Table 8 presents the constitution and Table 10 presents the data such as property evaluation results of the obtained thermoplastic elastomer composition.

Note that the elastomeric polymer thus formed is a reaction product of the alkoxysilyl group-containing polyethylene with the tris(hydroxyethyl) isocyanurate, and has a side chain formed by the reaction of an alkoxysilyl group in the polyethylene with a hydroxy group in the tris(hydroxyethyl) isocyanurate. Thus, a cross-linking structure containing an isocyanurate ring and a silyloxy bond (—O—Si—O—) is formed at a side chain (the side chain is a side chain containing both a hydrogen-bond cross-linkable moiety and a covalent-bond cross-linking moiety).

Example 42

The thermoplastic elastomer composition was prepared in the same manner as in Example 41 except that 0.034 g of pentaerythritol (manufactured by the Nippon Synthetic Chemical Industry Co., Ltd. under the trade name of "Neulizer P") was used instead of the use of 0.087 g of the tris(hydroxyethyl) isocyanurate (manufactured by NISSEI CORPORATION under the trade name of "TANAC"), and the amount of the anti-aging agent (manufactured by ADEKA Corporation under the trade name of "AO-50") used was changed from 0.0852 g to 0.0851 g. Table 8 presents the constitution and Table 10 presents the data such as property evaluation results of the obtained thermoplastic elastomer composition.

Note that the elastomeric polymer thus formed is a reaction product of the alkoxysilyl group-containing polyethylene with the pentaerythritol, and has a side chain formed by the reaction of an alkoxysilyl group in the polyethylene with a hydroxy group in the pentaerythritol. Thus, a cross-linking structure containing a silyloxy bond (—O—Si—O—) and a hydroxy group is formed at a side chain (the side chain is a side chain containing both a hydrogen-bond cross-linkable moiety and a covalent-bond cross-linking moiety).

Example 43

The thermoplastic elastomer composition was prepared in the same manner as in Example 33 except that 10 g of alkoxysilyl group-containing polyethylene (manufactured by Mitsubishi Chemical Corporation under the trade name of "LINKLON") was used instead of the use of 10 g of the maleic anhydride-modified ethylene-butene copolymer (maleic EBM), 0.094 g of 2,4-diamino-6-phenyl-1,3,5-triazine (manufactured by NIPPON SHOKUBAI CO., LTD. under the trade name of "Benzoguanamine") was used instead of the use of 0.102 g of the pentaerythritol (manufactured by the Nippon Synthetic Chemical Industry Co., Ltd. under the trade name of "Neulizer P"), and the amount of the anti-aging agent (manufactured by ADEKA Corporation under the trade name of "AO-50") used was changed from 0.0778 g to 0.0777 g. Table 8 presents the constitution and Table 10 presents the data such as property evaluation results of the obtained thermoplastic elastomer composition.

Note that the elastomeric polymer thus formed is a reaction product of the alkoxysilyl group-containing polyethylene with the 2,4-diamino-6-phenyl-1,3,5-triazine, and has a side chain formed by the reaction of an alkoxysilyl group in the polyethylene with an amino group in the 2,4-diamino-6-phenyl-1,3,5-triazine. Thus, a cross-linking structure containing an isocyanurate ring and a silylamino bond is formed at a side chain (the side chain is a side chain containing both a hydrogen-bond cross-linkable moiety and a covalent-bond cross-linking moiety).

Example 44

The thermoplastic elastomer composition was prepared in the same manner as in Example 33 except that 10 g of an epoxy compound of a styrene-butadiene block copolymer (manufactured by DAICEL CORPORATION under the trade name of "EPOFRIEND", epoxy equivalent: 1,000) was used instead of the use of 10 g of the maleic anhydride-modified ethylene-butene copolymer (maleic EBM), 0.936 g of 2,4-diamino-6-phenyl-1,3,5-triazine (manufactured by NIPPON SHOKUBAI CO., LTD. under the trade name of "Benzoguanamine") was used instead of the use of 0.102 g of the pentaerythritol (manufactured by the Nippon Synthetic Chemical Industry Co., Ltd. under the trade name of "Neulizer P"), 15 g of high-density polyethylene (HDPE: manufactured by Japan Polyethylene Corporation under the trade name of "HJ590N") was used instead of the use of 7.5 g of the ethylene-butene copolymer (EBM: manufactured by Mitsui Chemicals, Inc. under the trade name of "TAFMER DF7350"), and the amount of the anti-aging agent (manufactured by ADEKA Corporation under the trade name of "AO-50") used was changed from 0.0778 g to 0.086 g. Table 8 presents the constitution and Table 10 presents the data such as property evaluation results of the obtained thermoplastic elastomer composition.

Note that the elastomeric polymer thus formed is a reaction product of the epoxy compound of the styrene-butadiene block copolymer with the 2,4-diamino-6-phenyl-1,3,5-triazine, and has a side chain formed by the reaction of an epoxy group in the epoxy compound with an amino group in the 2,4-diamino-6-phenyl-1,3,5-triazine. Thus, a cross-linking structure containing a triazine ring, a hydroxy group, and an imino bond is formed at a side chain (the side chain is a side chain containing both a hydrogen-bond cross-linkable moiety and a covalent-bond cross-linking moiety).

Example 45

The thermoplastic elastomer composition was prepared in the same manner as in Example 33 except that 10 g of an epoxy compound of a styrene-butadiene block copolymer (manufactured by DAICEL CORPORATION under the trade name of "EPOFRIEND") was used instead of the use of 10 g of the maleic anhydride-modified ethylene-butene copolymer (maleic EBM), 1.75 g of tris[(3-mercaptopropionyloxy)-ethyl] isocyanurate (manufactured by SC Organic Chemical Co., Ltd.) was used instead of the use of 0.102 g of the pentaerythritol (manufactured by the Nippon Synthetic Chemical Industry Co., Ltd. under the trade name of "Neulizer P"), and the amount of the anti-aging agent (manufactured by ADEKA Corporation under the trade name of "AO-50") used was changed from 0.0778 g to 0.0793 g. Table 8 presents the constitution and Table 10 presents the data such as property evaluation results of the obtained thermoplastic elastomer composition.

Note that the elastomeric polymer thus formed is a reaction product of the epoxy compound of the styrene-butadiene block copolymer with the tris[(3-mercaptopropionyloxy)-ethyl] isocyanurate, and has a side chain formed by the reaction of an epoxy group in the epoxy compound with an amino group in the tris[(3-mercaptopropionyloxy)-ethyl] isocyanurate. Thus, a cross-linking structure containing a hydroxy group, a thioether bond, and an isocyanurate ring is formed at a side chain (the side chain is a side chain containing both a hydrogen-bond cross-linkable moiety and a covalent-bond cross-linking moiety).

Example 46

The thermoplastic elastomer composition was prepared in the same manner as in Example 33 except that 10 g of hydroxy-terminated polybutadiene (manufactured by Idemitsu Kosan Co., Ltd. under the trade name of "Polybd R-45HT", hydroxy equivalent: 1,400) was used instead of the use of g of the maleic anhydride-modified ethylene-butene copolymer (maleic EBM), 0.672 g of m-xylylene diisocyanate (manufactured by Mitsui Chemicals, Inc.) was used instead of the use of 0.102 g of the pentaerythritol (manufactured by the Nippon Synthetic Chemical Industry Co., Ltd. under the trade name of "Neulizer P"), and the amount of the anti-aging agent (manufactured by ADEKA Corporation under the trade name of "AO-50") used was changed from 0.0778 g to 0.0783 g. Table 8 presents the constitution and Table 10 presents the data such as property evaluation results of the obtained thermoplastic elastomer composition.

Note that the elastomeric polymer thus formed is a reaction product of the hydroxy-terminated polybutadiene with the m-xylylene diisocyanate, and has a side chain formed by the reaction of a hydroxy group at a terminal of the polybutadiene with an isocyanate group in the m-xylylene diisocyanate. Thus, a cross-linking structure containing a benzene ring and a urethane bond is formed at a side chain (the side chain is a side chain containing both a hydrogen-bond cross-linkable moiety and a covalent-bond cross-linking moiety).

Comparative Examples 3 to 16

The thermoplastic elastomer compositions for comparison were prepared in the same manners as in Examples 33 to 46, respectively, except that the organically modified clay was not used. Table 9 presents the constitutions and Table 10 presents the data such as property evaluation results of the obtained thermoplastic elastomer compositions.

TABLE 8

| | | Example 33 | Example 34 | Example 35 | Example 36 | Example 37 | Example 38 | Example 39 | Example 40 | Example 41 | Example 42 | Example 43 | Example 44 | Example 45 | Example 46 |
|---|---|---|---|---|---|---|---|---|---|---|---|---|---|---|---|
| Elastomeric Polymer (E) | Maleic Anhydride-Modified Ethylene-Butene Copolymer (Functional Group: Maleic Anhydride Group, Main Chain: EBM) | 100 | — | — | — | — | — | — | — | — | — | — | — | — | — |
| | Hydroxy-terminated Polybutadiene (Functional Group: OH Group, Main Chain: Polybutadiene, Hydroxy Equivalent: 1400) | — | 100 | — | — | — | — | — | — | — | — | — | — | — | 100 |
| | Carboxy Group-containing Polyisoprene (Functional Group: COOH Group, Main Chain: Polyisoprene, Carbon, Equivalent: 4000) | — | — | 100 | 100 | 100 | 100 | — | — | — | — | — | — | — | — |
| | Amino Group-containing Polyethylene Imine (Functional Group: NH, Group, Main Chain: Polyethylene Imine, Amine Value: 18 mmol/g) | — | — | — | — | — | — | 100 | — | — | — | — | — | — | — |
| | Alkoxysilyl Group-containing Polyethylene (Functional Group: SiOR, Group, Main Chain: Polyethylene, Alkoxysilyl Equivalent: 10000) | — | — | — | — | — | — | — | 100 | 100 | 100 | — | — | — | — |
| | Epoxy Compound of Styrene-Butadiene Block Copolymer (Functional Group: Epoxy Group, Main Chain: Styrene-Butadiene Block Copolymer, Epoxy Equivalent: 1000) | — | — | — | — | — | — | — | — | — | — | 100 | 100 | — | — |
| Compound (M) | Tris(hydroxyethyl) Isocyanurate (TANAC, Hydroxy Equivalent: 87.08) | 1.02 | — | 2.18 | 0.85 | — | — | — | — | 0.87 | — | — | — | 100 | — |
| | Pentaerythritol (Neulizer P, Molecular Weight: 136, Hydrous, Equivalent 34) | — | — | — | — | — | — | — | — | — | 0.34 | — | — | — | — |

TABLE 8-continued

| | Example 33 | Example 34 | Example 35 | Example 36 | Example 37 | Example 38 | Example 39 | Example 40 | Example 41 | Example 42 | Example 43 | Example 44 | Example 45 | Example 46 |
|---|---|---|---|---|---|---|---|---|---|---|---|---|---|---|
| 2,6-Pyridinedicarboxylic Acid (Molecular Weight: 167.12, Carboxy Equivalent: 83.56) | — | 5.97 | — | — | — | — | — | — | — | — | — | — | — | — |
| 2,4-Diamino-6-Phenyl-1,3,5-Triazine (Benzoguanamine, Molecular Weight: 187.17, Amino Group Equivalent: 93.59) | — | — | — | — | 2.34 | — | 15.04 | — | — | — | 0.94 | 9.36 | — | — |
| Tris(2,3-Epoxypropyl) Isocyanurate (Molecular Weight: 297.27, Epoxy Equivalent: 99.09) | — | — | — | — | — | 17.84 | — | — | — | — | — | — | — | — |
| Tris[(3-Mercaptopropionyloxy)-Ethyl] Isocyanurate (Molecular Weight: 525.62, Mercapto Group Equivalent: 184.2) | — | — | — | — | 4.38 | — | — | — | — | — | — | — | 17.5 | — |
| m-Xylylene Diisocyanate (Molecular Weight: 118.18, Isocyanate Group Equivalent: 94.09) | — | — | — | — | — | — | — | — | — | — | — | — | — | 6.72 |
| Organically Modified Clay (S-VEN WX) | 0.1 | 0.1 | 0.1 | 0.1 | 0.1 | 0.1 | 0.1 | 0.1 | 0.1 | 0.1 | 0.1 | 0.1 | 0.1 | 0.1 |
| Anti-aging Agent (AO-50) | 0.778 | 0.7482 | 0.853 | 0.852 | 0.853 | 0.78 | 0.866 | 0.794 | 0.852 | 0.851 | 0.777 | 0.86 | 0.7493 | 0.783 |
| SEES (G1633) | 200 | 200 | 200 | 200 | 200 | 200 | 200 | 200 | 200 | 200 | 200 | 200 | 200 | 200 |
| Paraffin Oil (P500S) | 400 | 400 | 400 | 400 | 400 | 400 | 400 | 400 | 400 | 400 | 400 | 400 | 400 | 400 |
| α-Olefin Resin | Ethylene-Butene Copolymer (EBM: 0F7350) [Crystallinity: 10%] | 75 | 75 | — | — | — | 75 | 75 | 75 | — | — | 75 | — | 75 | 75 |
| | High Density Polyethylene (HDPE: HJ590N) | — | — | 150 | 150 | 150 | — | — | — | 150 | 150 | — | 150 | — | — |
| Total Amount of Composition (parts by weight) | 776.898 | 781.852 | 853.133 | 851.802 | 853.293 | 780.26 | 866.006 | 793.734 | 851.822 | 851.291 | 776.817 | 860.32 | 793.393 | 782.603 |

The sign "—" in Table 1 indicates 0 The numerical value indicates a value (parts by weight) relative to 100 parts by weight of the polymer (E).

TABLE 9

| | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|---|---|---|---|
| Elastomeric Polymer (E) | | | | | | | | | | | | | | |
| Maleic Anhydride-Modified Ethylene-Butene Copolymer (Functional Group: Maleic Anhydride Group, Main Chain: EBM) | 100 | — | — | — | — | — | — | — | — | — | — | — | — | — |
| Hydroxy-terminated Polybutadiene (Functional Group: OH Group, Main Chain: Polybutadiene, Hydroxy Equivalent: 1400) | — | 100 | — | — | — | — | — | — | — | — | — | — | — | — |
| Carboxy Group-containing Polyisoprene (Functional Group: COOH Group, Main Chain: Polyisoprene, Carboxy Equivalent: 4000) | — | — | 100 | 100 | 100 | 100 | — | — | — | — | — | — | — | — |
| Amino Group-containing Polyethylene Imine (Functional Group: NH$_2$ Group, Main Chain: Polyethylene Imine, Amine Value: 18 mmol/g) | — | — | — | — | — | 100 | 100 | — | 100 | — | — | — | — | — |
| Alkoxysilyl Group-containing Polyethylene (Functional Group: SiOR$_3$ Group, Main Chain: Polyethylene, Alkoxysilyl Equivalent: 10000) | — | — | — | — | — | — | — | — | — | 100 | 100 | — | — | — |
| Epoxy Compound of Styrene-Butadiene Block Copolymer | — | — | — | — | — | — | — | — | — | — | 100 | 100 | — | — |
| Styrene-Butadiene Block Copolymer, (Functional Group: Epoxy Group, Main Chain: Epoxy Equivalent: 1000) | — | — | — | — | — | — | — | — | — | — | — | — | 100 | — |
| Compound (M) | | | | | | | | | | | | | | |
| Tris(hydroxyethyl) Isocyanurate (TANAC, Hydroxy Equivalent: 87.08) | — | — | 2.18 | 0.85 | — | — | — | — | 0.87 | — | — | — | — | — |
| Pentaerythritol (Neulizer P, Molecular Weight: 136, Hydroxy Equivalent: 34) | 1.02 | — | — | — | — | — | — | — | — | 0.34 | — | — | — | — |

TABLE 9-continued

| | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|---|---|---|---|
| 2,6-Pyridinedicarboxylic Acid (Molecular Weight: 167.12, Carboxy Equivalent: 83.56) | — | 5.97 | — | — | — | — | 15.04 | — | — | — | — | — | — | — |
| 2,4-Diamino-6-Phenyl-1,3,5-Triazine (Benzoguanamine, Molecular Weight: 187.17, Amino Group Equivalent: 93.59) | — | — | — | — | 2.34 | — | — | — | — | — | 0.94 | 9.36 | — | — |
| Tris(2,3-Epoxypropyl) Isocyanurate (Molecular Weight: 297.27, Epoxy Equivalent: 99.09) | — | — | — | — | — | — | — | 17.84 | — | — | — | — | — | — |
| Tris[(3-Mercaptopropionyloxy)-Ethyl] Isocyanurate (Molecular Weight: 525.62, Mercapto Group Equivalent: 184.2) | — | — | — | — | — | 4.38 | — | — | — | — | — | — | — | — |
| m-Xylylene Diisocyanate (Molecular Weight: 118.18, Isocyanate Group Equivalent: 94.09) | — | — | — | — | — | — | — | — | — | — | — | — | 17.5 | 6.72 |
| Organically Modified Clay (S-VEN WX) | — | — | — | — | — | — | — | — | — | — | — | — | — | — |
| Anti-aging Agent (AO-50) | 0.778 | 0.782 | 0.853 | 0.852 | 0.853 | 0.78 | 0.866 | 0.794 | 0.852 | 0.851 | 0.777 | 0.86 | 0.793 | 0.783 |
| SEES (G1633) | 200 | 200 | 200 | 200 | 200 | 200 | 200 | 200 | 200 | 200 | 200 | 200 | 200 | 200 |
| Paraffin Oil (P500S) | 400 | 400 | 400 | 400 | 400 | 400 | 400 | 400 | 400 | 400 | 400 | 400 | 400 | 400 |
| α-Olefin Resin — Ethylene-Propylene Copolymer (EPM: DF7350) [Crystallinity: 10%] | 75 | 75 | — | — | — | 75 | — | 75 | — | — | 75 | — | 75 | 75 |
| High Density Polyethylene (HDPE: HJ590N) | — | — | 150 | 150 | 150 | — | 150 | — | 150 | 150 | — | 150 | — | — |
| Total Amount of Composition (parts by weight) | 776.798 | 781.752 | 853.033 | 851.702 | 853.193 | 780.16 | 865.906 | 793.634 | 851.722 | 851.191 | 776.717 | 860.22 | 793.293 | 782.503 |

The sign "—" in Table 1 indicates 0. The numerical value indicates a value (parts by weight) relative to 100 parts by weight of the polymer (E).

TABLE 10

| | 5% Weight Loss Temperature (° C.) | Tensile Strength at Break (MPa) | Compression Set (Unit: %) | MFR (g/10 min) | JIS-A Hardness |
|---|---|---|---|---|---|
| Example 33 | 341 | 2.47 | 23 | 3.2 | 27 |
| Example 34 | 342 | 2.38 | 22 | 3.1 | 26 |
| Example 35 | 339 | 9.28 | 26 | 3.9 | 51 |
| Example 36 | 341 | 9.20 | 27 | 3.8 | 52 |
| Example 37 | 338 | 9.18 | 26 | 3.7 | 51 |
| Example 38 | 340 | 2.56 | 22 | 3.1 | 26 |
| Example 39 | 338 | 9.08 | 27 | 4.0 | 50 |
| Example 40 | 337 | 2.51 | 23 | 3.2 | 25 |
| Example 41 | 341 | 9.21 | 28 | 4.1 | 52 |
| Example 42 | 342 | 9.24 | 29 | 4.2 | 51 |
| Example 43 | 339 | 2.52 | 20 | 3.2 | 26 |
| Example 44 | 338 | 9.15 | 28 | 3.9 | 51 |
| Example 45 | 339 | 2.47 | 24 | 3.1 | 25 |
| Example 46 | 341 | 2.43 | 22 | 2.9 | 27 |
| Comp. Ex. 3 | 320 | 1.58 | 31 | 1.4 | 20 |
| Comp. Ex. 4 | 319 | 1.59 | 32 | 1.3 | 21 |
| Comp. Ex. 5 | 321 | 6.56 | 34 | 1.8 | 46 |
| Comp. Ex. 6 | 320 | 6.72 | 35 | 1.9 | 45 |
| Comp. Ex. 7 | 318 | 6.66 | 35 | 1.8 | 45 |
| Comp. Ex. 8 | 317 | 1.61 | 32 | 1.3 | 19 |
| Comp. Ex. 9 | 320 | 6.72 | 36 | 1.9 | 44 |
| Comp. Ex. 10 | 318 | 1.61 | 31 | 1.3 | 18 |
| Comp. Ex. 11 | 319 | 6.58 | 37 | 1.9 | 46 |
| Comp. Ex. 12 | 320 | 6.00 | 36 | 1.8 | 45 |
| Comp. Ex. 13 | 319 | 1.68 | 31 | 1.2 | 19 |
| Comp. Ex. 14 | 321 | 6.54 | 37 | 1.9 | 46 |
| Comp. Ex. 15 | 320 | 1.56 | 30 | 1.1 | 18 |
| Comp. Ex. 16 | 322 | 1.54 | 32 | 1.3 | 20 |

Property Evaluation of Thermoplastic Elastomer Compositions (Examples 33 to 46 and Comparative Examples 3 to 16)

As is apparent from the results presented in Table 10, the comparison of the thermoplastic elastomer compositions of the present invention (Examples 33 to 46) containing the elastomer component, the α-olefin-based resin (EBM or HDPE), and the organically modified clay, with the thermoplastic elastomer compositions for comparison (Comparative Examples 3 to 16) having the same constitutions except that the organically modified clay was not contained, respectively, demonstrated that the thermoplastic elastomer compositions of the present invention (Examples 33 to 46) had a 5% weight loss temperature of 337° C. or above whereas the thermoplastic elastomer compositions (Comparative Examples 3 to 16) not containing the organically modified clay had a 5% weight loss temperature of 322° C. or below (lower than 325° C.). From these results, it was confirmed that higher levels of heat resistance based on the 5% weight loss temperature can be obtained according to the thermoplastic elastomer compositions of the present invention (Examples 33 to 46).

Moreover, the comparison of the thermoplastic elastomer compositions of the present invention (Examples 33 to 46) containing the elastomer component, the α-olefin-based resin (EBM or HDPE), and the organically modified clay, with the thermoplastic elastomer compositions for comparison (Comparative Examples 3 to 16) having the same constitutions except that the organically modified clay was not contained, respectively, demonstrated that the thermoplastic elastomer compositions of the present invention (Examples 33 to 46) achieved a higher level of tensile strength at break than the thermoplastic elastomer compositions (Comparative Examples 3 to 16) not containing the organically modified clay. In addition, as is apparent from the results presented in Table 10, all the thermoplastic elastomer compositions of the present invention (Examples 33 to 46) were observed achieving sufficient resistance to compression set and having sufficient hardness, with both of which the thermoplastic elastomer compositions are usable as rubber products. Further, all the thermoplastic elastomer compositions of the present invention (Examples 33 to 46) were observed having flowability under heating, and accordingly having sufficient processability.

These results demonstrated that it is possible to cause the thermoplastic elastomer compositions of the present invention (Example 33 to 46) to have sufficiently high levels of heat resistance and tensile strength at break.

Example 47

First, 20 g of a styrene block copolymer (styrene-ethylene-butylene-styrene block copolymer (SEBS): manufactured by Kraton Corporation under the trade name of "G1633", molecular weight: 400,000 to 500,000, styrene content: 30% by mass) was placed into the pressure kneader, 40 g of a paraffin oil (manufactured by Idemitsu Kosan Co., Ltd. under the trade name of "Diana Process Oil PW380", kinematic viscosity: 380 mm$^2$/s, Cp value: 68.0%, aniline point: 143° C.) was dropwise added to the pressure kneader during kneading under the condition of 180° C., and thereby the styrene-ethylene-butylene-styrene block copolymer and the paraffin oil were mixed together for 1 minute. Thereafter, 10 g of a maleic anhydride-modified ethylene-butene copolymer (maleic EBM: manufactured by Mitsui Chemicals, Inc. under the trade name of "TAFMER MH5040", crystallinity: 4%), 7.5 g of an α-olefin-based resin, that is, an ethylene-butene copolymer (EBM: manufactured by Mitsui Chemicals, Inc. under the trade name of "TAFMER DF7350", crystallinity: 10%, MFR: 35 g/10 min (2.16 kg, 190° C.), Mw: 100,000), and 0.078 g of an anti-aging agent (manufactured by ADEKA Corporation under the trade name of "AO-50") were further added to the pressure kneader, followed by kneading at temperature of 180° C. for 2 minutes to obtain a first mixture (a mixture containing the EBM and the maleic EBM). Here, the first mixture was plasticized in the mastication step. Subsequently, 0.01 g of an organically modified clay (manufactured by HOJUN Co., Ltd. under the trade name of "S-VEN WX") was added to the first mixture in the pressure kneader, followed by kneading for 4 minutes at 200° C. to obtain a second mixture.

Next, 0.262 g of tris(hydroxyethyl) isocyanurate (manufactured by NISSEI CORPORATION under the trade name of "TANAC") was added to the second mixture in the pressure kneader, followed by mixing for 8 minutes at 180° C. to prepare the thermoplastic elastomer composition. Table 11 presents data such as the constitution and property evaluation results of the obtained thermoplastic elastomer composition.

Note that the elastomeric polymer thus formed is a reaction product of the maleic anhydride-modified ethylene-butene copolymer with the tris(hydroxyethyl) isocyanurate, and has a side chain formed by the reaction of an acid anhydride group in the maleic anhydride-modified ethylene-butene copolymer with a hydroxy group in the tris(hydroxyethyl) isocyanurate. Thus, a cross-linking structure containing a carboxylate group is formed at aside chain (the side chain is a side chain containing both a hydrogen-bond cross-linkable moiety and a covalent-bond cross-linking moiety).

Examples 48 and 49

The thermoplastic elastomer compositions were prepared in the same manner as in Example 47 except that the amount of the anti-aging agent used and the amount of the paraffin oil used were changed to the amounts presented in Table 11. Table 11 presents the data such as the constitutions and property evaluation results of the obtained thermoplastic elastomer compositions.

Example 50

The thermoplastic elastomer composition was prepared in the same manner as in Example 47 except that the amount of the anti-aging agent used, the amount of the paraffin oil used, and the amount of the styrene block copolymer (SEBS) were changed to the amounts presented in Table 11. Table 11 presents the data such as the constitution and property evaluation results of the obtained thermoplastic elastomer composition.

Example 51

The thermoplastic elastomer composition was prepared in the same manner as in Example 47 except that 2.5 g of polyethylene (PE (high-density polyethylene: HDPE): manufactured by Japan Polyethylene Corporation under the trade name of "HJ590N", crystallinity: 74%, MFR: 40 g/10 min (2.16 kg, 190° C.), Mw: 70,000) was used as an α-olefin-based resin instead of the use of 7.5 g of the ethylene-butene copolymer (EBM), the amount of the styrene block copolymer (SEBS) used was changed from 20 g to 30 g, the amount of the paraffin oil used was changed from 40 g to 100 g, and the amount of the anti-aging agent used was changed from 0.078 g to 0.143 g. Table 11 presents the data such as the constitution and property evaluation results of the obtained thermoplastic elastomer composition.

Example 52

The thermoplastic elastomer composition was prepared in the same manner as in Example 51 except that the amount of the anti-aging agent used and the amount of the polyethylene used were changed to the amounts presented in Table 11. Table 11 presents the data such as the constitution and property evaluation results of the obtained thermoplastic elastomer composition.

Example 53

The thermoplastic elastomer composition was prepared in the same manner as in Example 51 except that the amount of the anti-aging agent used and the amount of the polyethylene used were changed to the amounts presented in Table 11, and 0.3 g of a black color masterbatch (manufactured by Nippon Pigment Company Limited under the trade name of "Nippisun") was added 4 minutes after the tris(hydroxyethyl) isocyanurate was added. Table 11 presents the data such as the constitution and property evaluation results of the obtained thermoplastic elastomer composition.

Example 54

The thermoplastic elastomer composition was prepared in the same manner as in Example 51 except that the amount of the anti-aging agent used, the amount of the polyethylene used, the amount of the styrene block copolymer (SEBS) used, and the amount of the paraffin oil used were changed to the amounts presented in Table 11, and 0.3 g of a black color masterbatch (manufactured by Nippon Pigment Company Limited under the trade name of "Nippisun") was added 4 minutes after the tris(hydroxyethyl) isocyanurate was added. Table 11 presents the data such as the constitution and property evaluation results of the obtained thermoplastic elastomer composition.

Comparative Examples 17 to 24

The thermoplastic elastomer compositions for comparison were prepared in the same manners as in Examples 47 to 54, respectively, except that the organically modified clay was not used. (Thus, Example 47 and Comparative Example 17, Example 48 and Comparative Example 18, Example 49 and Comparative Example 19, Example 50 and Comparative Example 20, Example 51 and Comparative Example 21, Example 52 and Comparative Example 22, Example 53 and Comparative Example 23, and Example 54 and Comparative Example 24 have the common constitutions, respectively, except for the presence/absence of the organically modified clay.) Table 12 presents data such as the constitutions and property evaluation results of the thermoplastic elastomer compositions for comparison.

TABLE 11

| | | Example 47 | Example 48 | Example 49 | Example 50 | Example 51 | Example 52 | Example 53 | Example 54 |
|---|---|---|---|---|---|---|---|---|---|
| Raw Materials of Composition (parts by weight) | Maleic EBM (MH5040) | 100 | 100 | 100 | 100 | 100 | 100 | 100 | 100 |
| | Organically Modified Clay (S-VEN WX) | 0.1 | 0.1 | 0.1 | 0.1 | 0.1 | 0.1 | 0.1 | 0.1 |
| | Tris(hydroxyethyl) Isocyanurate (TANAC) | 2.62 | 2.62 | 2.62 | 2.62 | 2.62 | 2.62 | 2.62 | 2.62 |
| | Anti-aging Agent (AO-50) | 0.78 | 1.18 | 1.58 | 1.88 | 1.43 | 1.48 | 1.51 | 1.13 |
| | SEBS (G1633) | 200 | 200 | 200 | 300 | 300 | 300 | 300 | 250 |
| | Paraffin Oil (PW380) | 400 | 800 | 1200 | 1400 | 1000 | 1000 | 1000 | 700 |
| α-Olefin-based Resin | Ethylene-Butene Copolymer (EBM: DF7350) [Crystallinity: 10%] | 75 | 75 | 75 | 75 | — | — | — | — |
| | Polyethylene (PE: HJ590N) [Crystallinity: 74%] | — | — | — | — | 25 | 75 | 100 | 75 |
| | Black Color Masterbatch (Nippisun) | — | — | — | — | — | — | 3 | 3 |
| Total Amount of Composition (parts by weight) | | 779 | 1179 | 1579 | 1880 | 1429 | 1479 | 1507 | 1132 |

TABLE 11-continued

|  |  | Example 47 | Example 48 | Example 49 | Example 50 | Example 51 | Example 52 | Example 53 | Example 54 |
|---|---|---|---|---|---|---|---|---|---|
| Physical Property Value | 5% Weight Loss Temperature (° C.) | 344 | 344 | 345 | 345 | 348 | 350 | 349 | 349 |
|  | Tensile Strength at Break (MPa) | 2.04 | 0.89 | 0.26 | 0.46 | 1.14 | 2.34 | 3.12 | 3.85 |
|  | Compression Set (%, 70° C., 22 H, 25%) | 12 | 8 | 10 | 4 | 16 | 16 | 18 | 18 |
|  | MFR (g/10 min, 230° C., 5 Kg) | 1.5 | — | — | — | 47.1 | 55.7 | 102.7 | 11.5 |
|  | MFR (g/10 min, 230° C., 2.16 Kg) | — | 5.2 | 30.0 | 5.9 | — | — | — | — |
|  | JIS-A Hardness | 21 | 5 | 0 | 1 | 8 | 14 | 20 | 24 |

TABLE 12

|  |  |  | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 |
|---|---|---|---|---|---|---|---|---|---|---|
| Raw Materials of Composition (parts by weight) | | Maleic EBM (MH5040) | 100 | 100 | 100 | 100 | 100 | 100 | 100 | 100 |
|  | | Organically Modified Clay (S-VEN WX) | — | — | — | — | — | — | — | — |
|  | | Tris(hydroxyethyl) Isocyanurate (TANAC) | 2.62 | 2.62 | 2.62 | 2.62 | 2.62 | 2.62 | 2.62 | 2.62 |
|  | | Anti-aging Agent (AO-50) | 0.78 | 1.18 | 1.58 | 1.88 | 1.43 | 1.48 | 1.51 | 1.13 |
|  | | SEBS (G1633) | 200 | 200 | 200 | 300 | 300 | 300 | 300 | 250 |
|  | | Paraffin Oil (PW380) | 400 | 800 | 1200 | 140 | 1000 | 1000 | 1000 | 700 |
|  | α-Olefin-based Resin | Ethylene-Butene Copolymer (EBM: DF7350) [Crystallinity: 10%] | 75 | 75 | 75 | 75 | — | — | — | — |
|  |  | Polyethylene (PE: HJ590IN) [Crystallinity: 74%] | — | — | — | — | 25 | 75 | 100 | 75 |
|  | | Black Color Masterbatch (Nippisun) | — | — | — | — | — | — | 3 | 3 |
| | | Total Amount of Composition (parts by weight) | 778 | 1179 | 1579 | 1880 | 1429 | 1479 | 1507 | 1132 |
| Physical Property Value | | 5% Weight Loss Temperature (° C.) | 322 | 324 | 326 | 325 | 328 | 329 | 325 | 327 |
| | | Tensile Strength at Break (MPa) | 1.86 | 0.78 | 0.23 | 0.44 | 1.04 | 2.22 | 3.01 | 3.76 |
| | | Compression Set (%, 70° C., 22 H, 25%) | 14 | 11 | 12 | 6 | 19 | 18 | 19 | 20 |
| | | MFR (g/10 min, 230° C., 5 Kg) | 1.3 | — | — | — | 44.2 | 53.2 | 99.8 | 9.9 |
| | | MFR (g/10 min, 230° C., 2.16 Kg) | — | 5.0 | 28.5 | 5.6 | — | — | — | — |
| | | JIS-A Hardness | 20 | 4 | 0 | 0 | 6 | 12 | 19 | 22 |

Property Evaluation of Thermoplastic Elastomer Compositions (Examples 47 to 54 and Comparative Examples 17 to 24)

As is apparent from the results presented in Tables 11 and 12, the comparison of the thermoplastic elastomer compositions of the present invention (Examples 47 to 54) containing the elastomer component, the α-olefin-based resin (EBM or HDPE), and the organically modified clay, with the thermoplastic elastomer compositions for comparison (Comparative Examples 17 to 24) having the same constitutions except that the organically modified clay was not contained, respectively, demonstrated that the thermoplastic elastomer compositions of the present invention (Examples 47 to 54) had a 5% weight loss temperature of 344° C. or above, whereas the thermoplastic elastomer compositions (Comparative Examples 17 to 24) not containing the organically modified clay had a 5% weight loss temperature of 329° C. or below. From these results, it was confirmed that higher levels of heat resistance based on the 5% weight loss temperature can be obtained according to the thermoplastic elastomer compositions of the present invention (Examples 47 to 54).

Moreover, the comparison of the thermoplastic elastomer compositions of the present invention (Examples 47 to 54) containing the elastomer component, the α-olefin-based resin (EBM or HDPE), and the organically modified clay, with the thermoplastic elastomer compositions for comparison (Comparative Examples 17 to 24) having the same constitutions except that the organically modified clay was not contained, respectively, demonstrated that the thermoplastic elastomer compositions of the present invention (Examples 47 to 54) achieved a higher level of tensile strength at break than the thermoplastic elastomer compositions (Comparative Examples 17 to 24) not containing the organically modified clay. In addition, as is apparent from the results presented in Table 11, all the thermoplastic elastomer compositions of the present invention (Examples 47 to 54) were also observed achieving sufficient resistance to compression set. Further, all the thermoplastic elastomer compositions of the present invention (Examples 47 to 54) were observed having flowability under heating, and accordingly having sufficient processability. Still further, the thermoplastic elastomer compositions obtained in Examples 48 to 51 achieved a very high level of heat resistance while keeping the hardness of 10 or lower, and therefore can be used suitably for gaskets, packings, stoppers, materials for 3D printer, and so on, for example. Thus, the results presented in Tables 11 and 12 demonstrated that it is possible to use a thermoplastic elastomer composition of the present invention in which a certain property such as hardness is changed by a change in the constitution.

INDUSTRIAL APPLICABILITY

As has been described above, according to the present invention, it is possible to provide a thermoplastic elastomer composition which can have sufficiently high levels of heat resistance and tensile strength at break, and a method for producing the same.

Thus, the thermoplastic elastomer compositions of the present invention can exert various properties as described above in a well-balanced manner, and therefore can be used as materials and the like to produce various rubber components in the fields of, for example, electrical and electronic instruments, home appliances, chemicals, pharmaceuticals, glass, earth materials, steels, nonferrous metals, machineries, precision equipment, cosmetics, textiles, mining, pulp, paper, construction/civil engineering/building, foods/beverages, general consumer goods/services, transportation equipment, construction machines, electrical equipment, facilities (industrial facilities, air conditioners, hot water supplies, energy farms), metals, media, information, communication devices, lighting devices, displays, agriculture, fishery, forestry, marine industry, agribusiness, biotechnologies, nanotechnologies, industries, and the like (more specifically, products and the like for use in applications such as automobile-related products, hoses, belts, seats, anti-vibration rubbers, rollers, linings, rubber-coated fabrics, sealing materials, gloves, fenders, rubbers for medical use (syringe gaskets, tubes, catheters), gaskets (for home appliances, for construction), asphalt modifiers, hot melt adhesives, boots, grips, toys, shoes, sandals, keypads, gears, PET bottle cap liners, rubber parts for printers, sealing materials, paints and coating materials, print inks, and so on).

The invention claimed is:

1. A thermoplastic elastomer composition comprising:
at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below and elastomeric polymers (B) each of which contains a hydrogen-bond cross-linkable moiety and a covalent-bond cross-linking moiety in a side chain and has a glass-transition point of 25° C. or below;
an organically modified clay, a content ratio of which is 20 parts by mass or less relative to 100 parts by mass of the elastomer component;
an α-olefin-based resin having no chemical-bond cross-linking moiety; and
a paraffin oil in which a kinematic viscosity at 40° C. is 150 to 600 mm²/s,
wherein the organically modified clay is a quaternary ammonium salt of a clay, and the quaternary ammonium salt of the clay is at least one selected from the group consisting of trimethylstearylammonium salts, oleylbis(2-hydroxylethyl) methylammonium salts, dimethylstearylbenzylammonium salts, dioctadecyldimethylammonium salts, and mixtures of two or more thereof.

2. The thermoplastic elastomer composition according to claim 1, wherein a content ratio of the α-olefin-based resin is 5 to 250 parts by mass relative to 100 parts by mass of the elastomer component.

3. The thermoplastic elastomer composition according to claim 1, wherein
the α-olefin-based resin is at least one selected from the group consisting of polypropylene, polyethylene, ethylene-butene copolymers, and ethylene-propylene copolymers.

4. The thermoplastic elastomer composition according to claim 1, wherein
a melt flow rate (MFR) of the α-olefin-based resin measured at 190° C. under a load of 2.16 kg according to JIS K6922-2 (published in 2010) is 40 g/10 min or higher.

5. The thermoplastic elastomer composition according to claim 1, wherein
the hydrogen-bond cross-linkable moiety contained in the side chain of the elastomeric polymer (B) is a hydrogen-bond cross-linkable moiety having a carbonyl-containing group and/or a nitrogen-containing heterocycle.

6. The thermoplastic elastomer composition according to claim 1, wherein a cross linkage in the covalent-bond cross-linking moiety contained in the side chain of the elastomeric polymer (B) is at least one bond selected from the group consisting of amide, ester, lactone, urethane, ether, thiourethane, and thioether.

7. The thermoplastic elastomer composition according to claim 1, wherein the hydrogen-bond cross-linkable moiety in the side chain (a) contains a structural portion represented by the following formula (1):

wherein in the formula (1),
A is a nitrogen-containing heterocycle, and
B is a single bond, an oxygen atom, an amino group represented by a formula NR' where R' is a hydrogen atom or an alkyl group having 1 to 10 carbon atoms, a sulfur atom, or an organic group optionally containing any of the aforementioned atoms or groups.

8. The thermoplastic elastomer composition according to claim 1, wherein the nitrogen-containing heterocycle is a 5-membered ring and/or 6-membered ring.

9. The thermoplastic elastomer composition according to claim 1, wherein the nitrogen-containing heterocycle is at least one selected from a triazole ring, a thiadiazole ring, a pyridine ring, an imidazole ring, a triazine ring, an isocyanurate ring, and a hydantoin ring.

10. The thermoplastic elastomer composition according to claim 1, wherein the main chain of each of the elastomeric polymers (A) and (B) is at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

11. The thermoplastic elastomer composition according to claim 1, wherein a main chain of the polymer contained as the elastomer component is an olefin-based copolymer, and a side chain of the polymer has an isocyanurate ring.

12. The thermoplastic elastomer composition according to claim 11, wherein in an infrared adsorption spectrum of the thermoplastic elastomer composition, a ratio between an absorption intensity (A) of a peak around a wavelength of 2,920 $cm^{-1}$ derived from C—H stretching vibration in an olefin-based resin and an absorption intensity (B) of a peak around a wavelength of 1,695 $cm^{-1}$ derived from a carbonyl group in the isocyanurate ring ([absorption intensity (B)]/[absorption intensity (A)]) is 0.01 or more.

13. The thermoplastic elastomer composition according to claim 1, further comprising a styrene block copolymer having no chemical-bond cross-linking moiety.

14. A method for producing a thermoplastic elastomer composition, comprising:

a first step of mixing an elastomeric polymer having a cyclic acid anhydride group in a side chain, an organically modified clay, an α-olefin-based resin having no chemical-bond cross-linking moiety, and a paraffin oil in which a kinematic viscosity at 40° C. is 150 to 600 $mm^2/s$ together to obtain a mixture, wherein the organically modified clay is a quaternary ammonium salt of a clay, and the quaternary ammonium salt of the clay is at least one selected from the group consisting of trimethylstearylammonium salts, salts of oleylbis(2-hydroxyethyl) methylammonium salts, dimethylstearylbenzylammonium salts, dioctadecyldimethylammonium salts, and mixtures of two or more thereof; and a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein the thermoplastic elastomer composition obtained in the second step is a composition comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

the organically modified clay, a content ratio of which is 20 parts by mass or less relative to 100 parts by mass of the elastomer component; and the α-olefin-based resin, and in the first step, a ratio of the amount of the clay contained in the thermoplastic elastomer composition is 20 parts by mass or less relative to 100 parts by mass of the elastomer component.

15. The method for producing a thermoplastic elastomer composition according to claim 14, wherein the elastomeric polymer having a cyclic acid anhydride group in a side chain is a maleic anhydride-modified elastomeric polymer.

16. The method for producing a thermoplastic elastomer composition according to claim 14, wherein a compound that forms both a hydrogen-bond cross-linkable moiety and a covalent-bond cross-linking moiety upon a reaction with the cyclic acid anhydride group is used as the compound (I) and/or (II).

17. The method for producing a thermoplastic elastomer composition according to claim 14, wherein a compound having at least one substituent among hydroxy groups, thiol groups, amino groups, and imino groups is used as the compound (I) and/or (II).

* * * * *